(12) United States Patent
Rajasingham

(10) Patent No.: US 6,609,749 B1
(45) Date of Patent: *Aug. 26, 2003

(54) EASY EJECTOR SEAT WITH SKELETAL CRASH SAFETY BEAM

(76) Inventor: Arjuna Ihdraeswaran Rajasingham, 6024 Bradley Blvd., Bethesda, MD (US) 20817

( * ) Notice: Subject to any disclaimer, the term of this patent is extended or adjusted under 35 U.S.C. 154(b) by 0 days.

This patent is subject to a terminal disclaimer.

(21) Appl. No.: 09/435,830

(22) Filed: Nov. 8, 1999

Related U.S. Application Data

(63) Continuation of application No. 09/404,475, filed on Sep. 24, 1999, and a continuation-in-part of application No. 08/936,626, filed on Sep. 24, 1997, now Pat. No. 6,059,354.

(51) Int. Cl.⁷ .............................................. B60R 27/00
(52) U.S. Cl. ................... 296/188; 296/189; 296/65.11; 296/68.1; 180/282
(58) Field of Search ............................... 296/63, 65.01, 296/67, 68, 68.1, 65.02, 65.03, 65.11, 65.12, 65.13, 65.14, 65.15, 188, 189; 180/282; 297/344, 11, 487, 488, 216.1, 216.11, 216.16, 216.18, 411.44, 734, 735

(56) References Cited

U.S. PATENT DOCUMENTS

| | | | |
|---|---|---|---|
| 2,148,950 A | * | 2/1939 | Maier |
| 2,587,679 A | * | 3/1952 | Atkinson |
| 2,710,222 A | * | 6/1955 | Barenyi |
| 2,753,947 A | * | 7/1956 | Mach |
| 2,758,872 A | * | 8/1956 | Solomon et al. |
| 2,777,531 A | * | 1/1957 | Erickson |
| 2,873,122 A | * | 2/1959 | Peras ................. 296/68.1 X |
| 3,071,407 A | * | 1/1963 | Sloan |

(List continued on next page.)

FOREIGN PATENT DOCUMENTS

| | | | |
|---|---|---|---|
| DE | 39 15 173 | * | 11/1989 |
| DE | 42 12 091 | * | 10/1993 |
| JP | 5-114621 | * | 2/1979 |
| JP | 1-95948 | * | 4/1989 |

OTHER PUBLICATIONS

C. Clark, C. Blechschmidt. "Human Transportation Fatalities and Protection Against Rear and Side Crash Loads by the Air Stop Restraint." 1965. Stapp Car Crash Conference.*
C. Clark. "Extended Bumper and Glass Plastic Glazing Methods to Reduce Intrusion and Ejection in Severe Motor Vehicle Crashes". 1993. 26th International Symposium on Automotive Technology & Automation.*
C. Clark., W. Young. "Airbag Bumpers Inflated Just Before the Crash" 1994. SAE Technical Paper Series.*
C. Clark. "The Crash Anticipating Extended Bumper System" 1994. 14th International Technical Conference on the Enhanced Safety of Vehicles. Munich.*
C. Clark. "Airbag Bumpers and a Means to Reduce Crash Loads and Intrusion, and Increase Intervehicular Compatibility" 1995. International Conference on Pelvic & Lower Extremity Injuries.*

*Primary Examiner*—Joseph D. Pape

(57) ABSTRACT

An arrangement in passenger vehicles, that diverts the impact energy in lateral or side impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also a safety device for head-on collision protection that obviates the need for conventional seat belts and front impact airbags. An indo-skeletal structural arrangement proposed for the vehicle, provides further benefits by targeting the strength of the vehicle to protect passengers while minimizing other massive elements in the vehicle.

50 Claims, 41 Drawing Sheets

U.S. PATENT DOCUMENTS

| | | | | |
|---|---|---|---|---|
| 3,129,017 | A | * | 4/1964 | Graham |
| 3,545,789 | A | * | 12/1970 | Graham |
| 3,713,695 | A | * | 1/1973 | Von Wimmersperg |
| 3,735,398 | A | * | 5/1973 | Ross |
| 3,762,505 | A | * | 10/1973 | Morse |
| 3,922,030 | A | * | 11/1975 | Stedman |
| 3,944,277 | A | * | 3/1976 | Cyphert ........................ 296/68 |
| 3,951,429 | A | * | 4/1976 | Satzinger |
| 3,961,805 | A | * | 6/1976 | Satzinger |
| 3,981,520 | A | * | 9/1976 | Pulling ................... 296/68.1 X |
| 4,082,350 | A | * | 4/1978 | Tomforde |
| 4,512,604 | A | * | 4/1985 | Maeda et al. ............... 296/68.1 |
| 4,533,172 | A | * | 8/1985 | Oliver ......................... 296/185 |
| 4,580,842 | A | * | 4/1986 | Segal .......................... 297/488 |
| 4,664,443 | A | * | 5/1987 | Casale ..................... 297/488 X |
| 4,671,563 | A | * | 6/1987 | Shakespear ............... 296/66 X |
| 4,815,777 | A | * | 3/1989 | Campbell ................... 293/107 |
| 4,995,659 | A | * | 2/1991 | Patk ........................... 293/107 |
| 5,000,509 | A | * | 3/1991 | Sinnhuber et al. ........... 296/188 |
| 5,131,703 | A | * | 7/1992 | Stirling ....................... 293/127 |
| 5,213,300 | A | * | 5/1993 | Rees ..................... 296/65.1 X |
| 5,435,618 | A | * | 7/1995 | Sacco et al. ................. 296/188 |
| 5,464,266 | A | * | 11/1995 | Guertler ..................... 296/189 |
| 5,474,353 | A | * | 12/1995 | Koester et al. ............. 296/65.1 |
| 5,476,309 | A | * | 12/1995 | Chen .......................... 297/487 |
| 5,531,470 | A | * | 7/1996 | Townsend ................ 280/730.2 |
| 5,660,428 | A | * | 8/1997 | Catlin ......................... 296/205 |
| 5,671,968 | A | * | 9/1997 | Masuda et al. ............. 296/188 |
| 5,716,094 | A | * | 2/1998 | Bhalsod et al. ......... 296/68.1 X |
| 5,722,617 | A | * | 3/1998 | Cecinas ................. 296/68.1 X |
| 5,725,265 | A | * | 3/1998 | Baber ......................... 293/107 |
| 5,810,427 | A | * | 9/1998 | Hartmann et al. .......... 296/189 |
| 5,947,543 | A | * | 9/1999 | Hubbard .................... 296/68.1 |
| 6,206,466 | B1 | * | 3/2001 | Komatsu ............... 297/216.13 |
| 6,209,909 | B1 | * | 4/2001 | Breed ......................... 280/735 |
| 6,260,913 | B1 | * | 7/2001 | Sekita et al. .............. 296/66 X |

* cited by examiner

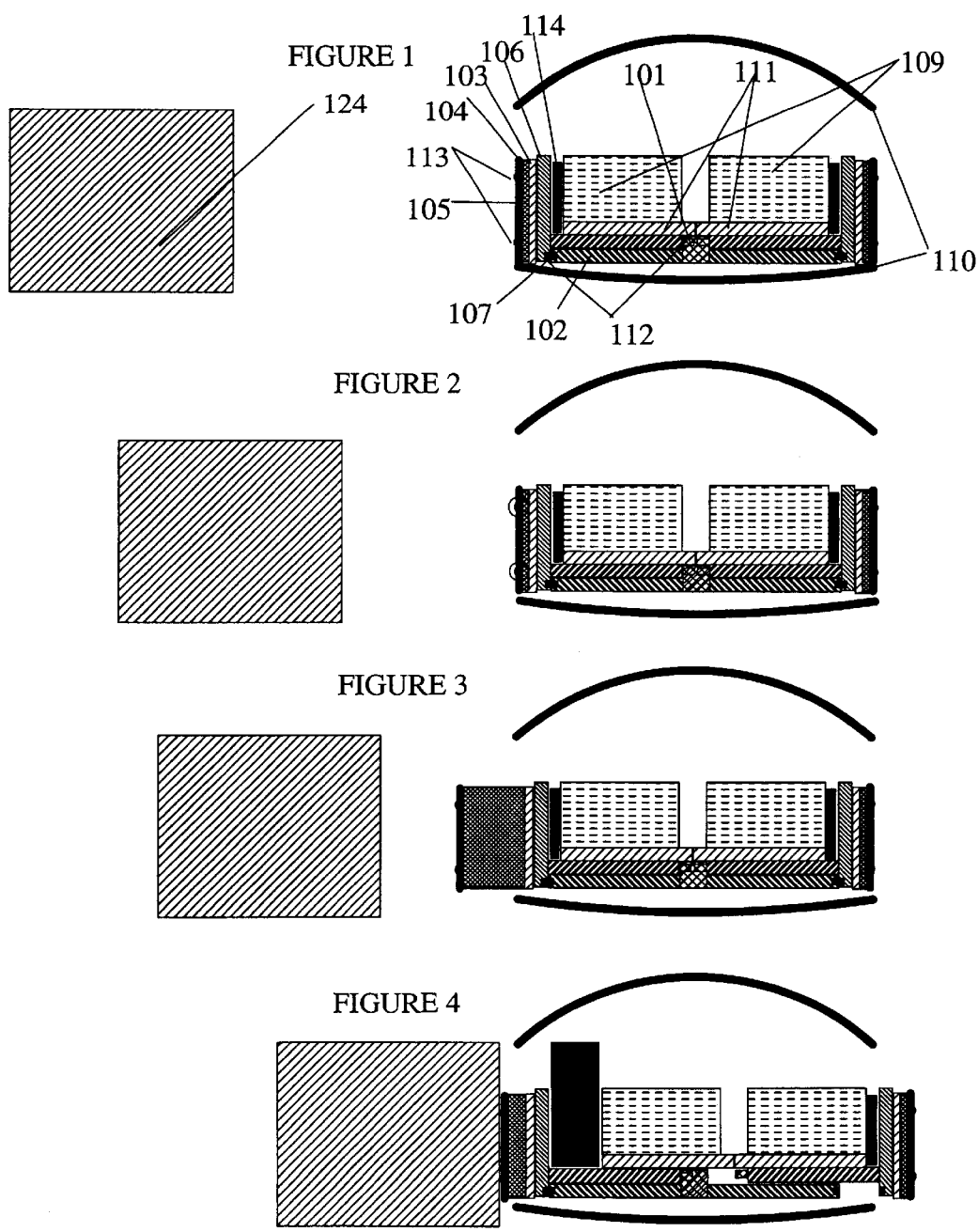

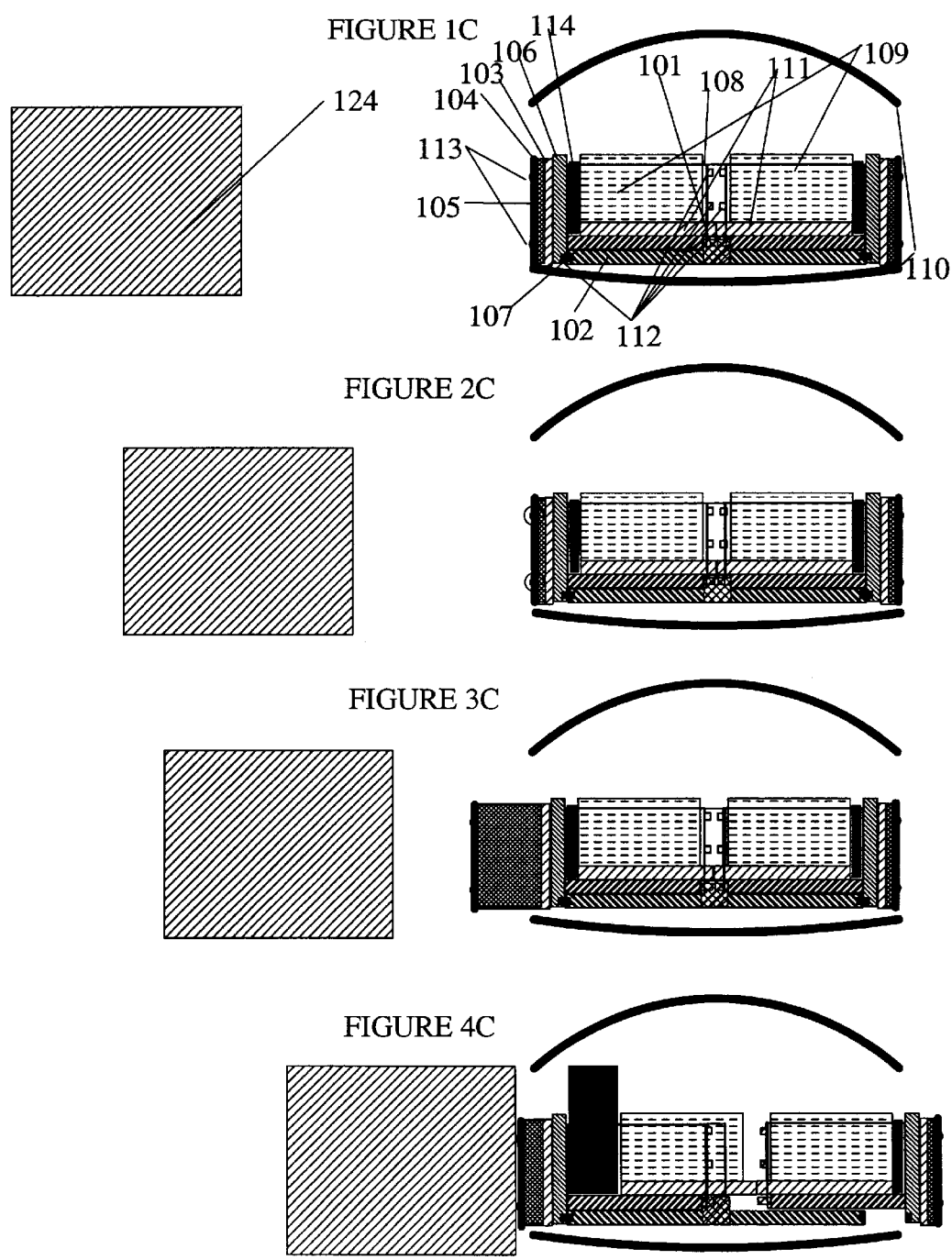

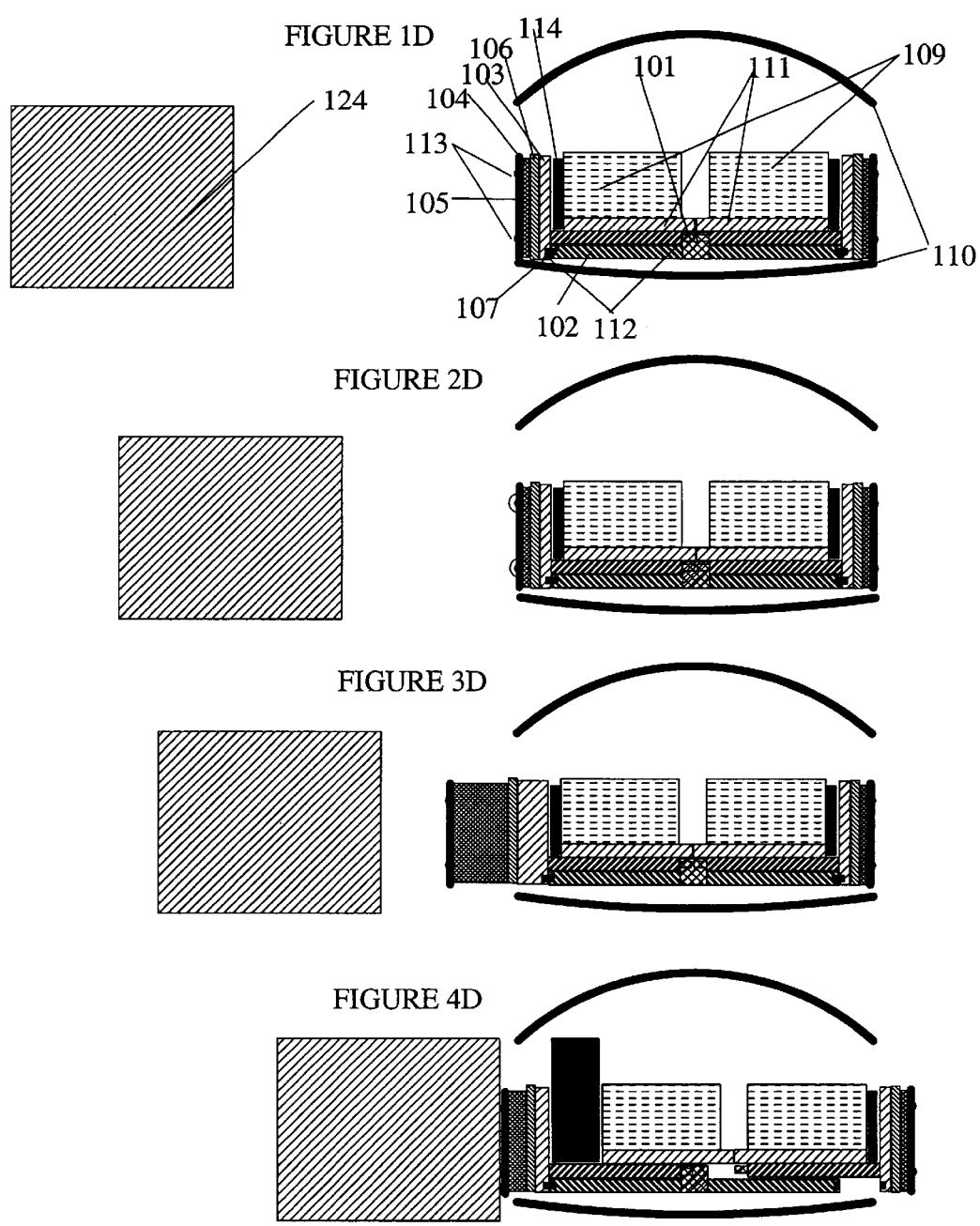

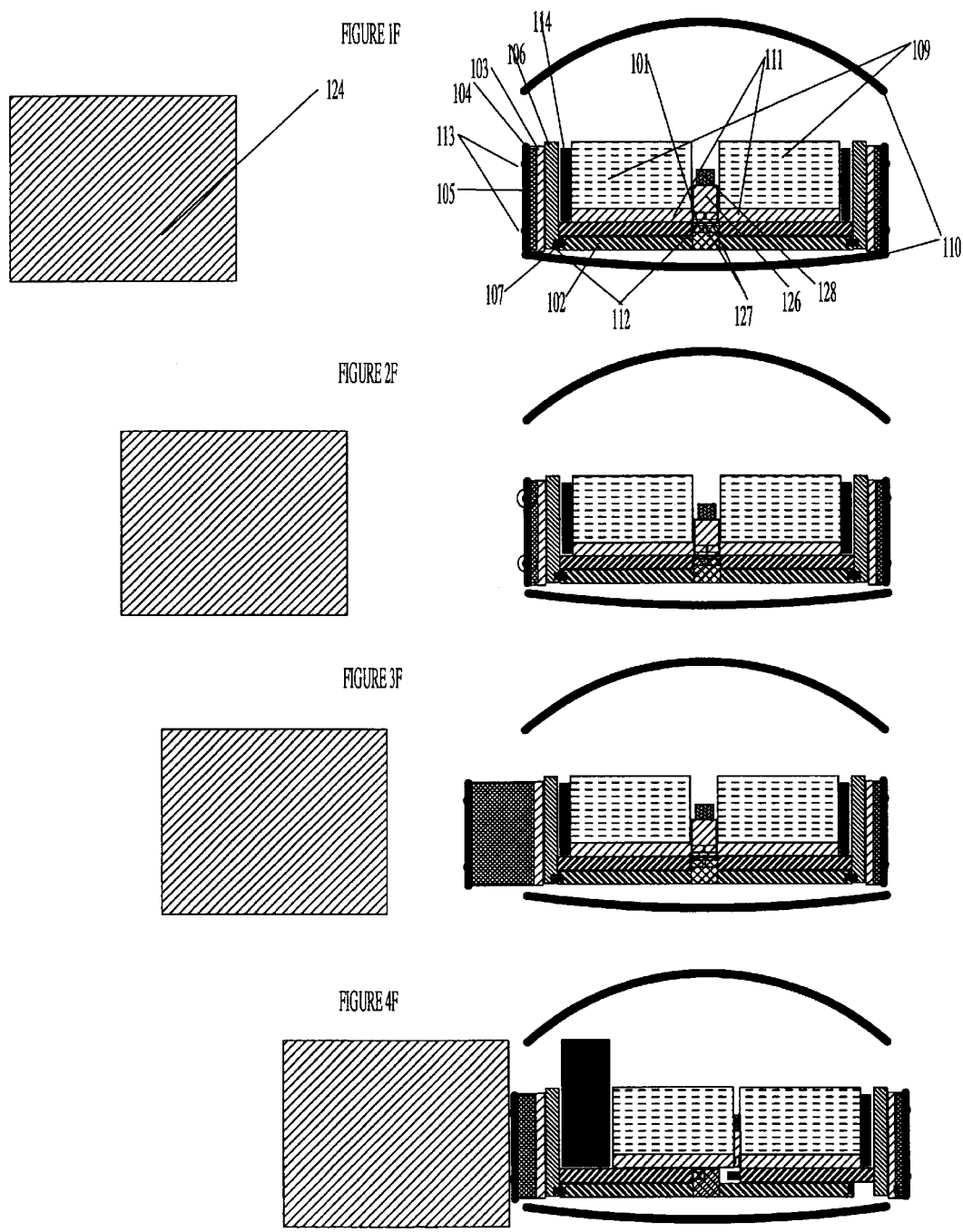

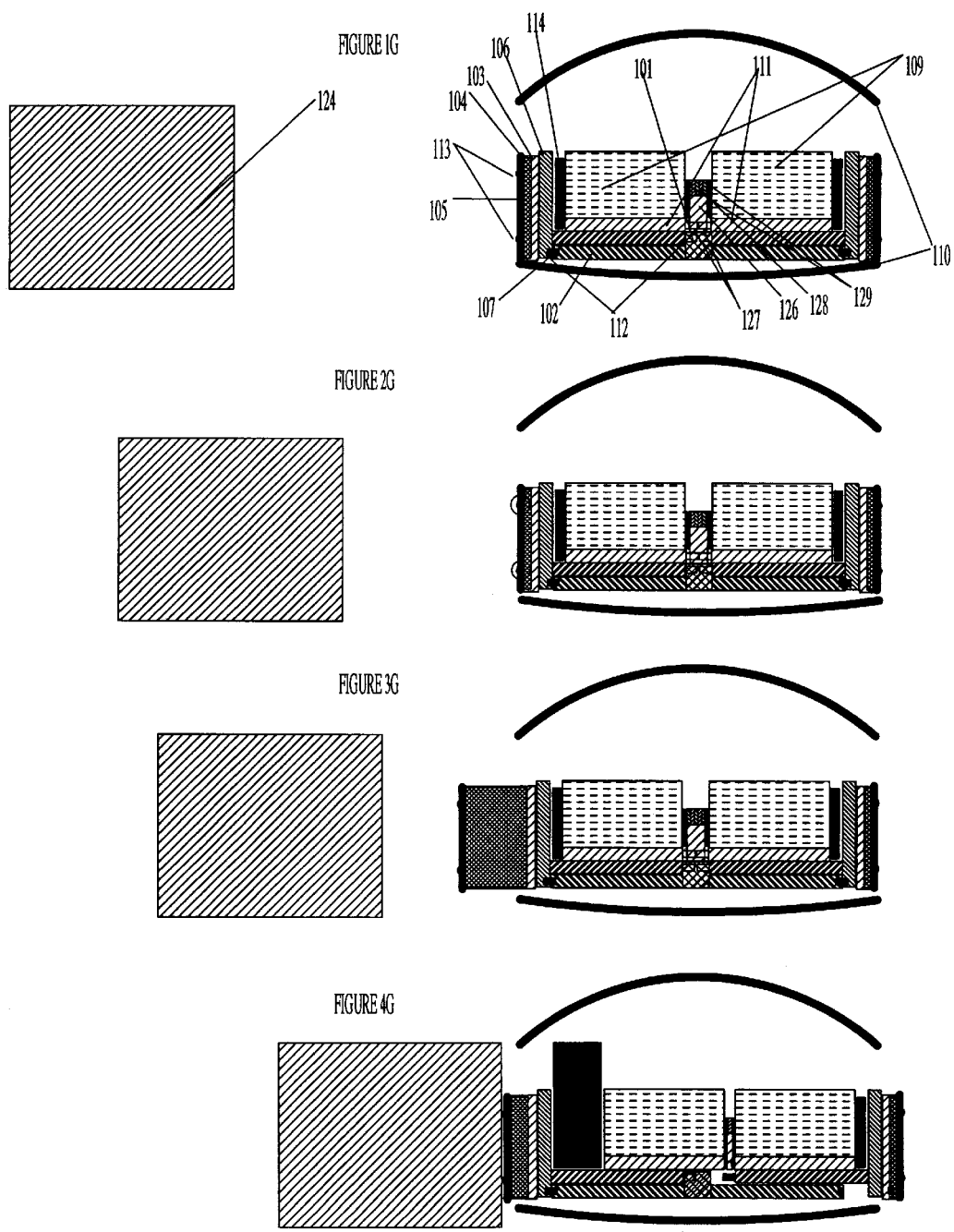

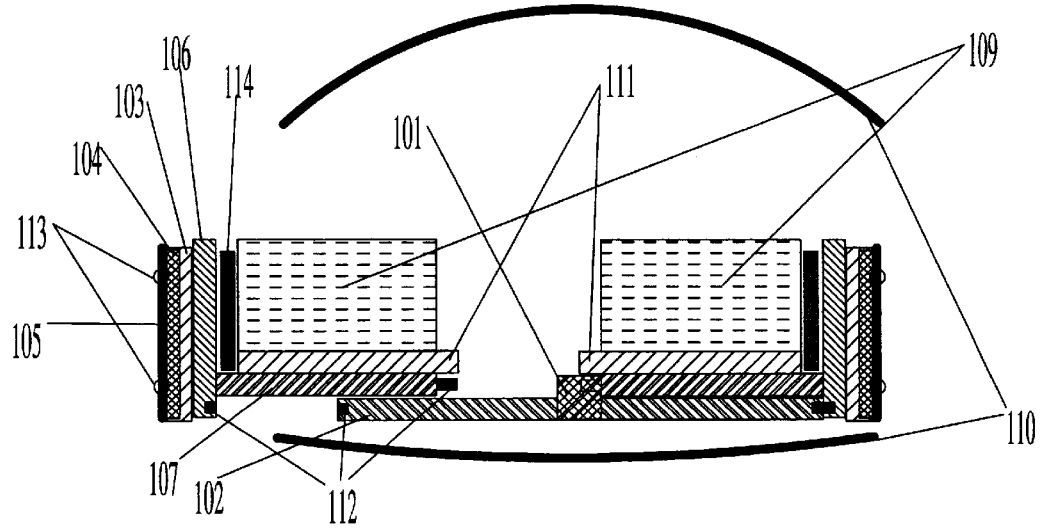
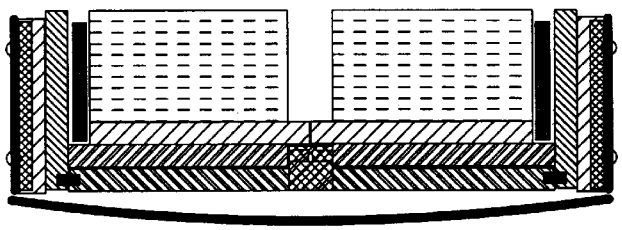

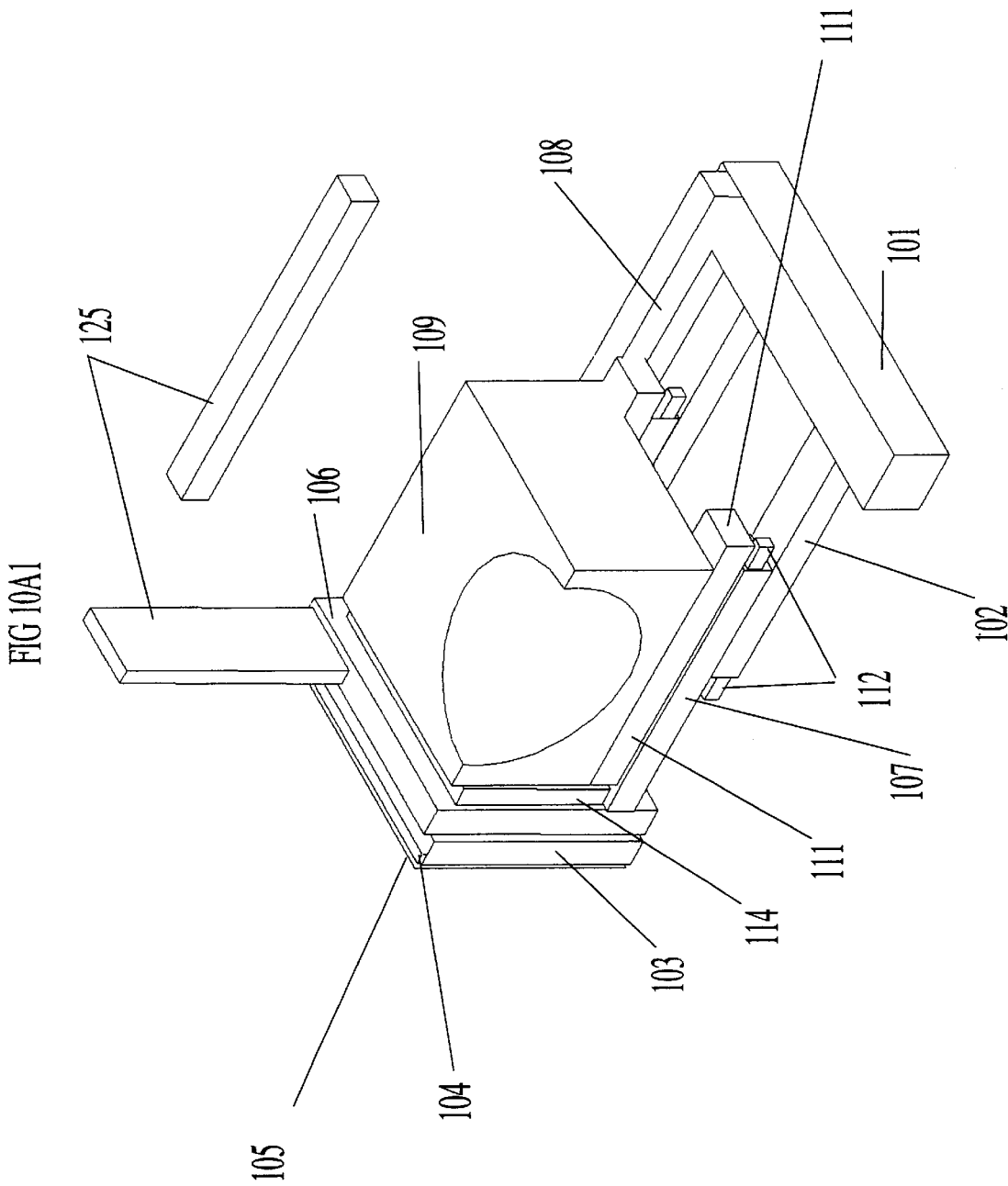
FIG 10A1

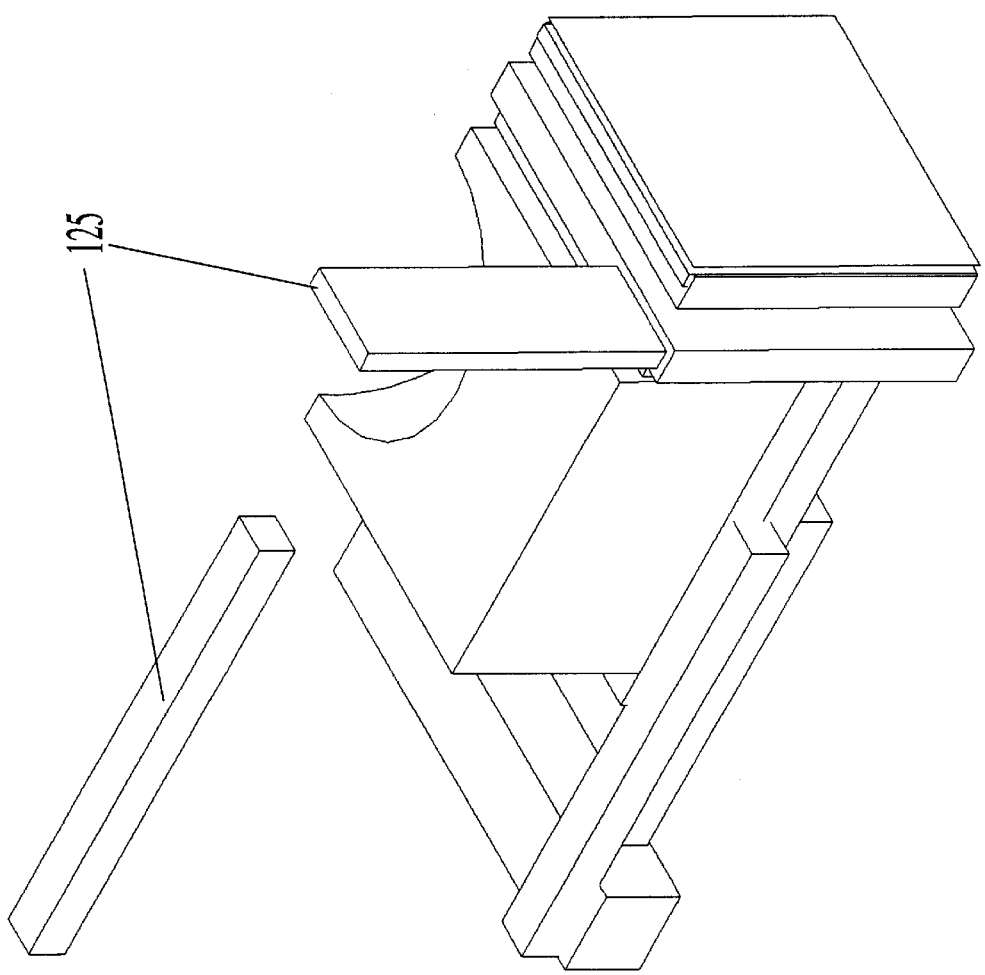
FIG 10B1

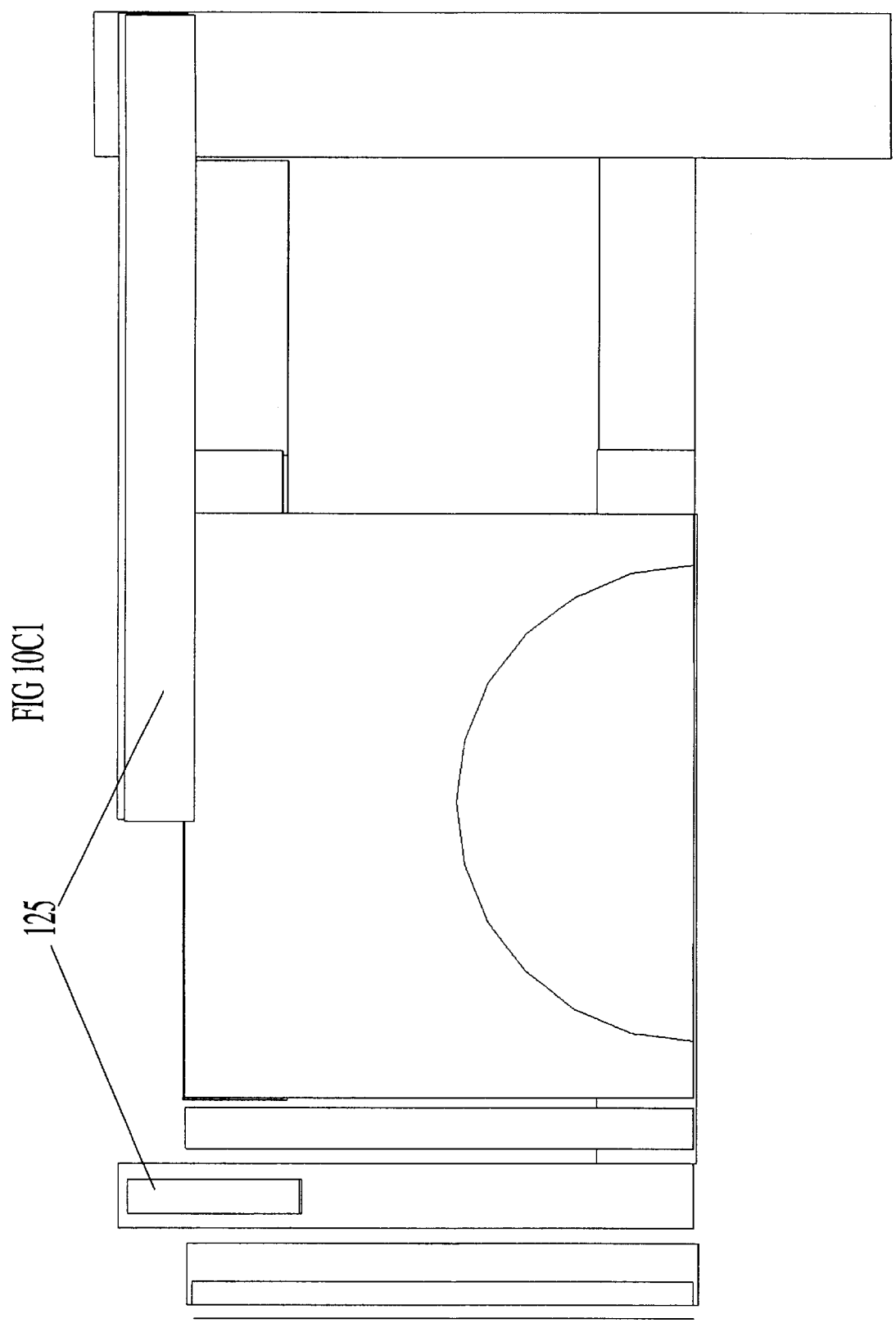

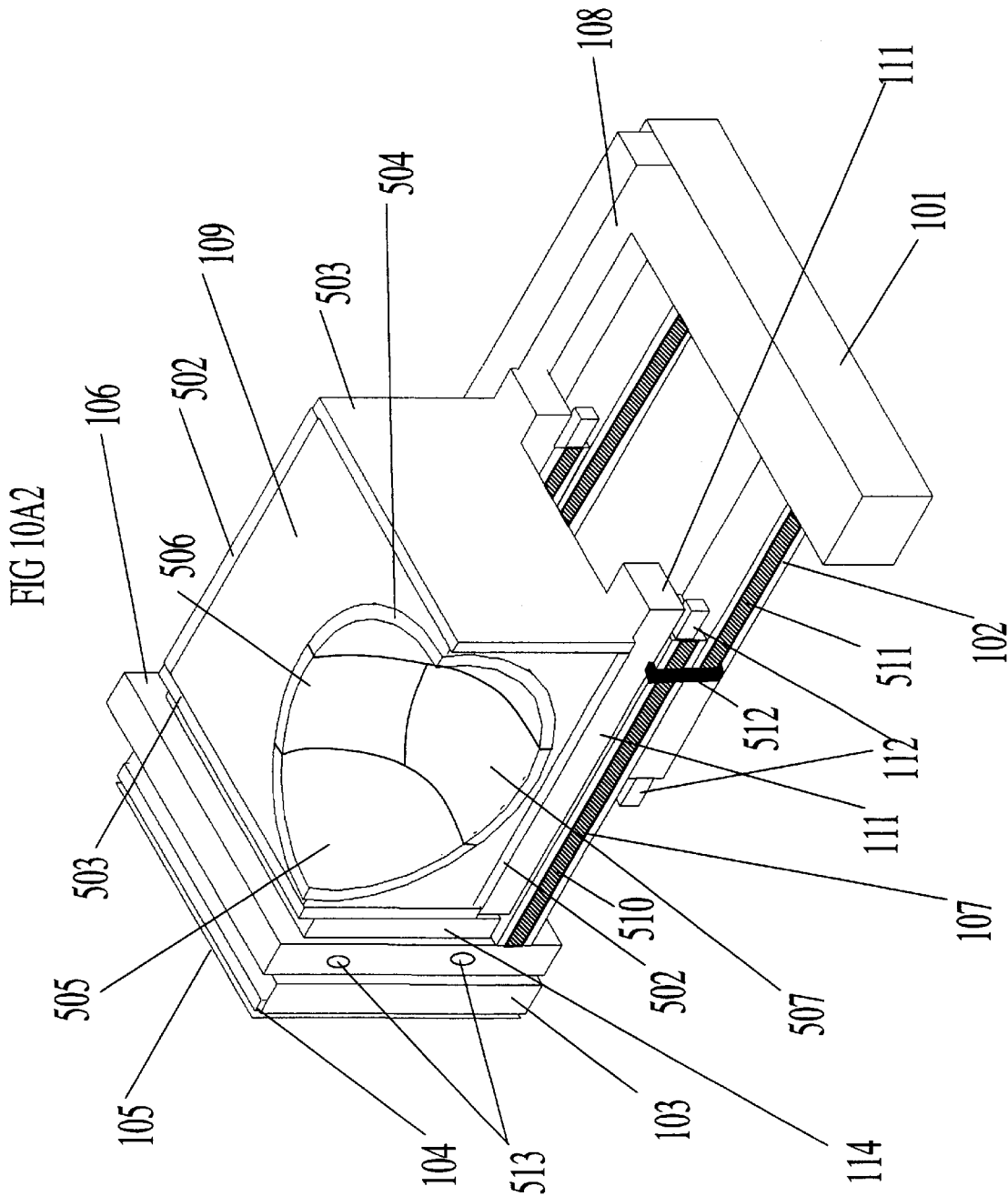
FIG 10A2

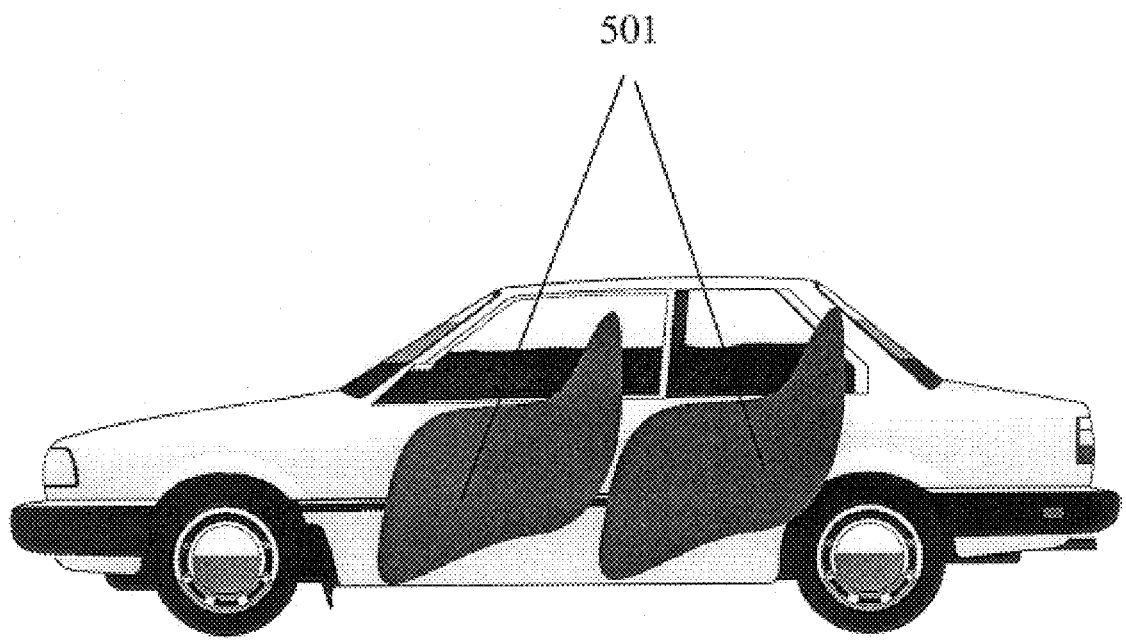
FIGURE 11 Safety Zones
501

FIGURE 12 A1
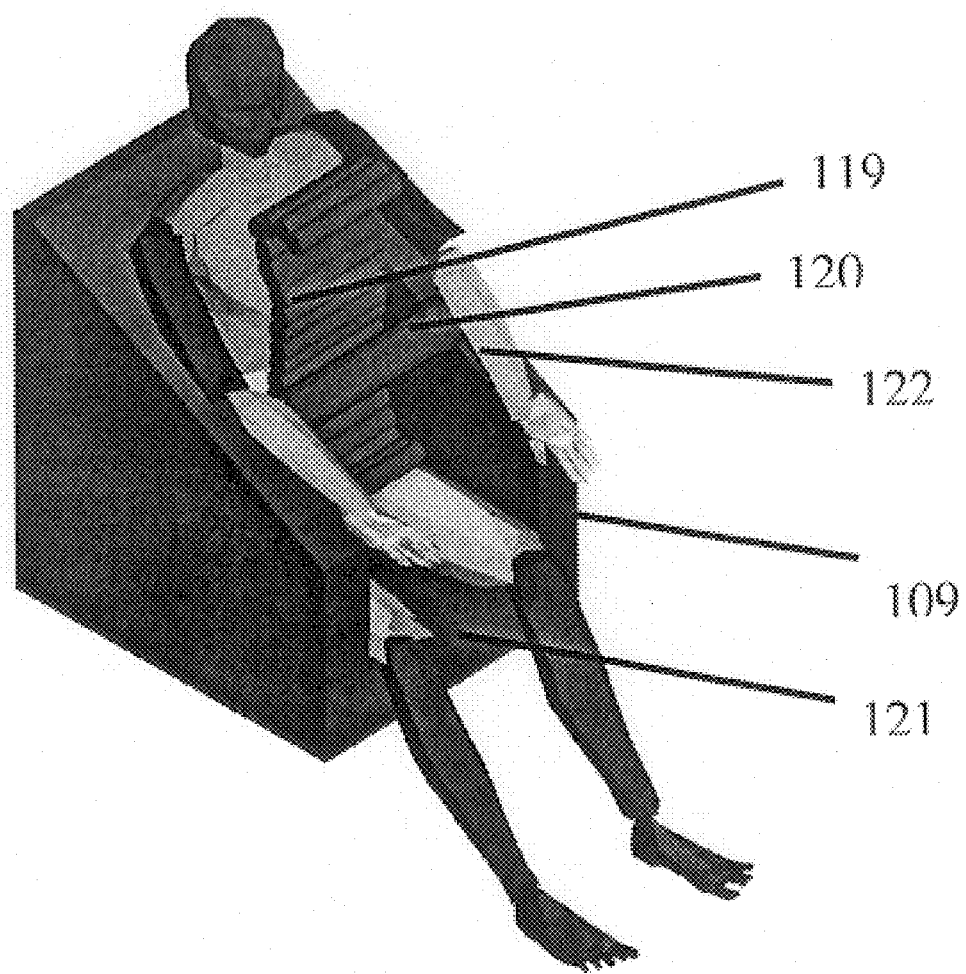

FIGURE 12 B1
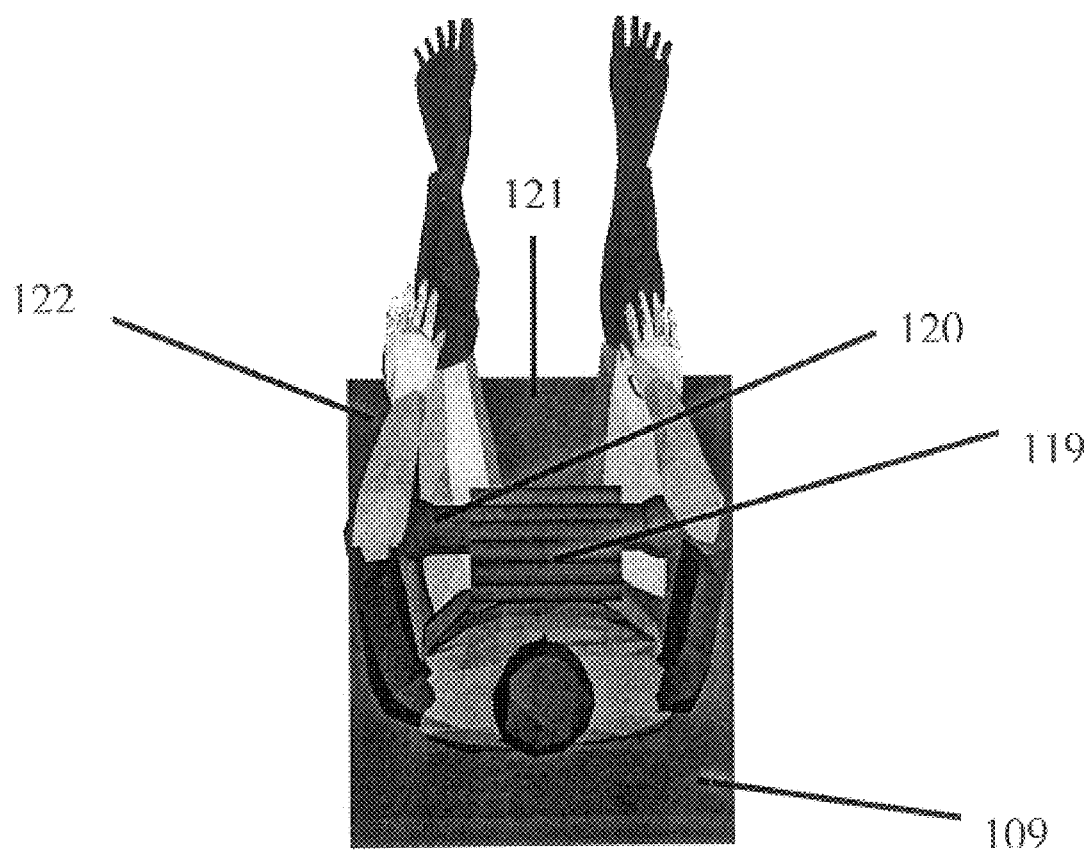

FIGURE 12 C1
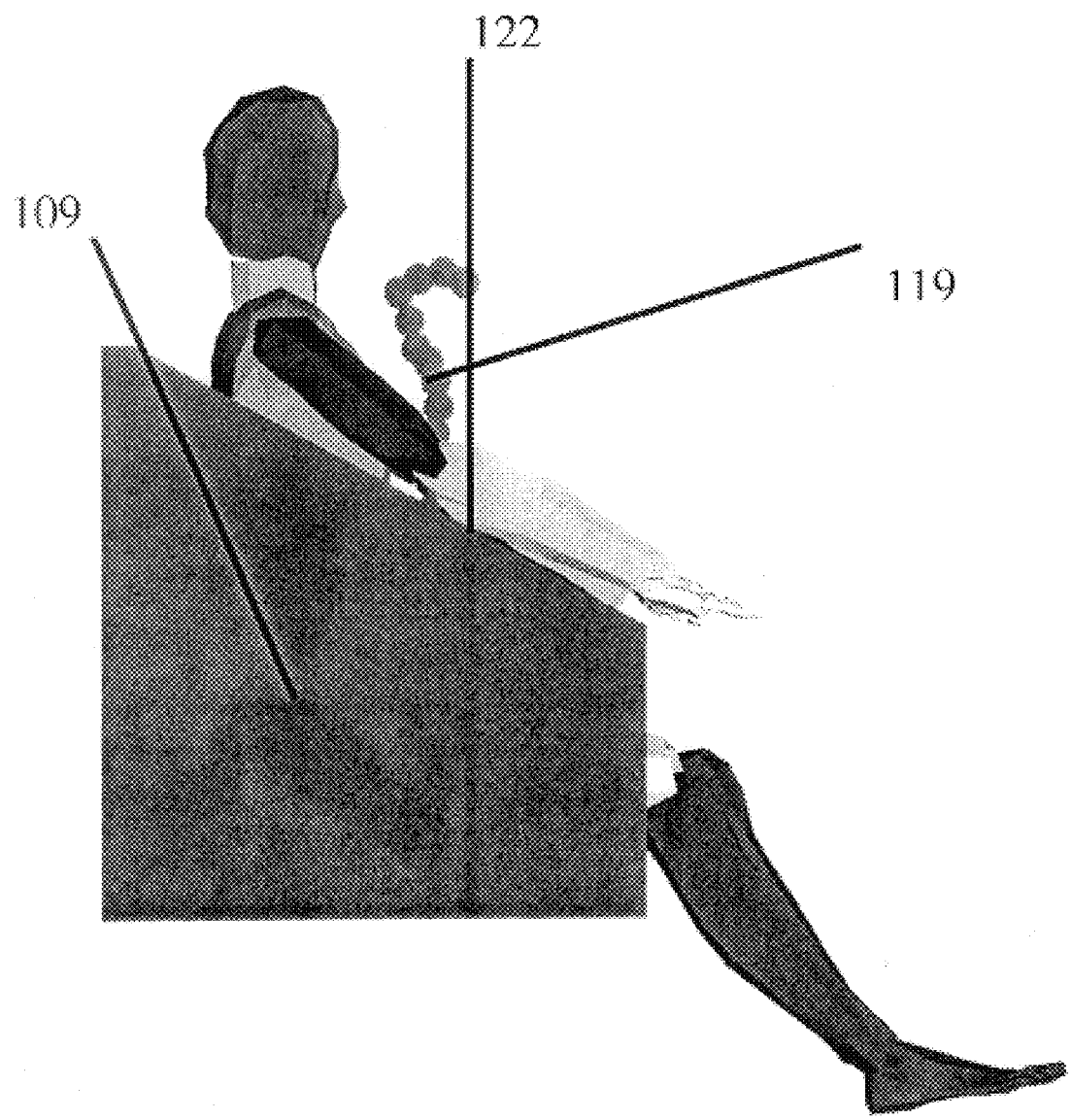

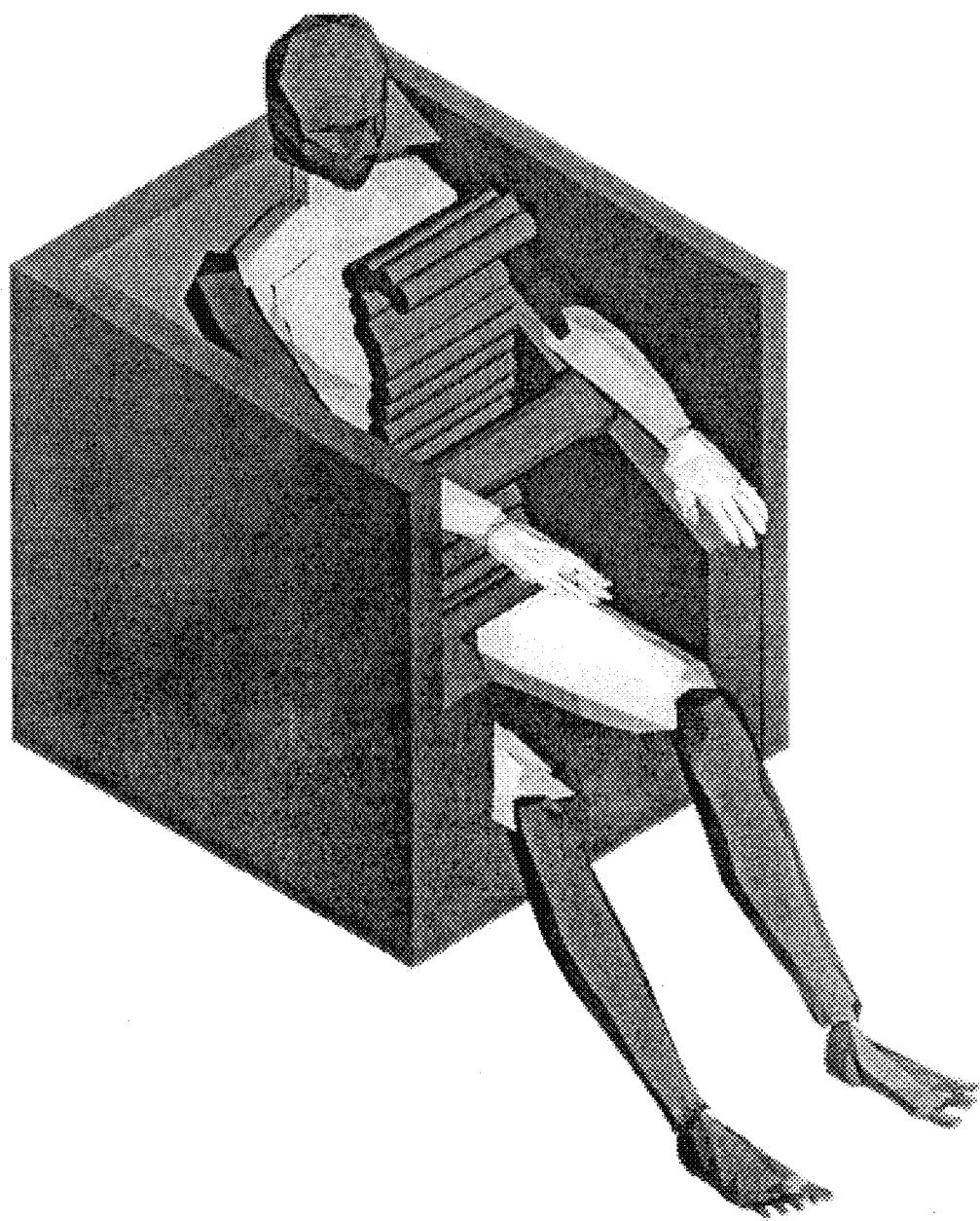
FIGURE 12E1

FIGURE 12 F2
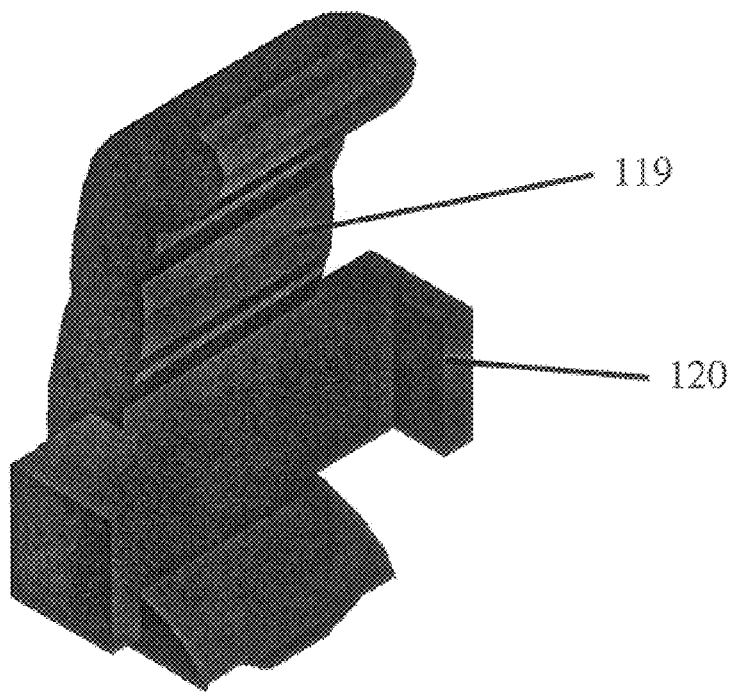
FIGURE 12 G2
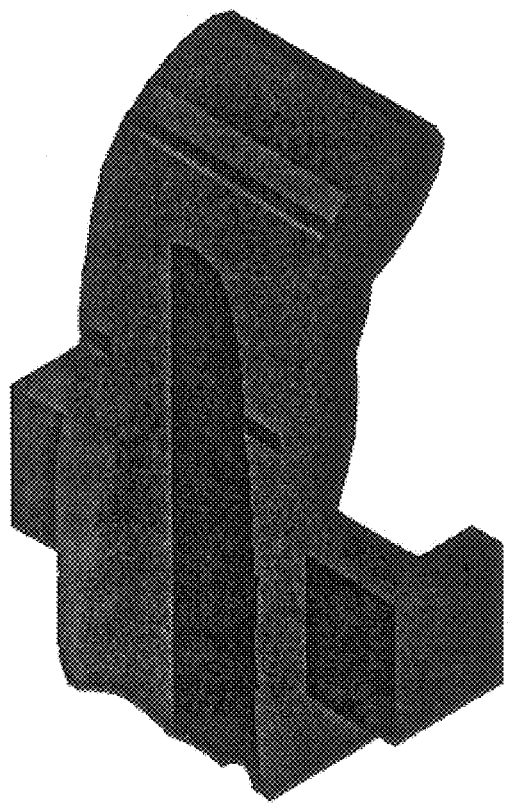

FIGURE 12 H2
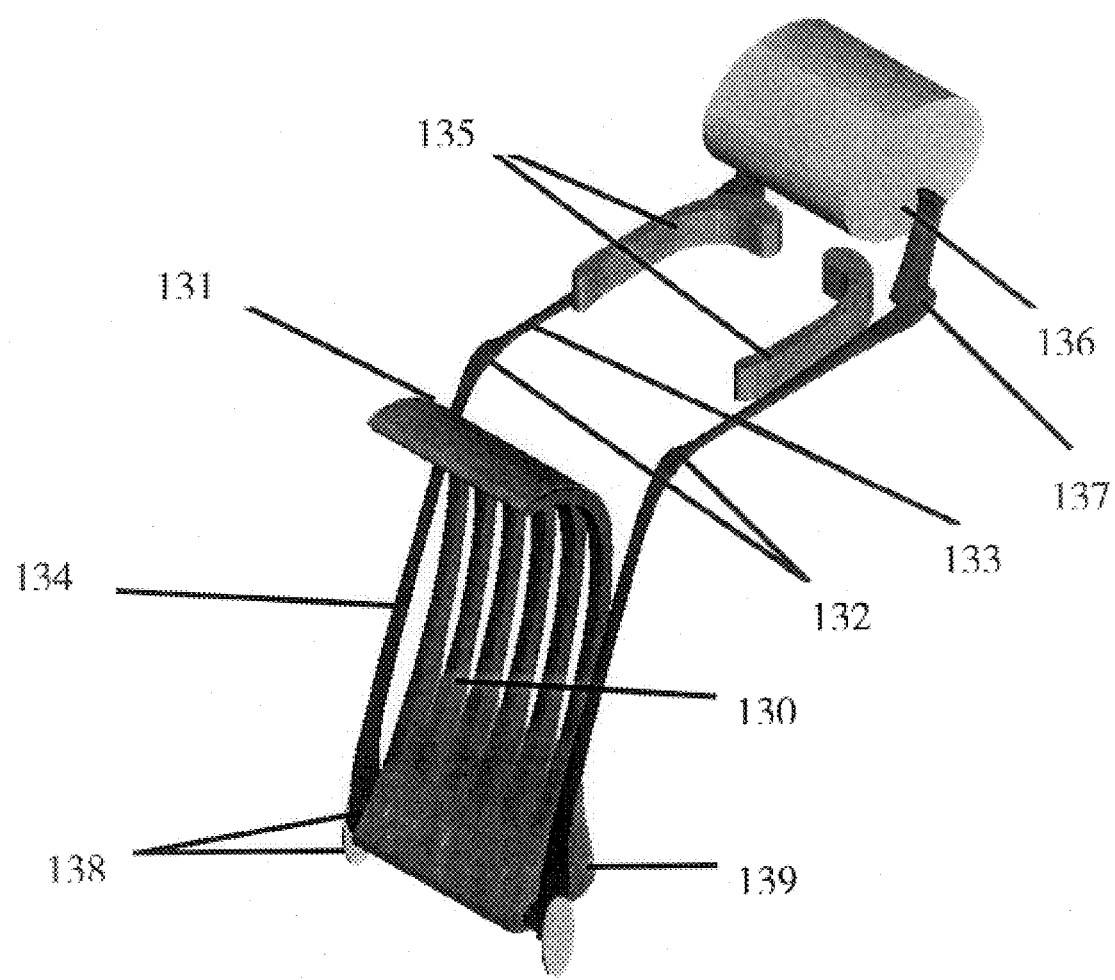

FIGURE 12.12
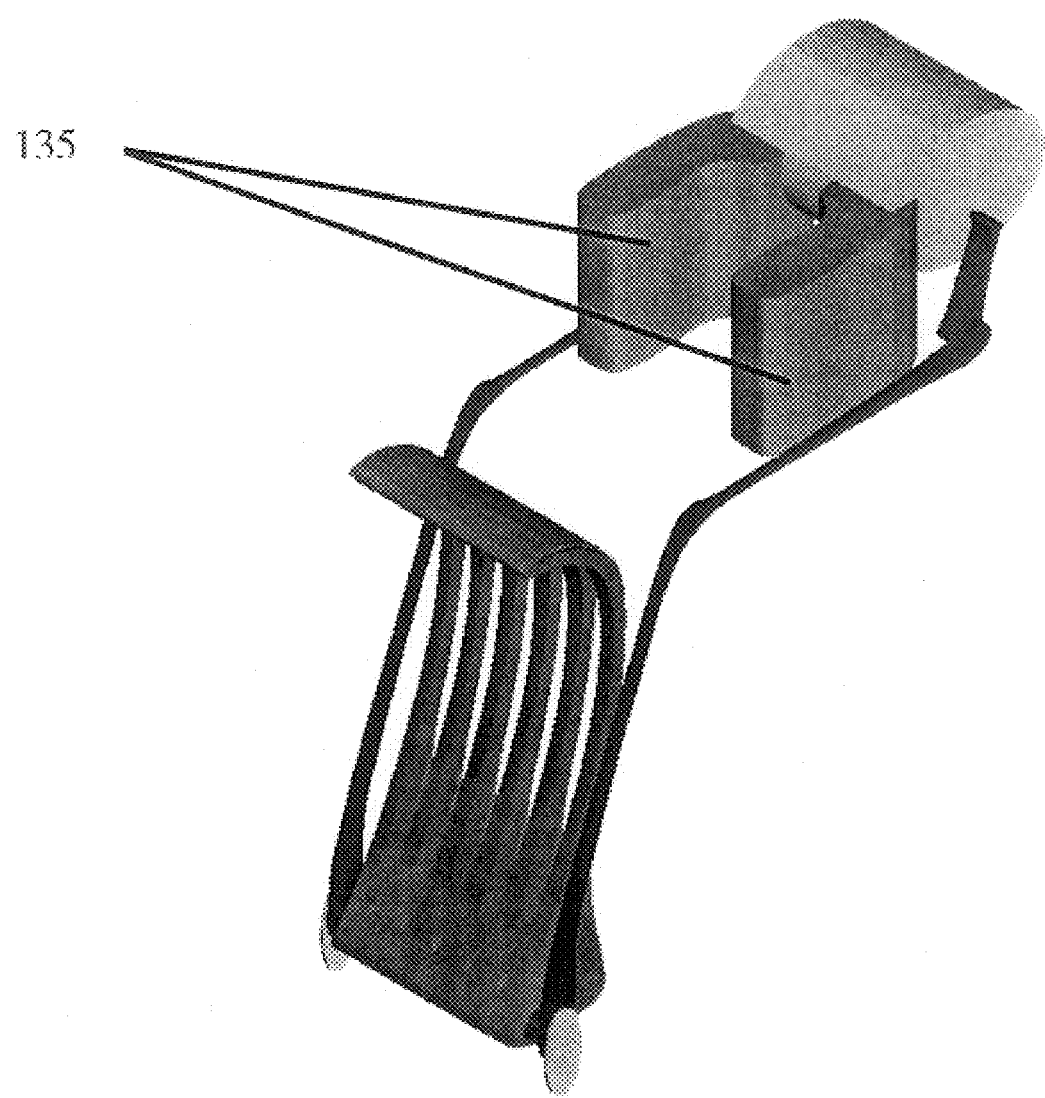

Fig 12 K2
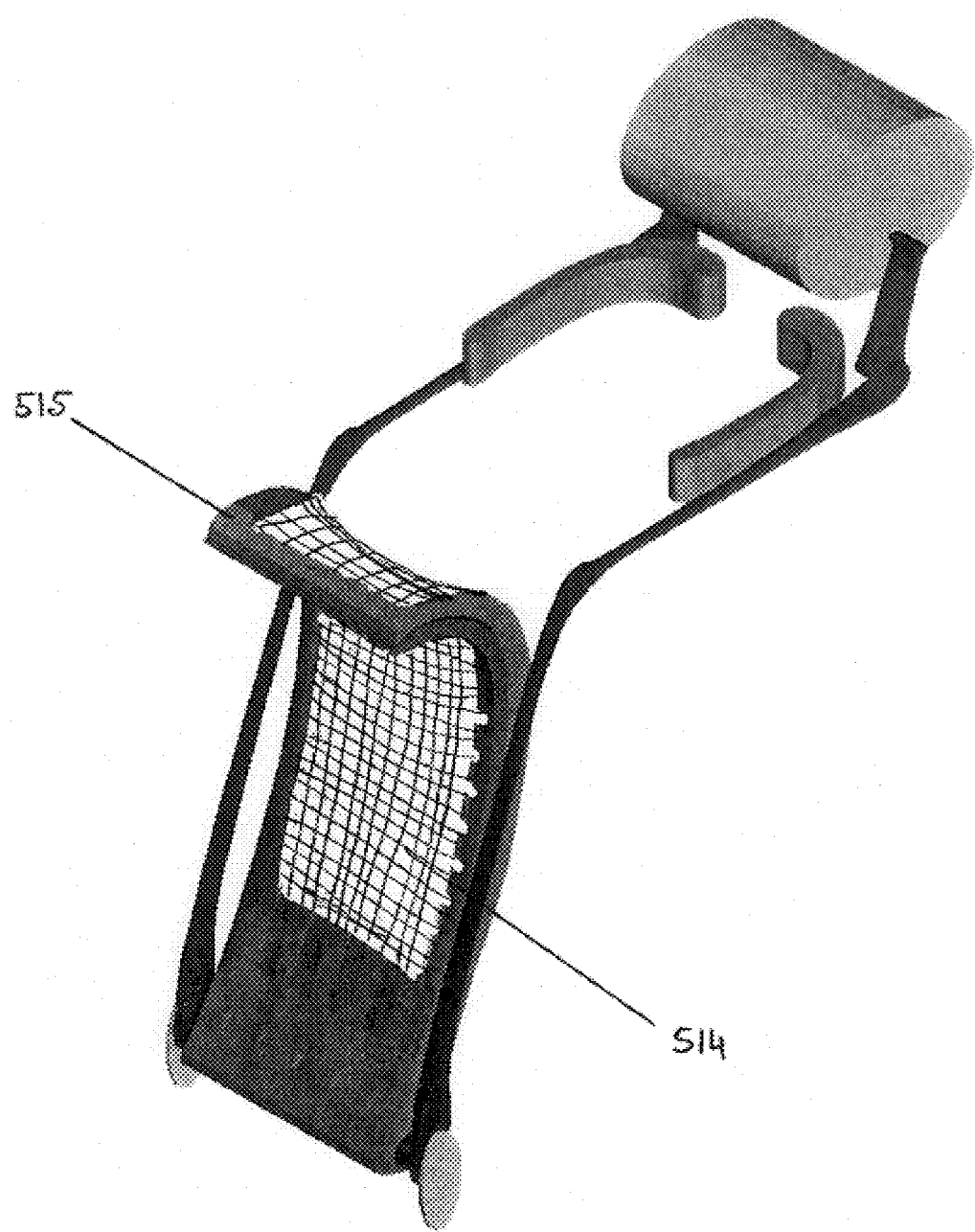

AN ISOMETRIC VIEW

EASY EJECTOR SEAT WITH SKELETAL CRASH SAFETY BEAM

CROSS REFERENCE TO RELATED APPLICATIONS

This application is a continuation in part of the application entitled "Easy Ejector with skeletal crash safety beam" Ser. No. 08/936,626 filed Sep. 24, 1997 and now U.S. Pat. No. 6,059,354 from which priority is claimed, and co-pending with continuation application entitled "Easy Ejector with skeletal crash safety beam" Ser. No. 09/404,475, filed Sep. 24, 1999.

STATEMENT REGARDING FEDERALLY SPONSORED RESEARCH OR DEVELOPMENT

Not Applicable

REFERENCE TO A MICRO FICHE APPENDIX

Not Applicable

BACKGROUND OF INVENTION

1. Field of Invention

The present invention defines a means to incorporate in passenger motor vehicles, unique safety arrangements particularly for lateral or side impacts that provide energy absorption by the mass of the vehicle but decouple the passenger from the impact acceleration and deceleration that is provided by the mass of the vehicle, thereby protecting the passengers during such collisions. Moreover, the same arrangement synergistically provides utility in access, comfort and further safety in the operating position for passengers and the driver.

2. Description of the Related Art

In the past safety of passengers was not always the priority in passenger vehicle design. In the evolution of motor vehicle design the structure moved from a chassis that held together the mechanical components of the vehicle—a structure that was then attached to a passenger compartment or to passenger seats. The design of the structure was to hold together the working components of the vehicle—a critical aspect at the time. Thereafter in more recent times right up to the present, Exo-skeletal designs have been the dominant paradigm. Here rigid shells were constructed to hold both the mechanical components and the passengers in fixed positions. However such fixed shell structures have had limited success in protecting passengers and drivers when there are lateral collisions as passengers undergo the same impact related accelerations and decelerations as the remaining parts of the vehicle, as space limitations don't allow for "crumple zones" as in the case of impact protection for head on collisions. Passengers are particularly vulnerable to side impacts as they cannot take preemptive measures as with head-on collisions where there is speed control and directional control that is available. As vehicle speeds have increased substantially in the last several decades, these safety considerations for passengers have become critical and urgent. Vehicle designers—particularly automobile designers—have risen admirably to the task by incorporating myriads of devices and additions within the rigid shell paradigm to minimize risk in the event of collisions. Such devices include restraints such as seat belts and certain types of protective air bags. However, there are limits within the rigid shell paradigm for two reasons: First, the energy of impact cannot be easily diverted away from passengers into the remaining mass of the vehicle on impact. Second, the rigid shell needs to support high shear stresses on lateral impact and related compressive loads to the passenger compartment of the vehicle a factor that can only be addressed with greater mass of the vehicle that will impact its performance.

Another area of interest in passenger vehicles is to provide, in synergy with the above contributions, utility and comfort of passengers and drivers and further synergistic head-on collision protection.

There are four areas of Background art that are related to the present invention. These are: vehicles with sliding seats, safety arrangements addressing lateral impacts on passenger vehicles, air bags and other shock absorbing devices, and miscellaneous safety devices for frontal impacts. None of the inventions in these areas individually or collectively state or imply any aspects of the present invention. Moreover, none of this Background art even addresses the issue of energy transfer away from the passengers to the mass of the vehicle on impact and concurrently provide a mechanism for easy access to the vehicle with ejector seats. This is despite the urgent need in the car industry for such safety and utility. Moreover the novelty of the present invention is underscored as it provides solutions hitherto unidentified in a very large and competitive industry that is acutely aware of these needs and is constantly in search of new solutions to them.

Sloan U.S. Pat. No. 3,071,407 (1963) describes a single rear bench seat (lines 4–45)—full length (C1–L55), that can slide out of either side of the vehicle. It describes a door structure that may be attached to the seat and slide across and through the passenger compartment of the vehicle as the seat slides out. This invention does not state or imply any safety considerations in its structure, moreover such a bench seat on slides, in the event of a lateral collision on the doors will focus the impact energy on the passengers and these passengers will be the principal casualties as the mass of the vehicle slides away little harmed. This will be the case even in the embodiment described where the doors are fixed to the seat and slides through the passenger compartment with the seat. Moreover, it cannot be used in a front seat even for its limited functionality with doors fixed to the seat as driving instrumentation (steering wheel etc) will not allow a door to slide through the compartment. Finally it does not provide any comfort features for passengers over and above a bench seat. Mach U.S. Pat. No. 2,753,947 (1956) describes a sliding bench seat for the access of the engine of the vehicle it does not address the issue of safety of passengers or access utility. It is expected to perform similarly to Sloan in an impact on the doors or around the side profile of the passengers in the vehicle. Solomon U.S. Pat. No. 2,758,872 (1953) provides a sliding bench seat that goes through the doorway and for the same reasons as Sloan does not provide protection in side impacts or provide any comfort features over and above a bench seat. Cyphert U.S. Pat. No. 3,944,277 (1976) describes a seat mounted on a sliding platform that has a door at the end and protective walls around it. The arrangement being designed for the utility of the operator to reach points away from the body of the vehicle without dismounting the vehicle. This invention like Sloan does not state or imply any safety considerations in its use. Moreover there is no expressed or implied reference to the utility of mounting and dismounting the vehicle or for the comfort of the operator or the passengers except for the ability for the platform to move out to give the operator greater reach away from the vehicle body. Rees U.S. Pat. No. 5,213,300 (1993) describes internal design structure for slide arrangements that allow forward and backward movement of the passenger seats in vehicles. This like many other inventions prior to it relate to the structure of the slides to adjust the position of the seats for passenger comfort in the direction of motion of the vehicle.

All the above items of background art relate to sliding seats. None of the above background art related to sliding seats have stated or implied safety considerations. Moreover, none of them provide utility for mounting and dismounting a vehicle except for a bench seat that slides out on either side of the vehicle, or provide comfort features except for seating arrangement on a bench seat and in one of the above—the lateral movement for convenience of the operator.

Maier U.S. Pat. No. 2,148,950 (1939) provides a laterally braced passenger compartment that braces a rigid shell body of a vehicle. Barenyi U.S. Pat. No. 2,710,222 (1955) provides a stiffening for the bottom plate of a vehicle body. Catlin U.S. Pat. No. 5,660,428 (1997) provides a design for a rigid shell structure . Guertler U.S. Pat. No. 5,464,266 (1995) uses stiffening arrangements for the floor of the vehicle as a component of a rigid shell vehicle body. Masuda U.S. Pat. No. 5,671,968 (1968) describes a strengthened rigid shell for the passenger compartment Oliver U.S. Pat. No. 4,533,172 (1985) describes a three part rigid shell structure for motor vehicles with the central section for passengers Sinnhuber U.S. Pat. No. 5,000,509 (1991) describes an arrangement that transfers impact energy from lateral impacts to the rigid body of the vehicle but does so through rigid members that include elements in the seats. The seats have limited lateral movement and are not free to move independent of the vehicle body in the event of a collision, thereby placing the passengers on the direct path of the energy transfer Maeda U.S. Pat. No. 4,512,604 (1985) describes a lateral brace for the seat arrangement of the vehicle within a rigid vehicle body structure thereby distributing the impact energy to other parts of the rigid body structure. Sacco U.S. Pat. No. 5,435,618 (1995) describes a lateral stiffening element that braces the rigid vehicle body in the region of the seats. Bhalsod 5,716,094 (1998) describes a pusher block that engages the seat in the event of a lateral impact thereby providing a rigid member between the rigid body structure and the seats that can transfer impact energy to the seats.

All of the above items of background art related to bracing a rigid body structure and provide stiffening mechanisms within the rigid shell structure to distribute energy of lateral impact. None of these items of background art provide mechanisms to transfer energy away from passengers in lateral impacts, or provide other safety arrangements or provide utility for mounting and dismounting the vehicle or provide comfort features for passengers in the operating position.

Baber U.S. Pat. No. 5,725,265 (1998) presents airbags for front and rear vehicle bumpers that deploy on impact. Such devices cannot be implemented on the side of the vehicle as a deceleration zone is not available under operating conditions as may be made available in the front and back of the vehicle. Moreover, as this airbag deploys on impact it creates a deceleration zone by pushing its own vehicle away that may actually increase the impulse forces acting on the passengers. Mercier U.S. Pat. No. 3,822,076 (1974) describers similar external front and back airbags and uses probes that protrude from the vehicle at the front and back to deploy the airbags. Such apparatus cannot be installed on the sides of the vehicle, as clearances are small. Stirling U.S. Pat. No. 5,131,703 (1992) describes a fluid filled chamber around the vehicle that will provide a deceleration zone on impact— frontal rear or lateral. However this arrangement requires the deceleration zone to be present during normal operating conditions that will reduce the maneuverability of vehicles if deployed on the sides of the vehicle. Park U.S. Pat. No. 4,995,659 (1991) describes a gas filled chamber deployed around the vehicle. Such a chamber is normally inflated under normal conditions and reduces maneuverability of the vehicle. Campbell U.S. Pat. No. 4,815,777 (1989) describes a bumper that can be deployed selectively by filling with gas. This bumper is effective when extended only. It is not designed to be deployed when the vehicle is in motion , as it will reduce maneuverability. Hartmann U.S. Pat. No. 5,810,427 (1998) describes a mechanism that transfers fluid from one airbag to another on impact. The airbag that is deployed is normally in an extended position to absorb the impact energy and provide the deceleration zone. However, such an extended airbag will reduce the maneuverability of the vehicle. There is a literature ("Extended Bumper and Glass-Plastic glazing methods to reduce intrusion and ejection in severe motor vehicle crashes". C. C. Clark 1993. 26th Symposium on Automotive Technology and Automation. Aachen Germany., "Airbag bumpers inflated just before the crash" C. C. Clark., William A. Young. 1994. SAE Technical Paper 941051., "The crash anticipating extended airbag bumper system". C. C. Clark. 1994. Fourteenth International Technical Conference on the enhanced safety of vehicles. Munich Germany., "Airbags as a means to reduce crash loads and intrusion, and increase intervehicular compatibility." C. C. Clark. 1995. International Conference on Pelvic and Lower extremity injuries-Proceedings Washington D.C., Human Transportation Fatalities and Protection against Rear and Side Crash Loads by the Airstop Restraint" Carl Clark and Carl Blechschmidt. 1965. The Ninth Stapp Car Conference.) IDS, and background art on the construction of external airbags including deployment proactively with radar or other devices. This entire literature is limited to the use of proactive external airbags mounted on vehicles with rigid structures that include the passenger. There is no reference in this literature to the proactive detection of impact explicitly or implicitly creating a deceleration zone for passenger protection internally, relative to the vehicle as in the present invention. Moreover, this literature is focussed on external airbags for front impact protection with for example rigid penetration buffers to negotiate posts and trees, unlike the present invention which does not prescribe external airbags for front impacts. Furthermore, as this literature describes external airbags without perforation shields their implementability is questionable as, unlike internal airbags that are in relatively protected environments, impact with external airbags often occurs with objects with sharp points and edges that are likely to perforate the external airbags. The Present invention requires perforation shields for external airbags.

All the above items of background art relate to air bag devices for safety in vehicles. However, none of these references take the integrated approach of the present invention, as more fully explained below, which comprises proactive deployment of both internal and external air bags, together with sliding seat members and other devices. Moreover while the present invention can function even without the deployment of external airbags, either proactive or reactive, taken together these items provide protection for passengers which is more than the sum of the parts. Furthermore, none of the protection airbags disclosed, related to external air bags having protective perforation shields that further enhance their efficacy. Moreover none of these devices provide energy transferring mechanisms away from the passenger in a lateral impact or provide other safety features. Moreover they do not provide any utility features for passengers in mounting and dismounting the vehicle or provide comfort features to the passengers.

Perras U.S. Pat. No. 2,873,122 (1959) which describes an invention where upon a head-on collision the seat projects a curved protector around the passenger designed to protect the passenger. This curved protector retracts into the seat under normal operating conditions. It is not clear how effective such a mechanism will be as the acceleration of the passenger forward relative to the vehicle may precede that of curved protector's release from the seat. Satzinger U.S. Pat. No. 3,961,805 (1976) describes seat belts for frontal collisions that provide safety for vehicles. Such seat belts are in common use. However, they suffer from the drawback that they restrain the body of the passenger in the narrow regions covered by such belts which may cause injury as other parts of the body are not restrained. Moreover such belts are not popular, while in common use as the belts are in constant contact with the body—a factor that is not often relished. Pulling U.S. Pat. No. 3,981,520 (1976) describes an arrangement where that provides passenger movement and protection in frontal impacts. On impact the passenger moves in the vertical plane of motion to a more protected position while side firing airbags provide frontal protection. This system of deployment of airbags for frontal collision protection is similar to other frontal airbag systems. They are necessary as restraining systems during the collision but need to be retracted in conventional passenger compartments to give passengers access to their seats while mounting and dismounting the vehicle. Erickson U.S. Pat. No. 2,777,531 (1957) describes an invention that rotates the seat of the passenger thereby restraining and protecting the passenger on impact taking advantage of the inertia prior to impact to endow the passenger with rotational energy that changes the position of the seat. Such rotation can injure the passenger with impacts at present day passenger vehicle speeds.

All the above items of background art relate to frontal impact protection. None of these items provide a device that is normally deployed during operation, and provides a broad area of restraint across the body for the entire upper body, head and neck, without a need for changing the orientation of the passenger. Moreover none of these items provide any protection for side impacts or provide utility for mounting and dismounting the vehicle or for the comfort of the passengers in the operating position.

SUMMARY

In view of these prior references what would be useful is an arrangement that diverts the impact energy in lateral or side impacts away from the passengers to the remaining mass of the vehicle thereby protecting the passengers, and in the same arrangement provides utilitarian access to the vehicle, such utilitarian access making it possible to both install multi-element contoured surround seats for passengers and the driver, and also a safety device for head-on collision protection that obviates the need for conventional seat belts and front impact airbags. Moreover, it would be useful to have a synergistic structural arrangement for the vehicle that targets strength of the vehicle to protect passengers while minimizing other massive elements in the vehicle.

The present invention includes these objects and advantages.

OBJECTS & ADVANTAGES

Some of the objects and advantages of the present invention are, to provide an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-à-vis the remaining mass of the vehicle. Furthermore the present invention differs sharply from the Background art in that the resulting structure synergistically permits the installation of contoured multi-element surround seats and a unique safety harness that protects passengers in head-on collisions, both of which may not be implementable without the slide or other moving arrangements for seats on either side of the vehicle in the present invention.

Another object and Advantage of the present invention is the gravity slide drive and a related shock absorbing arrangement relative to the fixed body members of the vehicle ad the terrain traversed by the vehicle, for my arrangement for which there is no counterpart in the Background art. This allows further Utility and weight and energy saving in implementing the above elements of the present invention.

Another Object and Advantage of the present invention includes External side Airbags that differ sharply from the Background art in that for the first time they proactively create a "Just in Time" deceleration zone both for the passenger relative to the vehicle and also for the vehicle relative to the impacting body, for the lateral or side impact while not remaining in an extended position under normal operating conditions of the vehicle.

Another Object and advantage of this invention is a perforation resistant shield for external airbag protection that would reduce the probability of deployment failure. The background art does not provide for this function in externally deploying airbags.

Another object and advantage of the present invention is a indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

BRIEF DESCRIPTION OF DRAWINGS

FIG. 1 is an illustration of a front elevation of a seating arrangements in a passenger vehicle. This figure is an illustration of the invention in the normal vehicle operating condition. The impacting body is represented on the left as still distant but advancing towards the above passenger vehicle.

FIG. 2 is an illustration of the same vehicle arrangement as in FIG. 1, except that the impacting object has advanced towards the passenger vehicle adequately to trigger the distance and velocity sensors.

FIG. 3 is an illustration of the same vehicle as in FIGS. 1 and 2, except that the distance and velocity sensors have deployed the external Airbags. They may also provide delayed deployment of the internal Airbags.

FIG. 4 is an illustration of the same vehicle as in FIGS. 1, 2 and 3 except that the impacting object has made impact with deceleration and energy absorption provided by the External airbags and the shock absorbers and resisted by the mass of the vehicle through compression members as noted below. The Passengers and seats are free to move away from the impact on the secondary slides as the internal Airbag deploys, pushing out the Primary slide on the side away from the impact.

FIGS. 1D, 2D, 3D and 4D illustrate an alternative embodiment with the shock absorbers mounted internal to the protector shield.

FIGS. 1C, 2C, 3C and 4C illustrate an alternative embodiment that has an auxiliary beam mounted behind the seat with a high section of the central member of the skeletal structure behind the seat to abut the auxiliary beam.

FIGS. 1F, 2F, 3F and 4F illustrate an alternative embodiment with a center console that is crushable (an element of "crushable elements") and as a result decreases the need for the ejection of the passenger on the further side of the vehicle at impact.

FIGS. 1G, 2G, 3G and 4G illustrate an alternative embodiment with center airbags (also an element of "crushable elements") that are a part of a passive airbag system to protect passengers during lateral impact by absorbing some of the impact energy but more importantly providing a means to inflate head and neck protection airbags and other anatomical micro cushions mounted in the vicinity of the human body. This particular embodiment has a crushable center console as well.

FIGS. 5 and 6 is an illustration of the seating arrangement as used for loading and unloading passengers and driver. FIG. 5 represents the open position and FIG. 6 represents the closed position.

FIG. 7 is an illustration of the Gravity Slide drive at the end of the unload cycle for passengers. FIG. 8 is an illustration of the Gravity slide drive at the beginning of the Load cycle for passengers. FIG. 9 is an illustration of the left side loaded and ready for operation of the vehicle and the right side at the start of the loading operation, emphasizing the independence of the two sides of the Gravity slide drive mechanism.

FIGS. 10A1, 10B1 are isometric views of an alternative embodiment with a vertical extension/"safety cage" to protect passengers further. FIG. 10C1 is a plan view of the same arrangement.

FIG. 10A2 includes the Reinforcing - Safety Beam Upper Element, Reinforcing - Safety beam lower element, and the anchor bracket.

FIG. 11. is an illustration of the position of the "Safety Zones" that are targeted for protection with the Protector shields.

FIG. 12A is an illustration of an isometric view of the Seat arrangement. FIGS. 12B and 12C is an illustration of the Plan and Side Elevation of the seat arrangement. FIG. 12A1 illustrates an alternative embodiment of the seat arrangement. FIGS. 12B1 and 12C1 illustrate the plan and elevation of this embodiment. FIG. 12D1 illustrates an embodiment of the child seat. FIG. 12E1 illustrates an embodiment with a different external profile for the seat providing greater protection to the passenger. FIGS. 12F2 and 12G2 illustrate isometric views of an embodiment of the safety harness and 12H2, 12I2, 12J2 illustrate an isometric view of another embodiment of the safety harness, in the normal state, with front impact anatomical passive micro aircushions deployed, and the head and neck anatomical micro air cushions deployed respectively. FIG. 12K2 illustrates the net structure for a safety harness and a related frame for its support.

LIST OF REFERENCE NUMBERS

Figure 1B:
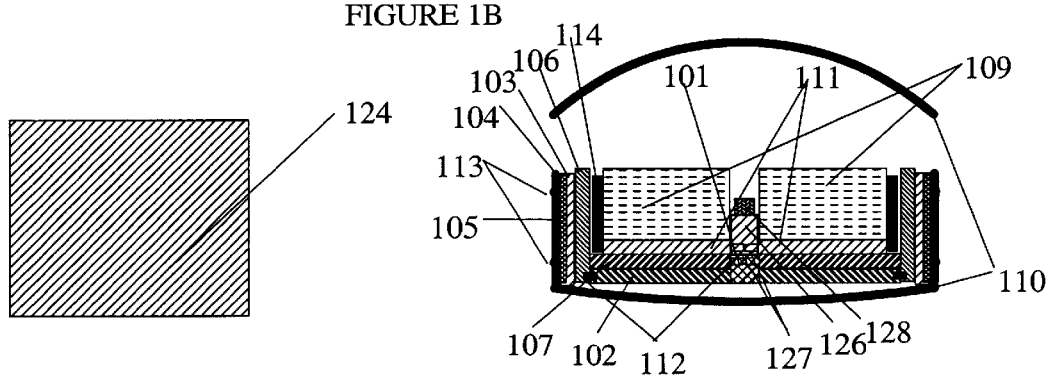
FIGS. 1B, 2B, 3B and 4B illustrate an alternative embodiment with a center console.

101—Central Member of Indo-skeletal structure
102—Safety Beam Lower Element/Lower Primary Slide
103—Side impact shock absorbers
104—External Air Bags
105—Perforation Shields
106—Protector Shields
107—Safety Beam Upper Element/Upper Primary Slide
108—Auxiliary Beam.(fixed or sliding)
109—Multi-element contoured passenger seat
110—Vehicle Shell/Body
111—Secondary Slides/Impact decouplers
112—Locking devices
112 A-Pivot for Protector shield
113—Proactive Velocity/Distance Detectors
114—Internal side impact airbag
115—Spring device for manual slide
116—Inside door open button
117—outside door open button
118—Beam pivot for Gravity slide drive ejector 119—Safety Harness
120—Support for Safety Harness
121—Bottom of seating surface of the contoured seat
122—Contoured arm rests
123—Child seat attachment
124—Impacting body
125—Vertical extensions/Safety Cage (fixed or sliding)
126—Center console
127—Secondary slide/Center console locks
128—Instrumentation
129—Center airbags-energy absorption/passive head and neck anatomical airbag system
130—Safety Harness Shield
131—Safety Harness—Anatomical passive micro air cushion and visco-elastic buffer
132—Safety Harness elbow
133—Safety Harness extending upper arm
134—Safety Harness Pivoting lower arm
135—Safety Harness Head and neck anatomical micro aircushions (active or passive)
136—Safety Harness Adjustable Head restraint
137—Safety Harness Hinged support
138—Safety Harness Locking Support
139—Safety Harness passive micro aircushion air reservoir
140—Adjustable Hinge support on seat
141—Foot rest
142—Sacrificial chamber
143—Micro air-cushion—displacement function
144—Micro air cushion—support function
145—Valves—air flow/fluid flow
146—protected entity
147—Fluid paths
501—Safety zone
502—lateral support element
503—reinforced seat side
504—left support adjustable multi-element
505—right support adjustable multi-element
506—back support adjustable multi-element
507—bottom support adjustable multi-element
510—Reinforcing—Safety beam upper element
511—Reinforcing—Safety Beam Lower Element
512—Anchor Bracing Bracket
513—Passenger Protection Detectors
514—Net Strature for Harness
515—Frame for Net Structure for Harness
516—Retractable Canopy

DETAILED DESCRIPTION OF INVENTION

The present invention provides a passenger vehicle a structure that synergistically incorporates two functions. First, during lateral or side impacts, a means to decouple from impact, and protect passengers while projecting the remaining mass of the vehicle to decelerate the impacting body, and second, utility to passengers and drivers, in mounting and dismounting the vehicle with the comfort of contoured surround seats. The arrangement may in some embodiments use an indo-skeletal beam that allows such embodiments to rely on compressive force transmission to transfer impact energy to the mass of the vehicle rather than shear loads that are required in the shell paradigm of construction in most current passenger vehicles.

The present invention may use Primary and Secondary slides on each side of the vehicle, to meet these objectives. The Primary slide has among other attached devices, a protector shield that bears the impact force in lateral or side impacts. Such protector shields may be hinged out for access if the sliding arrangement is not used. The Primary Slide may engage a central indo-skeletal beam in some embodiments. The Secondary slide is attached among other devices to possibly contoured surround seats (the passenger support mechanisms). This slide may be activated under impact to guide passengers in their seats away from the impact zone.

The present invention may utilize a Safety Beam in the vicinity of the seats. However, there is an important advance over the Background art in that the Beam does not lock the passengers on the path of the energy transfer, but rather, conducts the energy of impact away from the passenger to the indo-skeletal frame or to the body members of the shell (collectively elements of the fixed body members) and thereby to the mass of the vehicle (the massive components of the vehicle such as but not without limitation the motor and vehicle frame) allowing independent motion of the passengers away from the impact.

The present invention may use proactively fired external airbags which for the first time provide a means to create a "Just in Time" deceleration zone on the side of a vehicle prior to impact but not deployed under normal operating conditions of the vehicle. Notably, Background art for external airbags that are either extended under normal operating conditions of the vehicle or require reactive deployment cannot function effectively, as the former will impede the maneuverability of the vehicle and the latter will not be able to create a deceleration zone in time for the impact.

The following descriptions are for embodiments of the present invention. Deviations from this description in an embodiment is possible without deviating from the present invention.

PREFERRED EMBODIMENT

The following is a detailed description of some of the components of this embodiment. The seating arrangement of a passenger vehicle is shown in FIG. 1. The cross section of the central member of the indo-skeletal structure (101) is fixed to the safety beam lower element (102). The Protector Shield (106) is firmly attached to the Safety beam Upper element/Upper Primary slide (107), which slides on the Safety beam lower element/lower Primary slide (102). (The terms upper and lower bed used for the slides to distinguish them and not representing a relative elevation of the slides). The construction of such protector shields would follow that of any impact resisting body panel member of a vehicle, with the usual weight strength tradeoffs. Such construction is well disclosed in the background art. The sliding arrangement may use single element or multiple element direct contact low friction surfaces sliding on one another, roller bearings, ball bearing structures—all of which are well disclosed in the background art. The Protector Shields (106) are designed to cover the required "safety zone" (501) as noted on FIG. 11. The Safety beam upper element/upper Primary Slide (107) locks into the Central member of the indo-skeletal structure (101) in the operating position with locking devices (112). Such locking devices do not take any additional loads on impact, and may as a result follow the extensive background art for locking devices for example similar mechanisms to those used in automobile door locks. These locks may be activated by the ignition key switch for additional safety while the vehicle is operational. The Protector Shield (106) has attached on the outside a shock absorber (103), which may include external airbags (104). (the protector shield in this embodiment provides a protective skin on the side of the vehicle) The construction of such shock absorbers follow the background art. Such external airbag (104) are protected from sharp objects on impact by a Perforation Shield (105). These perforation shields protect the external airbag (and the passenger) from sharp objects. The construction of such perforation resisting shields are well disclosed in the background art. Such Perforation shields may be attached by conventional means to the outer surface of the airbag and retained in the normal operating position using techniques used for airbags both internal and external disclosed in the background art. The Air Bag (104) is deployed with distance and velocity sensors (113) mounted on the Perforation shields (105). Distance and velocity sensors are used in other applications and their construction is well disclosed in the background art. The Safety beam upper element/Upper Primary Slide (107), supports the secondary slide/Impact decouplers (111). In this embodiment this is firmly attached to the Safety Beam Upper element/upper Primary Slide until the impact when it is decoupled to slide away from the impact. The Secondary slide arrangement may use a friction based approach, or other approach, all of which are well disclosed in the background art. This embodiment has contoured surround Passenger Seats (109) that are mounted on the Secondary slides (111). These seats have internal Airbags (114) that deploy on impact and may "unfurl" upwards to protect the head or upper body as well. The construction of seat adjustment mechanisms are well disclosed in the background art. This Figure shows the impacting object on the left approaching the vehicle, but too distant to trigger any action.

Figure 2B:
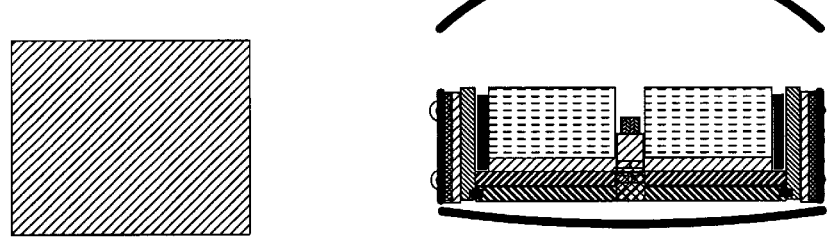
Figure 3B:
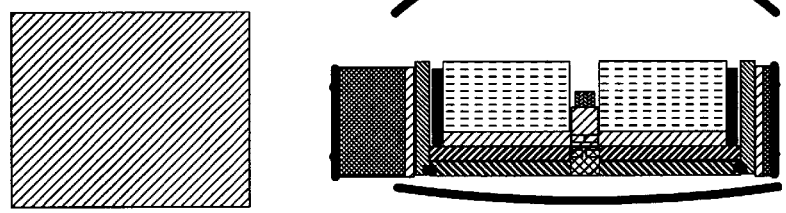
Figure 15:
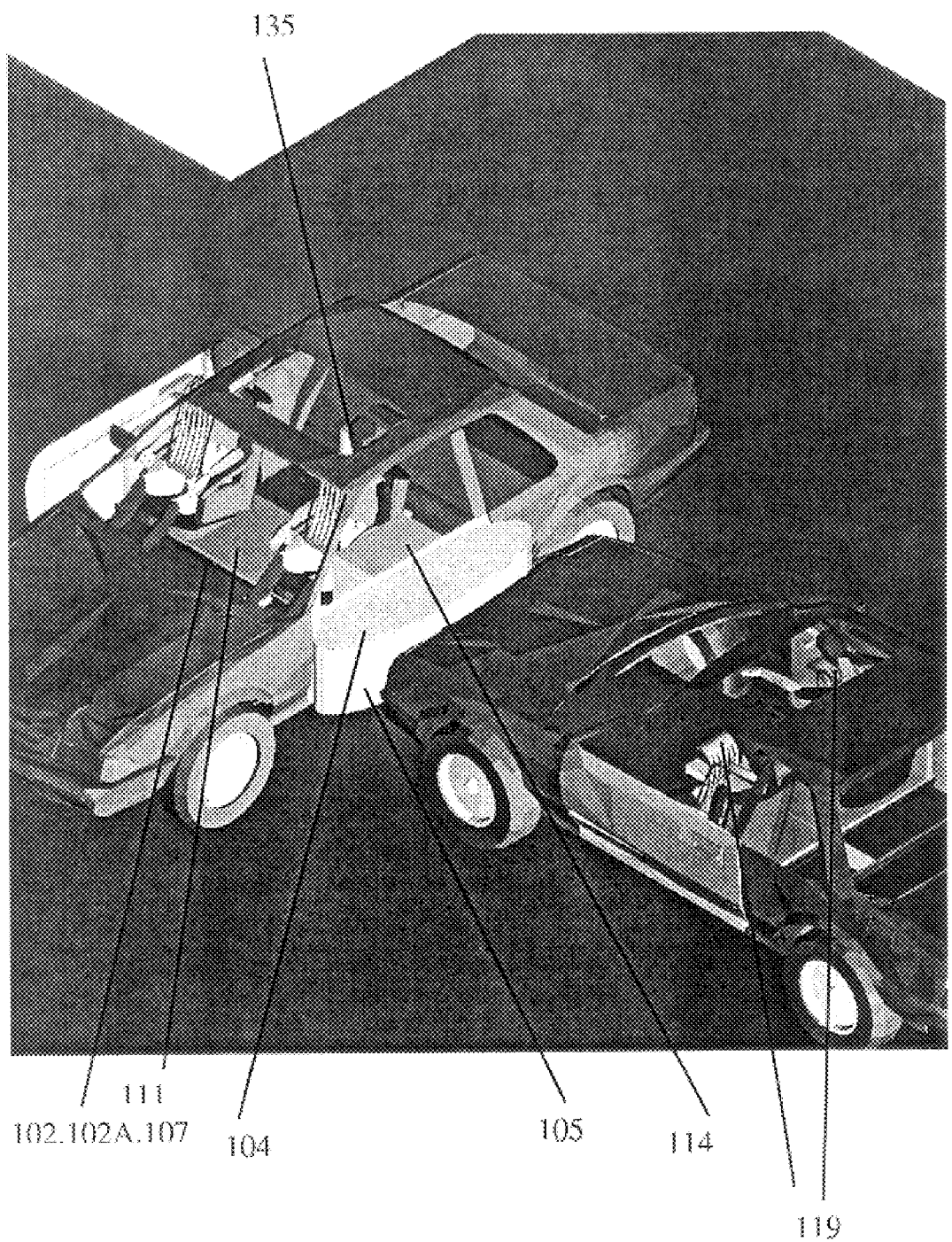
FIG. 15A illustrates a side impact with internal and external airbags deployed and the passengers ejected away from the impact.
FIG. 15B illustrates the deployment of the anatomical passive micro aircushions in a front impact and the passenger impact protection with the harness and shield. The left side passenger illustrates the normal position for reference.
FIG. 15C illustrates a detailed view of the safety harness and its components.
Figure 15:
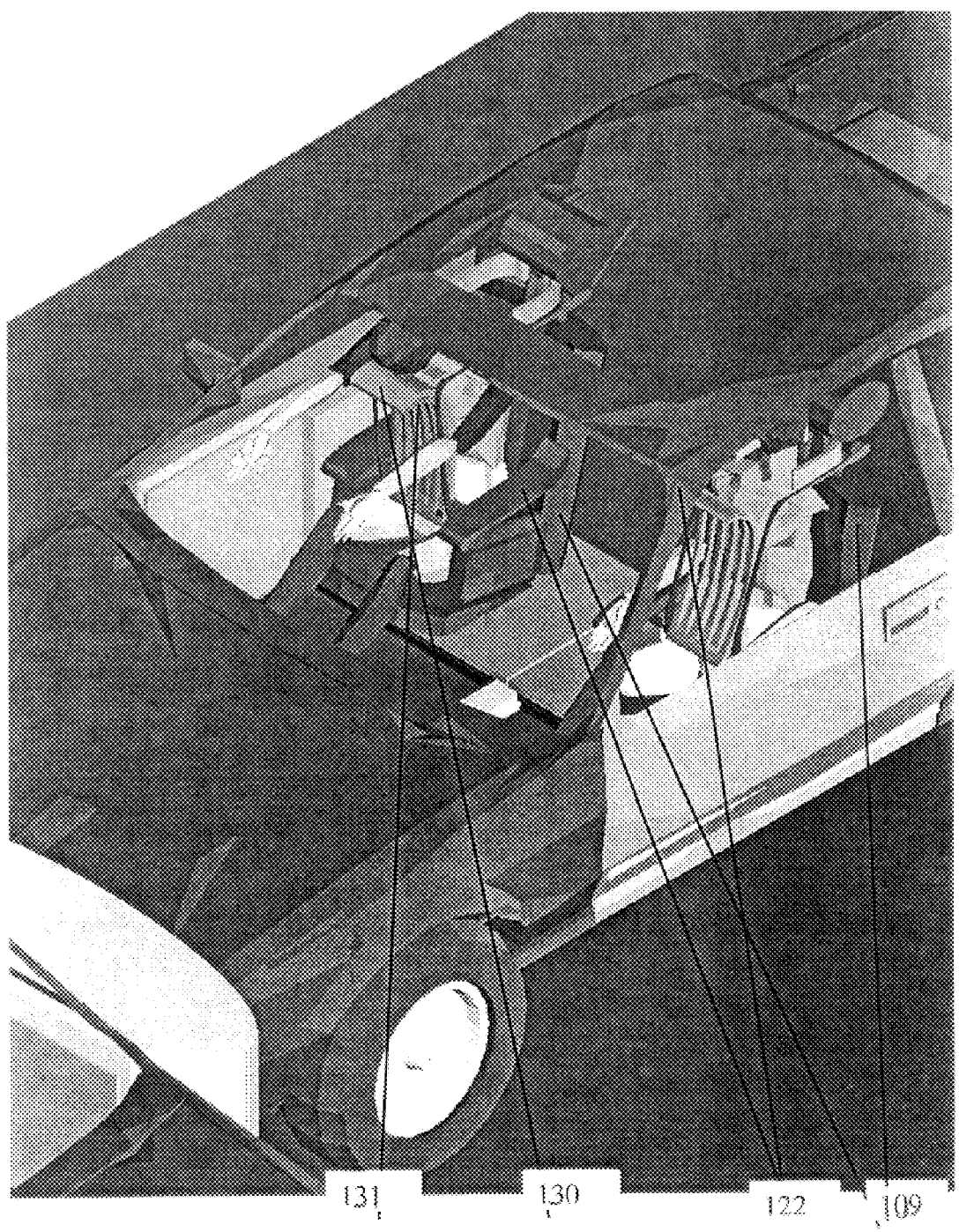
Figure 15:
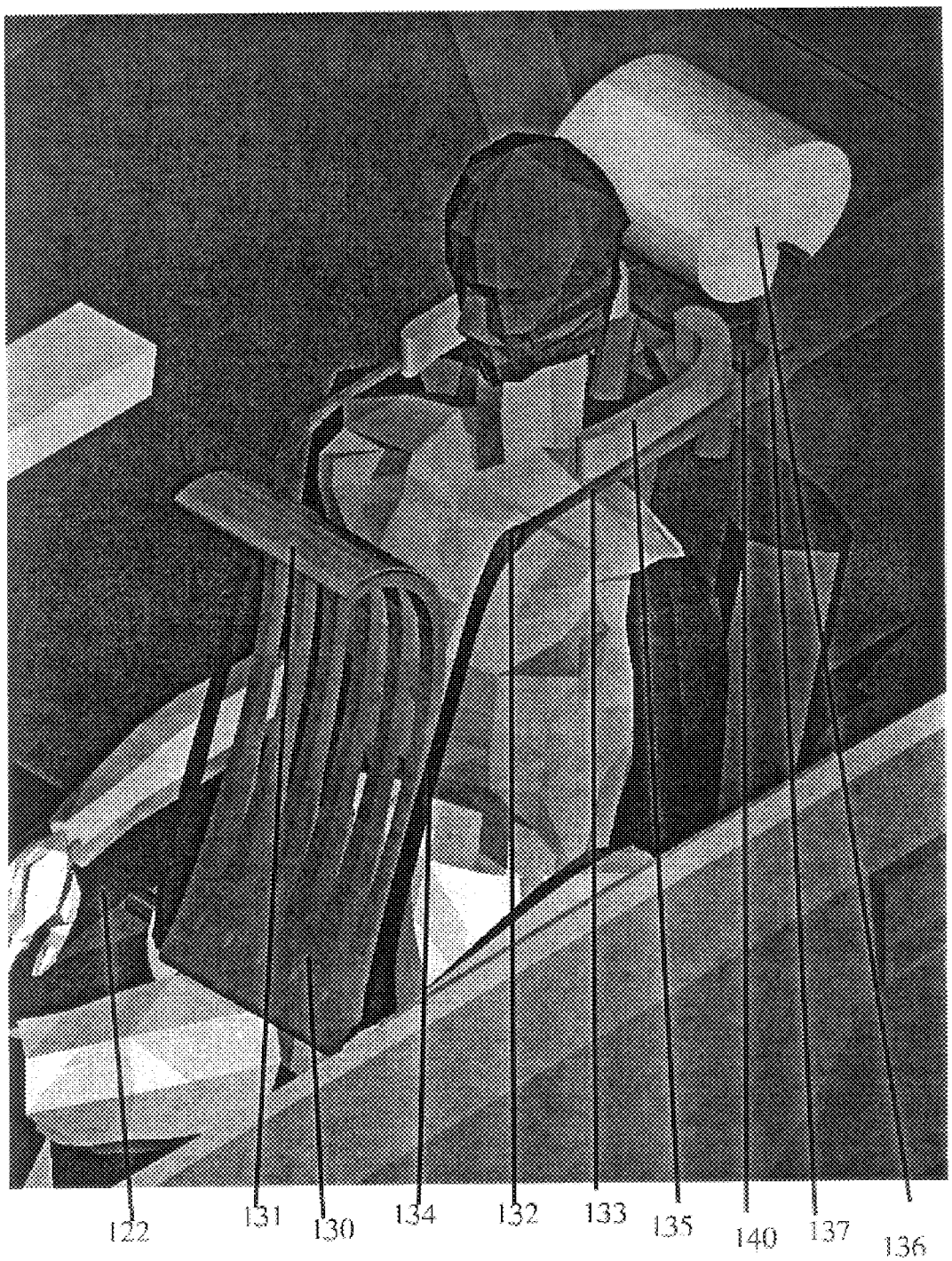

In FIG. 2, the impacting object has moved to a position that can now trigger the distance and velocity sensors (113). These sensors trigger the deployment of the External Airbags (104), and the shock absorbers (103). The internal airbags (114) may be triggered by conventional means disclosed in the prior art, explicitly or implicitly reacting to proactive or reactive impact detection. The internal air bags are designed to move the passengers and the passenger seats to the extent necessary through a Motion Space to a Safe Position on primary impact detection, and thereafter protect the protected entity—the passenger and the seat. Thereafter as illustrated in FIG. 3, the External Airbags (104) and shock absorbers (103) deploy to provide the required deceleration zone for the impact. As a result on impact the energy of impact is partially absorbed by the External Air bag (104) and the Shock Absorber (103) and the remaining energy transferred to the massive components of the vehicle through the Protector Shield (106), the Safety beam upper element/upper primary slide (107) and the safety beam lower element/lower primary slide (102) to the Central element of the Indo-skeletal frame (101) and the body of the vehicle. Notably, the Secondary slides (111) decouple and slide the passenger seats (109) with the passengers away outside the path of the impact forces and protected by the internal Airbag (114). The Safety beam upper element/ Upper Primary Slide (107) on the side of the vehicle away from the impact is free to slide out with all devices mounted on it to provide a path for the secondary slide (111) and the seats (109). In this situation it may be seen that the Safety beam upper element/upper primary slide works as an impact-resisting beam on the side of the impact and a release and support mechanism on the side away from the impact. FIG. 15A illustrates the side impact with the deployed internal and external airbags, and the displaced passengers away from the impact in the vehicle sustaining the lateral impact. FIG. 15B illustrates the frontal impact support for the passenger on the right hand side. The Left hand passenger is shown in the normal position for comparison.

Figure 14:
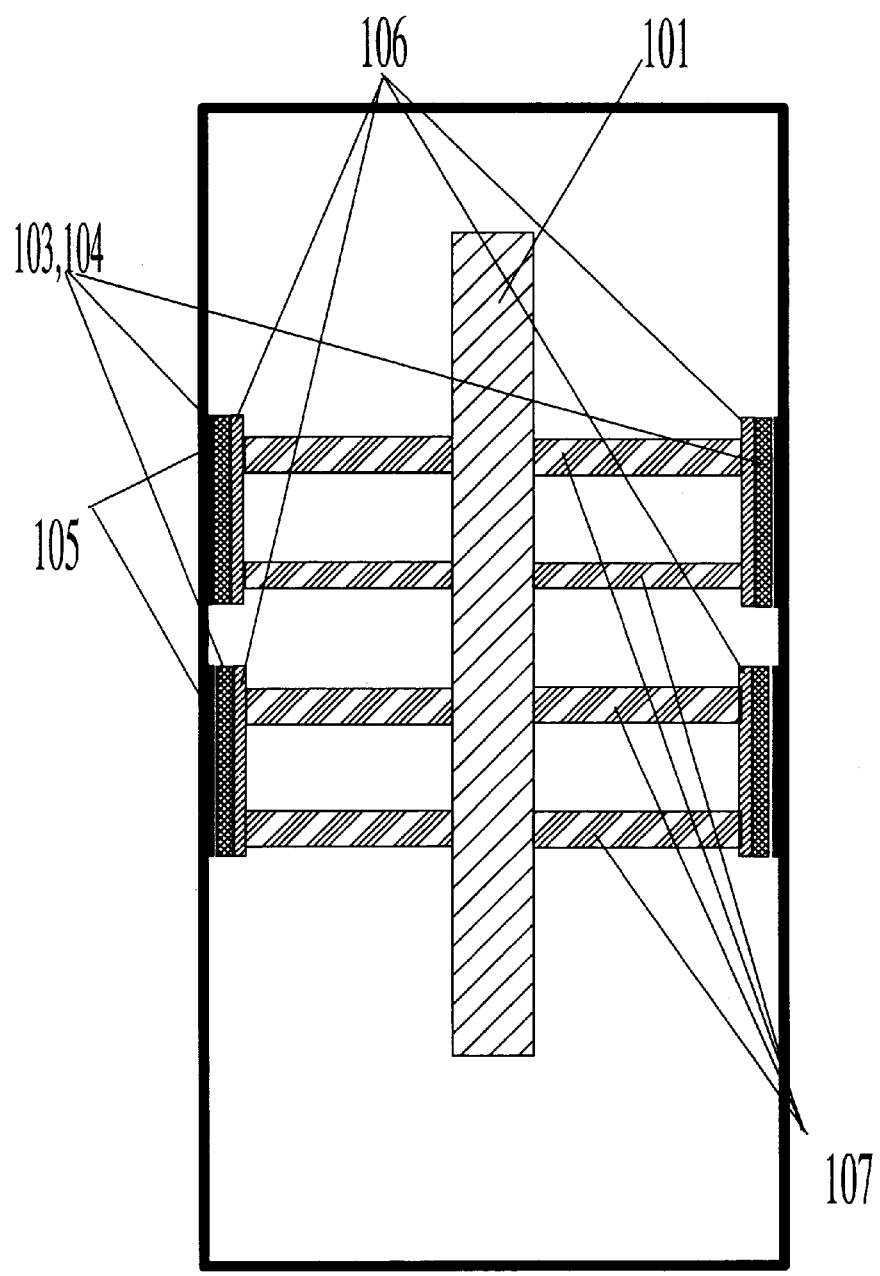
FIG. 14 illustrates a horizontal cross section of an embodiment of the present invention at the level of the upper primary slides.

FIG. 14 illustrates a horizontal cross section of the embodiment at the height of the safety beam upper element/ upper primary slides (107). The central member of the indo-skeletal structure (101) is flanked by the safety beam upper element/upper primary slides (107) abutting the central member, with the protector shields (106) and the shock absorbers that include the external airbags (103,104) at the outer end of the safety beam upper element/upper primary slides. The perforation shields are shown at the outer extreme of the shock aborbers and airbags. In this embodiment there are two sets of safety beam upper element/upper primary slides on each side of the vehicle that can support two rows of seats (front and rear) one on each side with its own protection with the protection shields and shock absorbing devices.

Figure 10A:
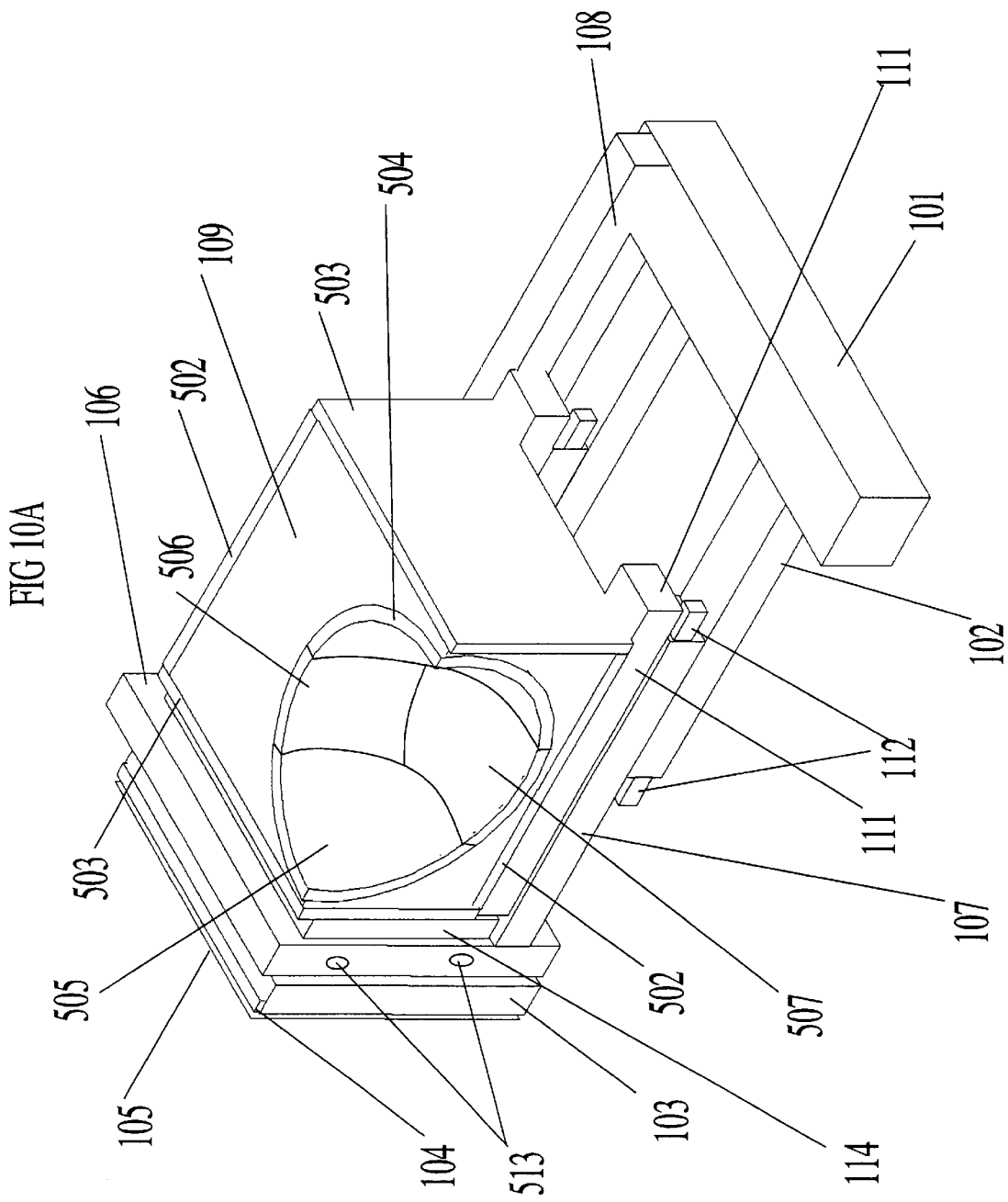
FIGS. 10A and B are an illustration of Isometric views of the present invention on one side of the vehicle for clarity.
Figure 10B:
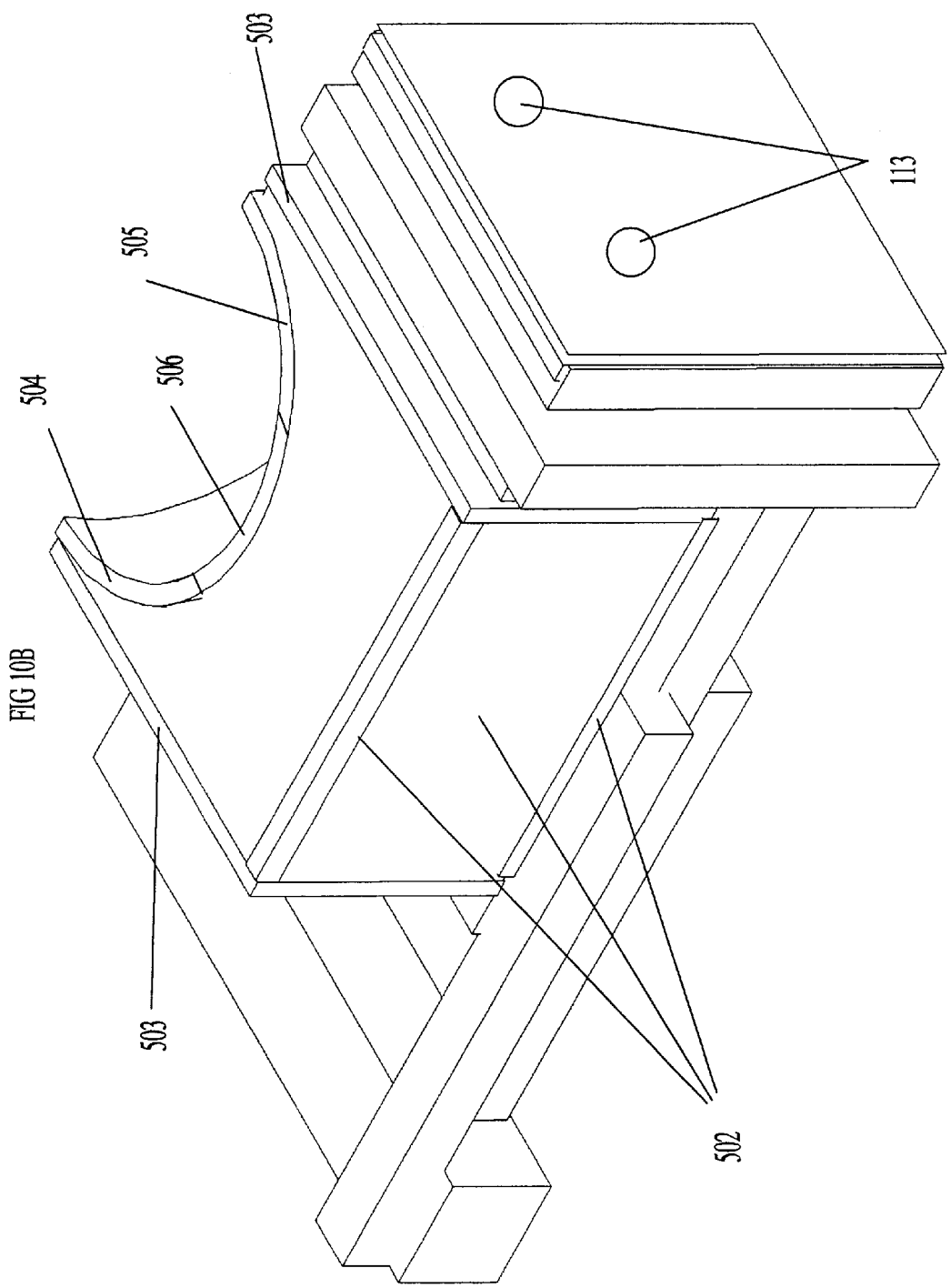
Figure 10C:
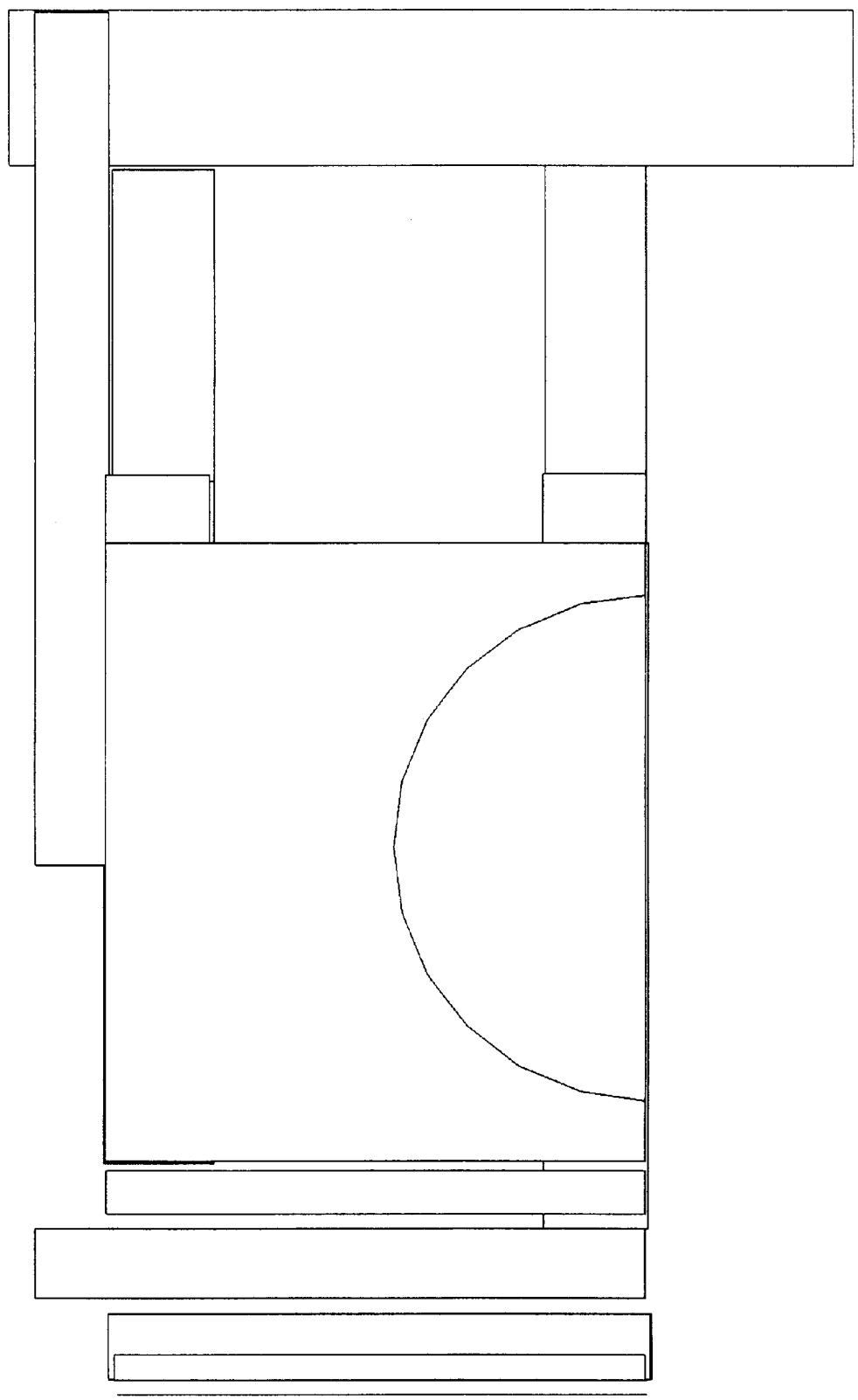
FIG. 10C is an illustration of a Plan view of the present invention for one side of the vehicle.

An auxiliary slide beam structure (108) (as illustrated in FIGS. 10A, 10B and 10C) may be attached to the central member of the Indo-skeletal beam (101) and locked into the protector shield when the vehicle is ready for operation, or be attached to the protector shield and slide out with the Safety beam upper element/upper primary slide (107), and get locked to the central member of the Indo-skeletal structure (101) in the operating position Means for access for passengers in this embodiment as illustrated in FIGS. 5, 6, 10A, 10B and 10C. The seat (109) and secondary slide (111), slide out on the upper Primary Slide (107) to a position that lets the seat (109) protrude from the vehicle such that the passenger may simply stand in front of the seat and sit down on the seat (109). Thereafter the seat (109) is retracted on the Primary slide to the position as depicted in FIG. 6, where the Safety beam upper element/ upper primary slide (107) is locked with the locking devices (112) in position for operation of the vehicle. The slide drive mechanism may be powered using approaches well disclosed in the background art. The vehicle while in operation should have the Upper Primary Slide (107) retracted and locked. The ignition lock is used in this embodiment to ensure this practice.

While extended, the clearance on the side of the vehicle for the Easy Ejector will usually be in the range of about 20 inches to 30 inches. This could be substantially less than the clearance required for opening a conventional car door. This is particularly useful for parking in areas with limited clearance.

Figure 12:
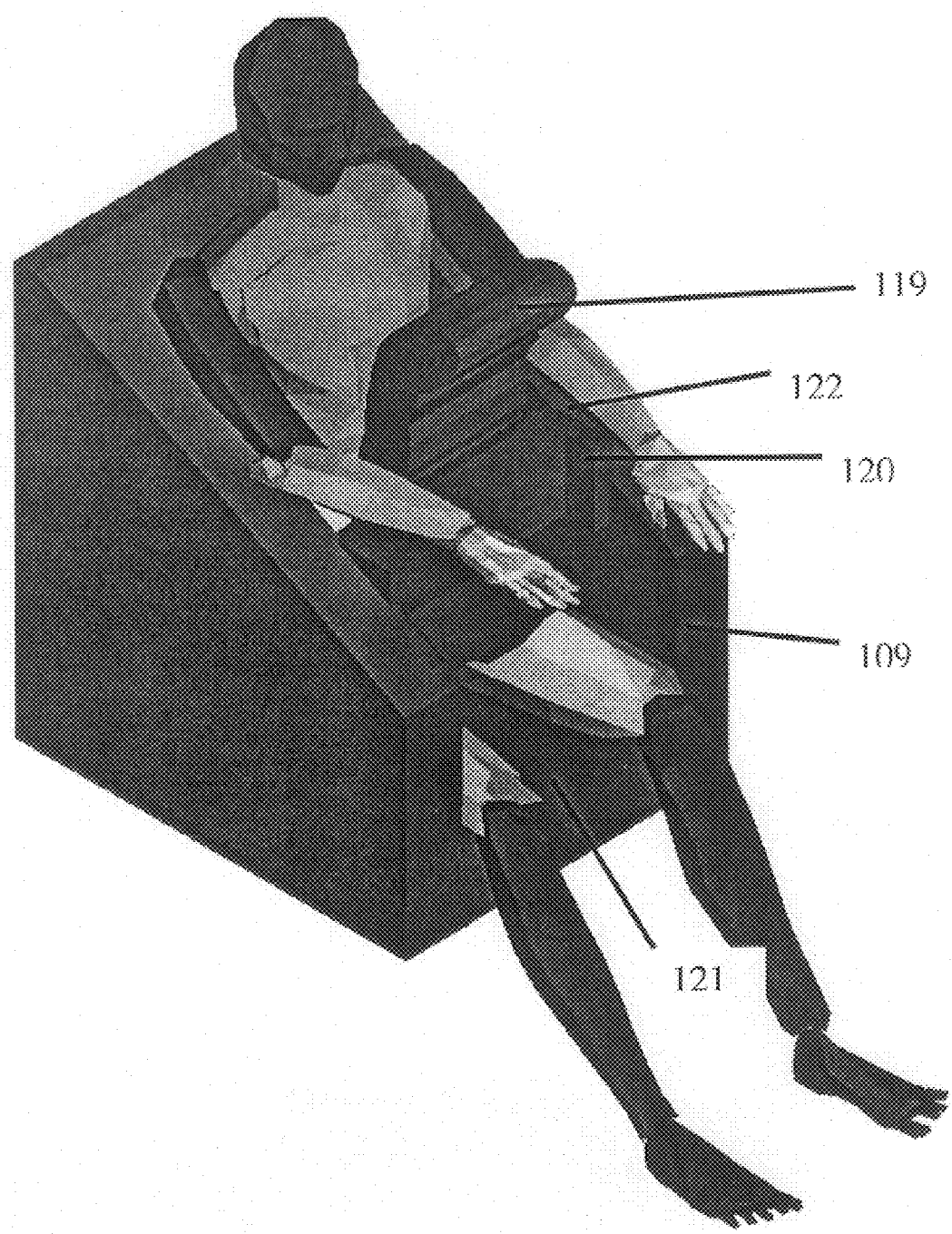
Figure 12:
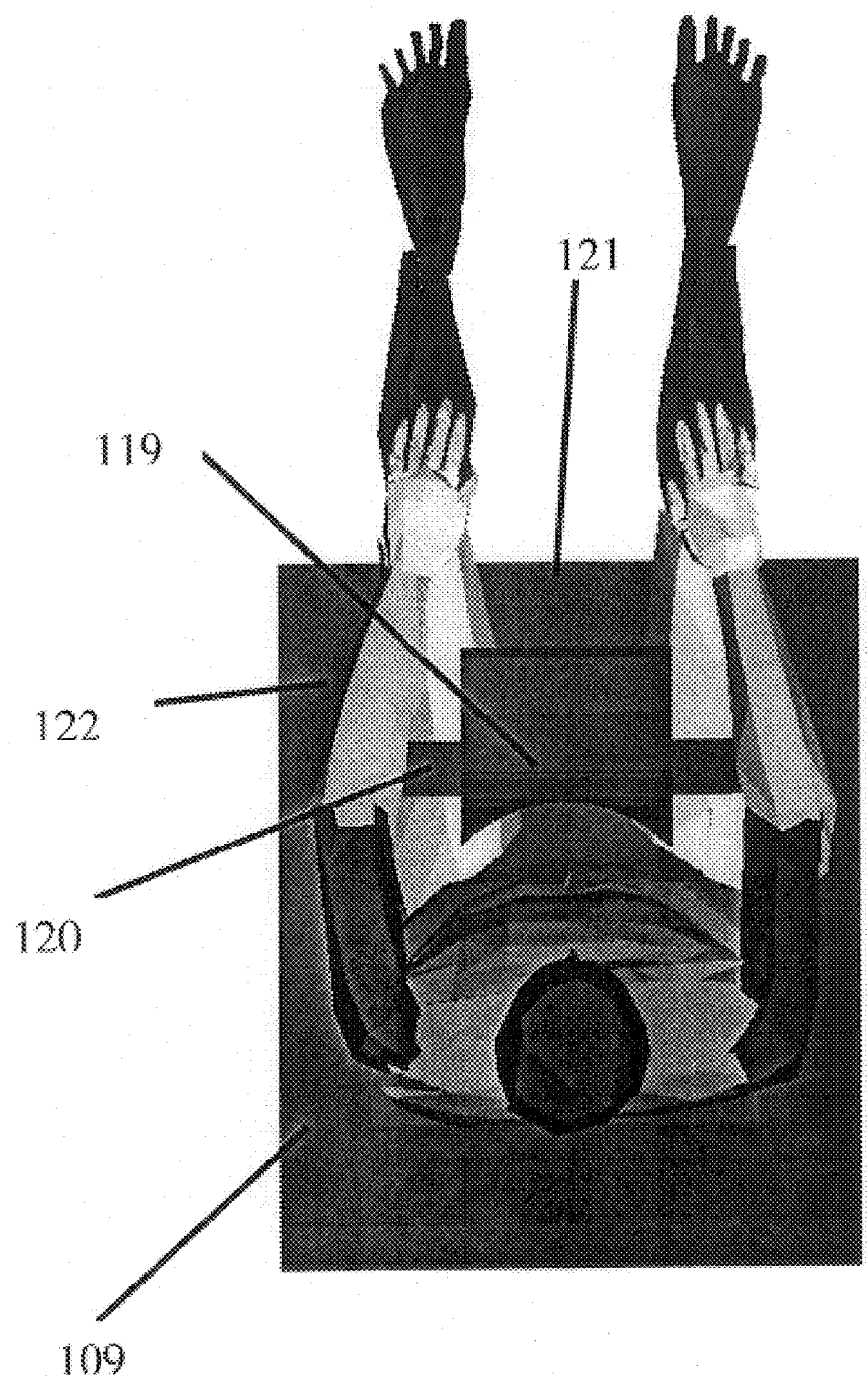
Figure 12:
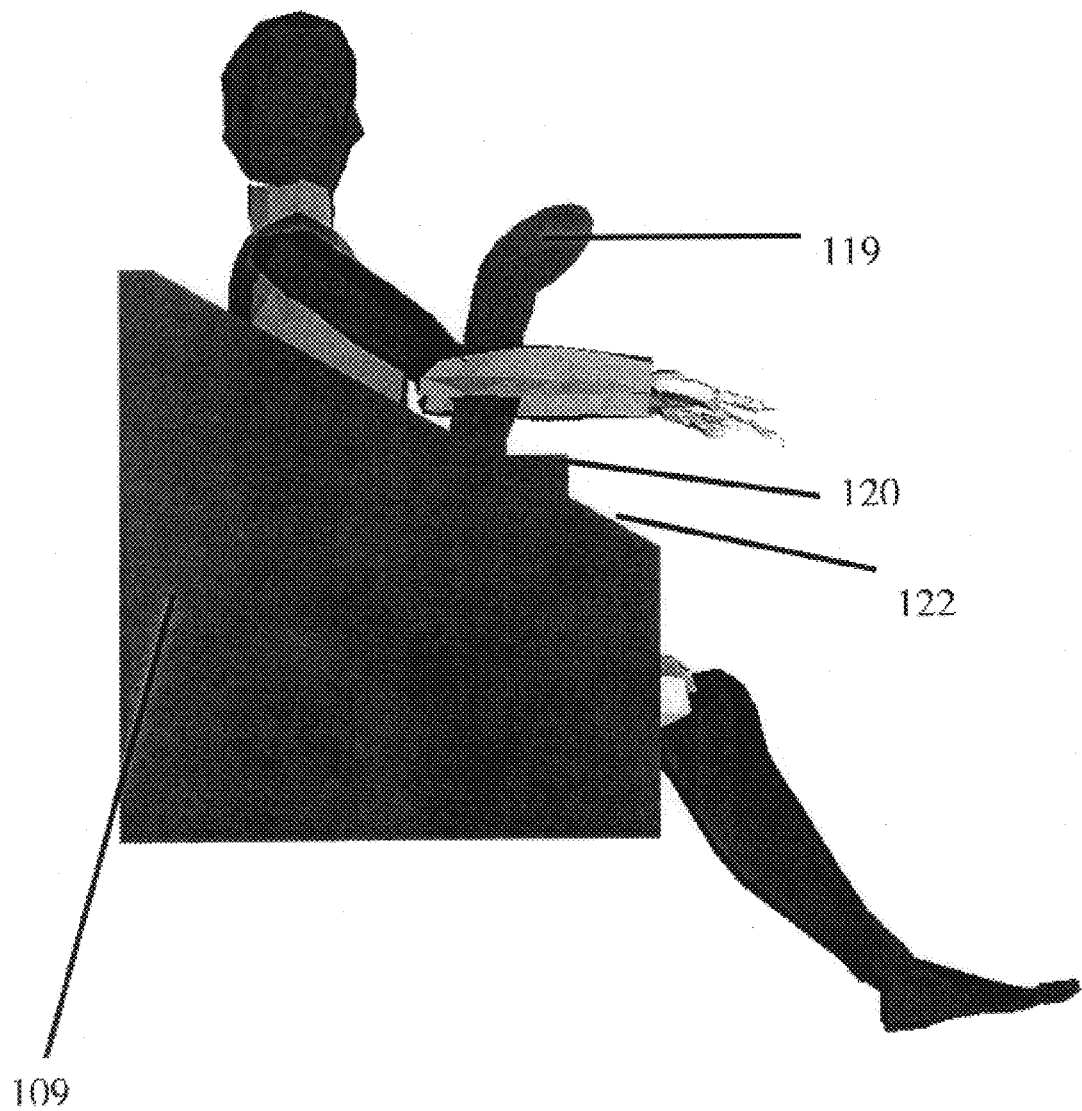
Figure 12:
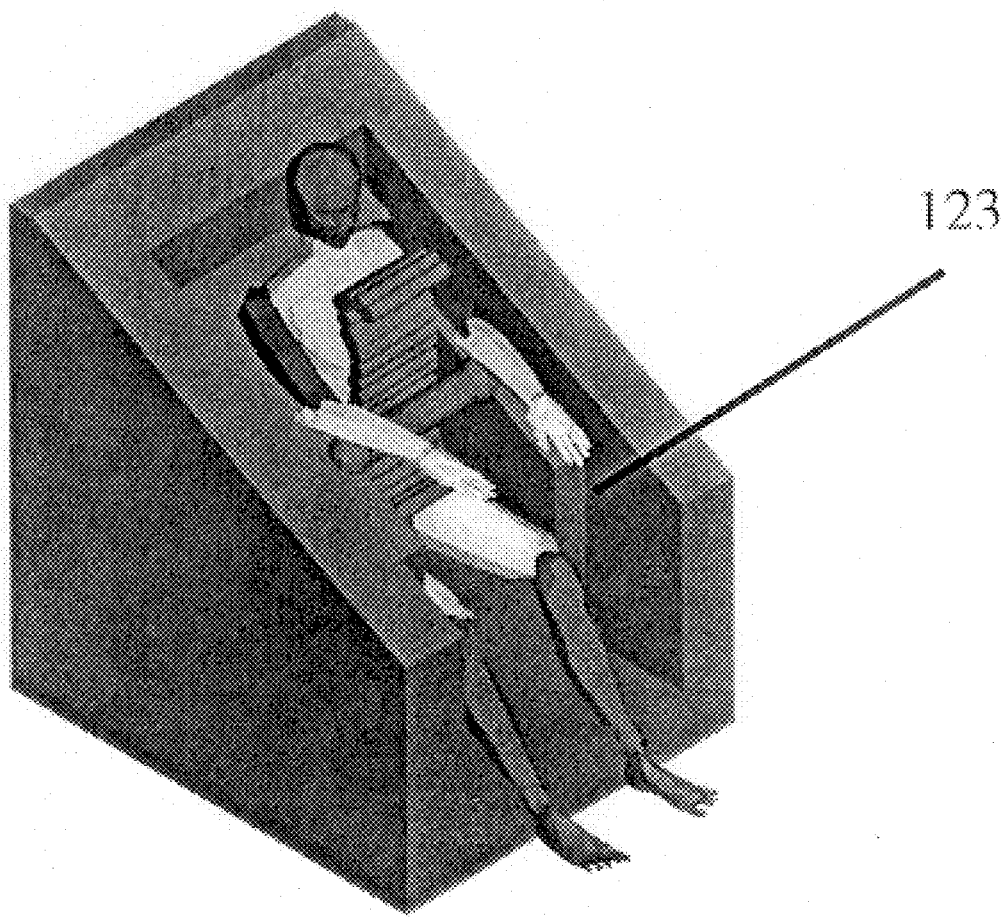
Figure 12:
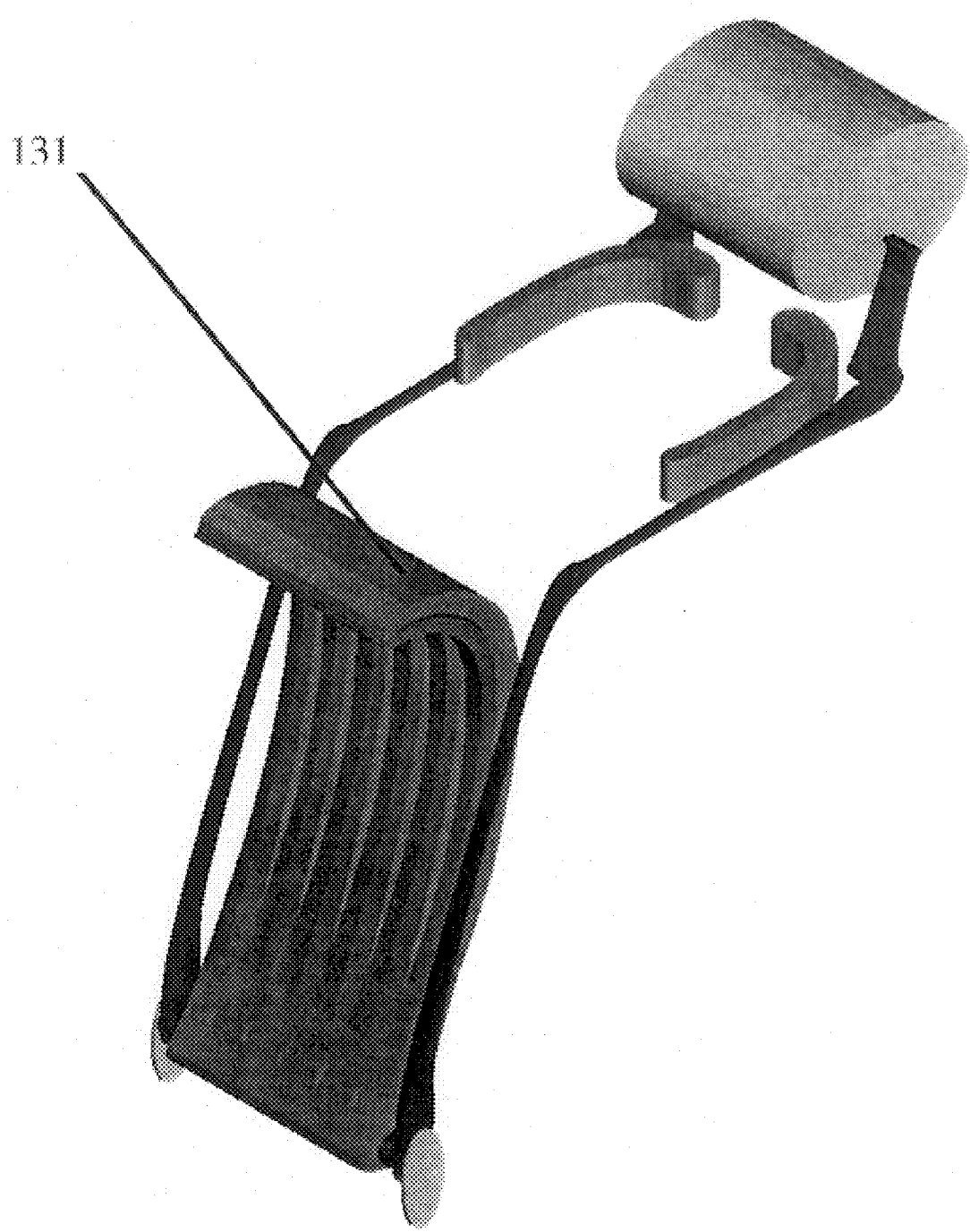
Figure 13:
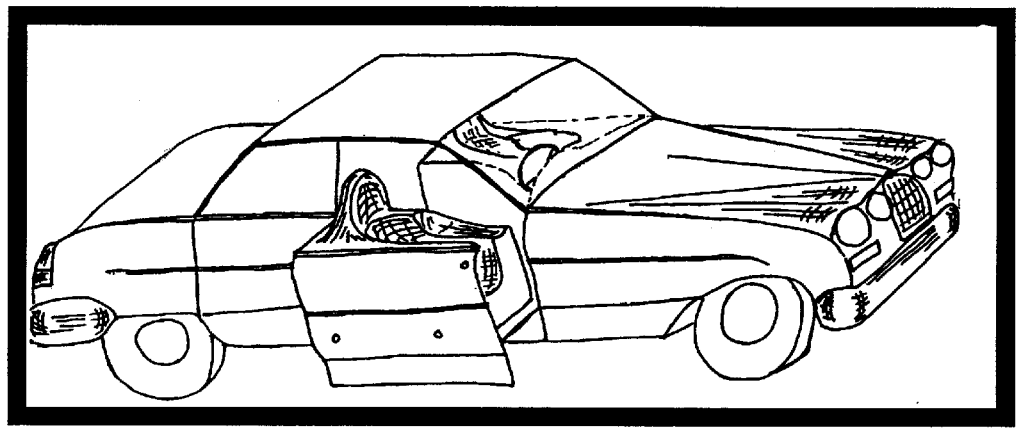
FIG. 13. is an illustration of a drawing of isometric view of the present invention.

FIGS. 12A, 12B and 12C illustrates the detail of the seat (109). The seat (109) may be constructed with customizable multi-elements that conform to the desired shape and provide the desired support for the passenger. Such adjustments may be effected using conventional seat control devices. In this figure the Safety Harness (119) is secured to the sides of the contoured seat (109) between the arm rests (122). The safety harness (119) may be designed to protect the passenger in head-on collisions by providing a soft barrier in close proximity to the body but not necessarily touching the body. This arrangement may be preferred to seat belts that do not provide the extended surface area that the harness (119) provides and as result provides greater impact resistance for the same level of limiting forces that the body can withstand. Moreover, this arrangement may obviate the need for a front collision airbag as the harness (119) may be high enough to support the face and neck under collision conditions. The harness may be constructed of pliable but semi-rigid material (such as high strength nylon) to provide support in a head on collision. A natural benefit of the arrangement of the harness (119) and its supports (120) is that lateral forces on the seat are also braced by the harness support (120) in the operating position. FIGS. 12F2 and 12G2 illustrate an embodiment of the harness. Moreover the (crush resistant) seat (109) may be constructed with lateral support elements (502) to provide crush or compression resistance and may be supplemented with reinforcing on the sides with reinforced seat sides (503) to further protect the passenger from crush injuries. The Seating surface (121) is illustrated in the same figure as are the arm rests (122). In conventional vehicle seat designs the door surface provides the only support on the external side surface which are usually limited to arm rests. This seat (109) provides surround support for the passenger particularly desirable on winding roads. The "Custom contoured seats" customized for each passenger may be created with a multi-element adjustable structure (the customized multi-elements)—manually with inserts or with computer controlled elements—that provide ergonomic passenger comfort providing where desired, lateral support in addition to the support that conventional seats provide, to cradle the entire lower body in the ejector seat. These adjustable multi-elements include a left support adjustable multi-element (504), a right support adjustable multi-element (505), a back support adjustable multi-element (506) and a bottom support adjustable multi-element (507). Similarly child seats (123) as in FIG. 12D1, may be designed to protect children. Such seats can be inserted into the seat (109). The Safety harness may also have an attachment for providing greater support for infants and small children.

ADDITIONAL EMBODIMENTS

Figure 7:
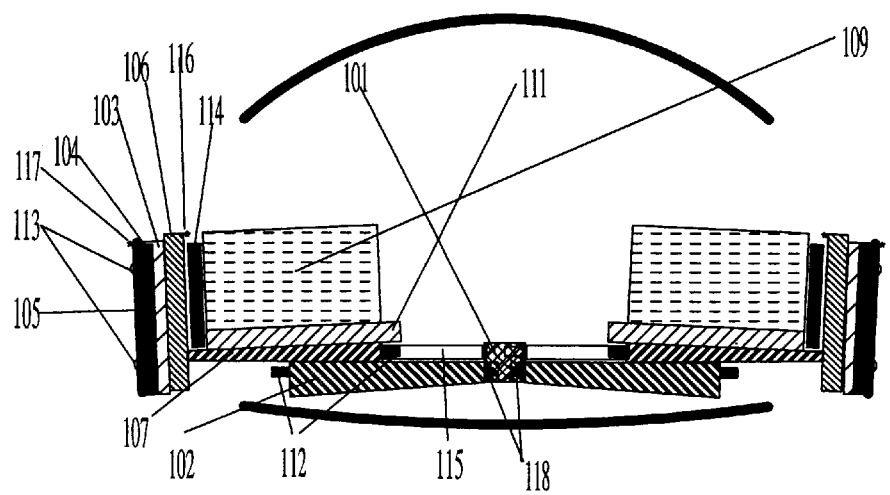
FIGS. 7–9 is an illustration of the Gravity slide drive that may be embodied in the invention.
Figure 8:
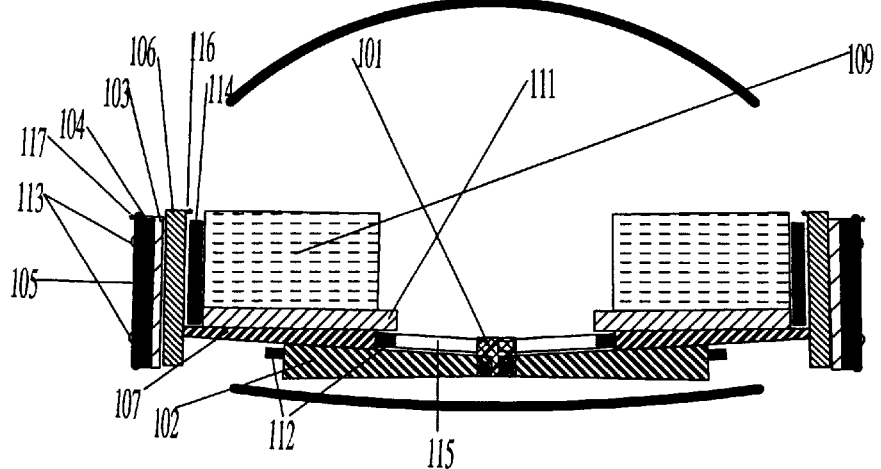
Figure 9:
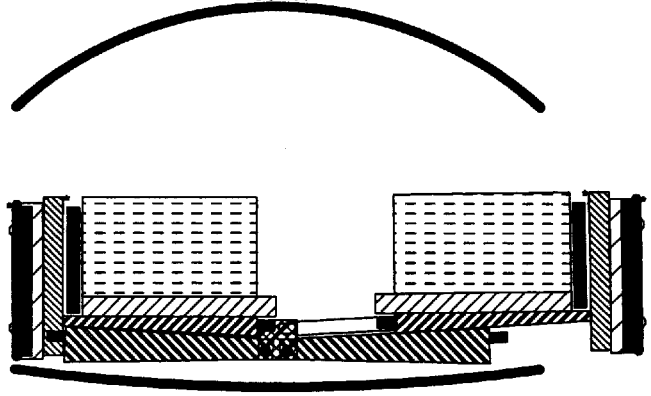

While the above embodiment uses a power slide drive, this embodiment differs in that a gravity slide drive is employed to move the slides for mounting the vehicle. FIGS. 7, 8 and 9 describe this arrangement. This embodiment differs in the preferred embodiment above in that the Safety Beam Lower element/Lower Primary slide (102) are pivoted at the Central member of the indo-skeletal structure with pivots (118). As shown in FIG. 7, this allows the lower slide to fall to a lower of two positions, that inclines the upper surface of the Safety Beam Lower Element/Lower Primary slide (102) adequately to allow the safety beam upper element/upper primary slide (107) to slide outwards to the loading position assisted by the weight of a passenger in the seat and the additional assistance of the Spring arrangement (115). The passenger may dismount from the vehicle when the slide is fully extended as shown in FIG. 7. Each side of the vehicle has independent slides and may be operated by passengers independently.

When the passenger dismounts from the seat the Safety beam upper element/upper primary slide (107) in its extended position moves to the higher of two positions about the Pivot (118) as illustrated in FIG. 8. This move inclines the Upper surface of the Safety Beam Lower Element/Lower Primary slide adequately to allow the weight of a passenger to work against the spring arrangement (115) and move the slide to the operating position. This move up of the Safety Beam Lower Element/Lower Primary Slide (102) may be effected by mechanisms well disclosed in the background art. The Slide as depicted in FIG. 8, is now ready for a new Passengers to mount. When the passenger sits on the seat (109), the weight of the passenger works against the spring mechanism (115) to move the slide to the operating position as depicted on the left hand side of the FIG. 9 and lock the slide in the operating position. The Safety beam upper element/upper primary slide may be unlocked by the passenger by depressing the Inside Door Open Button (116). Activating this button in addition allows the Safety Beam Lower Element/lower primary slide (102) to move and be locked to the loading inclination—the lower of two positions, and the Safety beam upper element/upper primary slide (107) is free to slide out with the passenger. At this point the arrangement has completed a fill cycle and is in the position depicted in FIG. 7.

The above cycle represents operation of the Gravity Slide Drive when there is a passenger in the seat (109) when the Slide moves to and from the operating position as on the left of FIG. 9. When a passenger dismounts however, and the Slide arrangement needs to be retracted without a passenger in the seat, the weight of the passenger is no longer available for aiding the motion of the slide to the operating position, and the slide must be pushed in against the action of the Spring Arrangement (115) and locked in place at the operating position. When a new Passenger wishes to mount the vehicle, he/she will press the Outside Door Open Button (117) which releases the catch that holds the Safety beam upper element/upper primary slide beam in place but does not affect the movement of the Safety Beam Lower Element/Lower Primary Slide (102) about its pivot (118). The seat as a result slides out on the Safety beam upper element/upper primary slide assisted by the Spring arrangement (115) to the position for mounting the vehicle as depicted in FIG. 7. The spring arrangement (115) is designed to be such that it provides a force just adequate to move the Safety beam upper element/upper primary slide out with no passenger in the seat.

Some alternative embodiments may have multiple positions for the inclinations of the safety beams from the center of the vehicle, in the loading position to accommodate the varying road inclinations that may make a single inclination of the safety beam in the loading position inadequate. In such an embodiment the operator will have the facility to switch to the best loading inclination dependant on the inclination of the road. This will overcome some of the disadvantages of regular car doors on steep hills. Moreover, this arrangement can also function as a shock absorbing device for the comfort of the passengers in vehicles under operating conditions. A possible embodiment to achieve this can have a range of angular inclinations for the operating position, the range being set so that the transfer of the compressive load on impact through to the fixed body members of the vehicle or the central beam is achieved. The Safety beams are spring or shock absorber mounted in a vertical plane relative to the central beam and the fixed body members of the vehicle. When a bump in the road is encountered the safety beams pivot on the center and swing higher at the center thereby isolating the passenger from the road.

ALTERNATIVE EMBODIMENTS

In an alternative embodiment to the preferred embodiment, the present invention may use hinged Protector Shields (106) that lock into the Primary Slide (107) when closed. This will allow the arrangement to work for mounting and dismounting the vehicle with either the Primary Slides deactivated or non-operational as well as when they are functional. The seats may also be mounted on rotating mechanisms or extension arms rather than a primary slide, to assist passengers in mounting and dismounting.

Figure 5A:
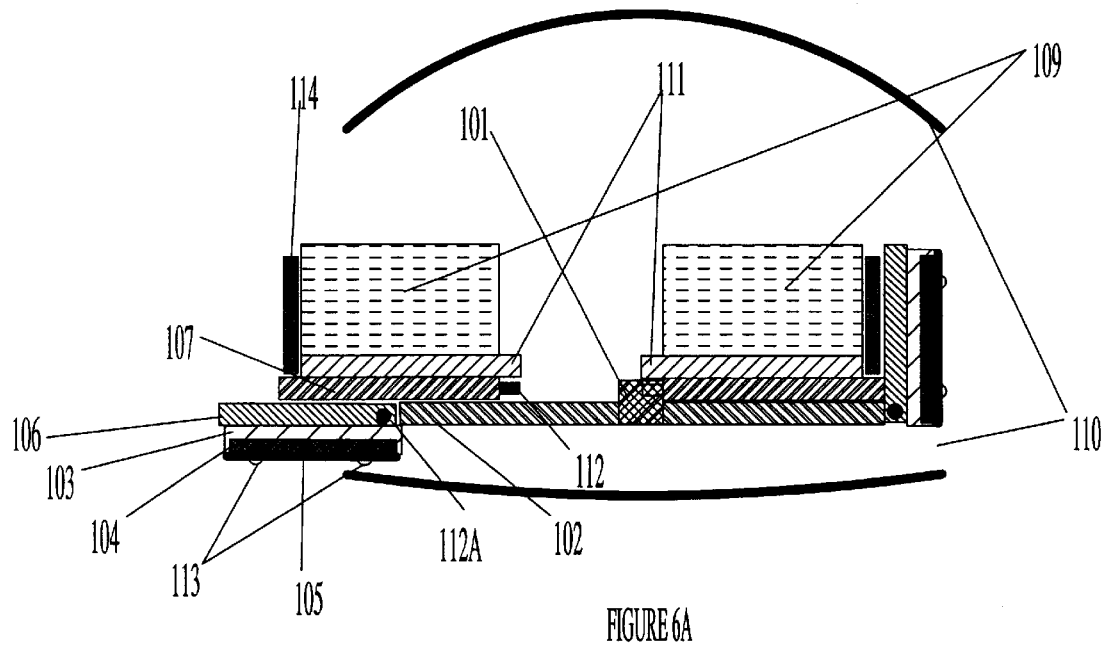
FIGS. 5A and 6A illustrate an embodiment of the current invention with the protector shield/shock absorbers/external airbag hinging down to support the primary slide. A useful feature for larger vehicles with more than a single seat on each side.
Figure 6A:
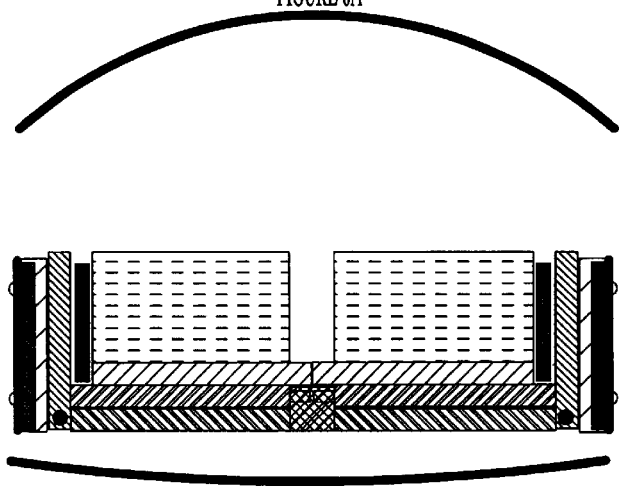

Another alternative embodiment is illustrated in FIGS. 5A and 6A. The "door" that contains the perforation shield (105) with distance/velocity sensors (113), the external airbags (104), the shock absorbers (103) and the protector shields (106), hinges down on the pivot (112A) to provide support for the safety beam upper element/upper primary slide. The inner surface of the Protector shield is designed to perform the function of the Safety Beam Lower Element/ lower Primary slide (102). This embodiment will be particularly useful for larger vehicles with a plurality of seats on each side of the vehicle. These multiple seats may be mounted on separate sections of upper primary and secondary slides.

Another alternative embodiment is illustrated in FIGS. 1D to 4D where the Shock Absorbers (103) excluding the External Air bags (104) are mounted on the inner surface of the protector shields (106). As may be seen from the drawings, in this particular embodiment, the shock absorber excluding the external air bags are locked directly to the Safety Beam Lower Element/lower primary slide (102) in the operating position, although in another configuration the locks my be between the protector shield and the lower primary slide in the operating position.

Another alternative embodiment may have a contoured safety harness with a different shape to that of the preferred embodiment. FIGS. 12A1 to 12C1 illustrate an embodiment of a safety harness using a slightly different geometry but performing the same function in the same way as in the preferred embodiment.

Figure 4B:
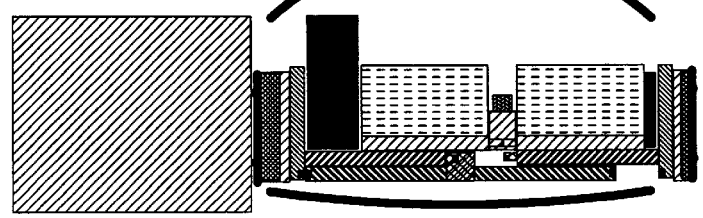

Another alternative embodiment may have an auxiliary slide behind the seat and of any convenient height. This embodiment is shown in FIGS. 1C-4C. The figures illustrate the working of the current invention with a high section of the central member of the indo skeletal structure behind the seats, but abutting the auxiliary beams in the operating position. As the High section of the central member (101) is behind the seats and the secondary slides (111), the seats and the secondary slides are free to move across the vehicle under impact as shown in FIG. 4C.

Yet another alternative embodiment has an external seat profile as illustrated in FIG. 12E1. The higher rectangular external profile provides greater protection to the passenger.

Yet another alternative embodiment has a vertical extension/"safety cage" (125) as shown in FIG. 10A1, 10B1 and 10C1. Here the vertical extension/safety cage engages a beam across the top of the vehicle that may be supported by the shell structure of the vehicle (the figure shows only half the width of the vehicle). Such a safety cage/vertical extension can provide protection in a roll over situation and also provide additional compressive strength for the vehicle, and may function as a fixed or retractable roll bar. In some embodiments such a vertical extension "safety cage" will perform the function of the "B" pillar of the vehicle under lateral impact. Notably no "B" pillar is needed to support rear door hinges in the present invention. Moreover, in some embodiments the beam arrangement across the top of the vehicle or other support structures on the roof section of the shell may be designed to be rigid on compression but telescope out with the secondary slides under impact using appropriate logic to drive the locking mechanisms, thereby providing a protective cage even when the seat is in the ejected state.

Yet another embodiment, deters a roll over following side impact, by implementing an "outrigger" arrangement having reinforced safety beam upper element/upper primary slides (with appropriate reinforcing (510) and/or secondary slides and bracing brackets (512) anchored to the fixed members of the vehicle that hold these slides in their extended substantially horizontal position after extension under impact— such as with reinforcing to safety beam lower elements (511)—without permitting them to buckle under vertical forces encountered under the initial stage of a roll over situation.

The preferred embodiment has the external airbags or shock absorbers triggered on detection of an expected impact as noted. This implies that on the far side (non-impact side) if there is possible secondary impact from a second object, the same mechanisms will deploy the external airbags on the second side, thereby protecting the far side occupant in the event of a second object hitting the vehicle soon after the first. An alternative embodiment can have distance/velocity sensors mounted in positions on the front and back edge of the perforation shields or protector shields to facilitate better detection of objects approaching the vehicle at wide angles to the perpendicular direction. Yet another alternative embodiment to this will have both impact side and far side external airbags deploy on detection of the first impact.

Another alternative embodiment has a safety harness/ shield as illustrated in FIG. 12H2. This embodiment of the safety harness is mounted on spring loaded hinged supports (137) at the head support section of the multi element adjustable seat—similar to conventional supports for the headrest, and to lockable supports (138) between the arm rests or on the side bolsters of the multi element adjustable seat. The spring loading will support the weight of the harness and thereby retract the harness when unlocked. The harness includes a hinged and spring mounted shield (130) that may pivot on the lower safety harness support (138), The passenger side of the shield, has on its surface an implementation of a Passive Air Cushion System that uses the pressure in one or more sacrificial chambers which under pressure transfer air to one or more micro-air cushions that protect high priority anatomica regions. In this embodiment, the passive anatomical micro air cushion (131), derives it inflation source from the sacrificial chamber (139) at the lower end of the shield of the safety harness, that is compressed bya much greater body mass under impact. In a frontal collision the force of the more massive parts of the body on the sacrificial chamber will deploy the passive anatomical micro-air cushions to protect the face and the neck. The narrower sections of the aircushions and flow control mechanisms if installed, will cause some visco-elastic behavior and in addition cause air speed amplification to create faster deployment. While this mechanism activates the shield (130) may pivot down to take some of the impact energy. The shield is shaped to the contour of the human body head and neck when it is forced forward as in a frontal collision. This embodiment may in addition have multiple or variable postion harness support anchor points on the arm rests or the side bolsters that are part of the multi-element seat, to accommodate people of different proportions. Moreover this embodiment may have in addition an additional bracket that moves the anchor point of the lower safety harness locking supports substantially forward, and provides a supplementary passive anatomical micro-air-cushion that can be mounted on the permanent micro-air-cushion on the shield, to accommodate pregnant women, and the special critical force distribution they can withstand.

In this embodiment, the two pivoted arms swing forward under collision forces the moment created by the shield with the body pressure against it, and extends the upper extending arms (133) to absorb some of the shock and to provide a space for the forward movement of the upper body. The elbows (132) facilitate the relative angular movement of the upper arms and lower arms of the safety harness (133,134). They are spring loaded to ensure that they support the lower parts of the harness when unlocked to allow the entire harness to move up and away from the body when unlocked without any force being applied. Under side impact the passive anatomical head and neck micro-air-cushions deploy to protect the head and neck under relative lateral acceleration. Notably the passive anatomical head and neck micro-air-cushions can be actively deployed or as in this embodiment passively deployed by a discharge of air from sacrificial chambers between the seats or on the outer surface of the seats and mounted on each of the seats, so that lateral pressure will inflate the anatomical head and neck micro-air-cushions. The sacrificial chambers offer secondary impact protection by cushioning the seat. Notably this embodiment does not use any active airbags in the vicinity of the human body, reducing the risks associated with the high energy external deployment devices. The adjustable head rest (136) follows conventional design but is here mounted on the safety harness hinged mounts.

Figure 17:
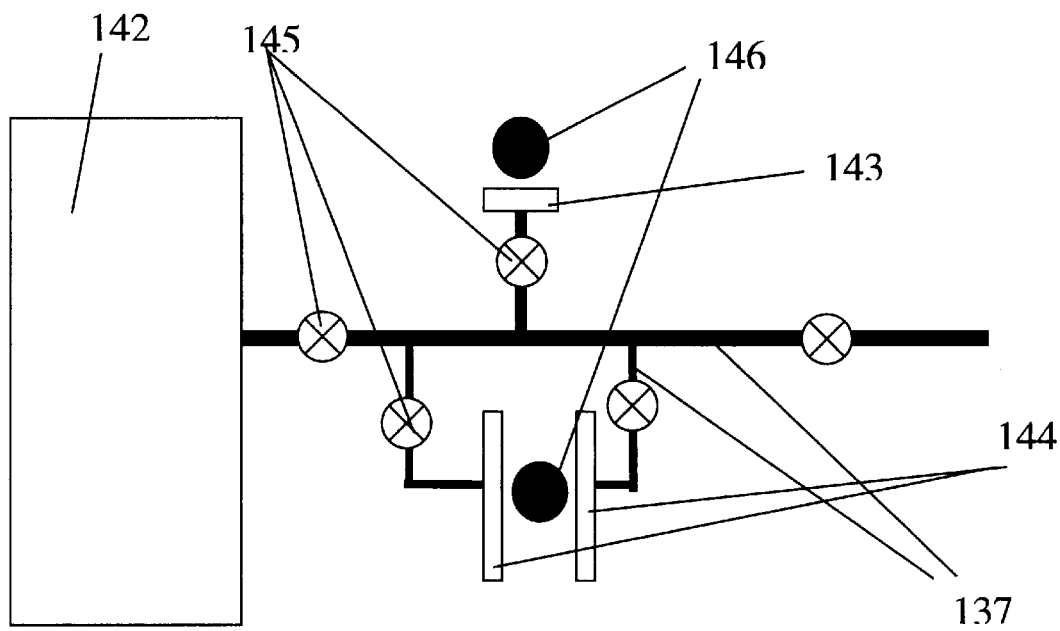
FIGS. 17A,B show a schematic diagram of the passive air cushion system disclosed in this invention.
Figure 17:
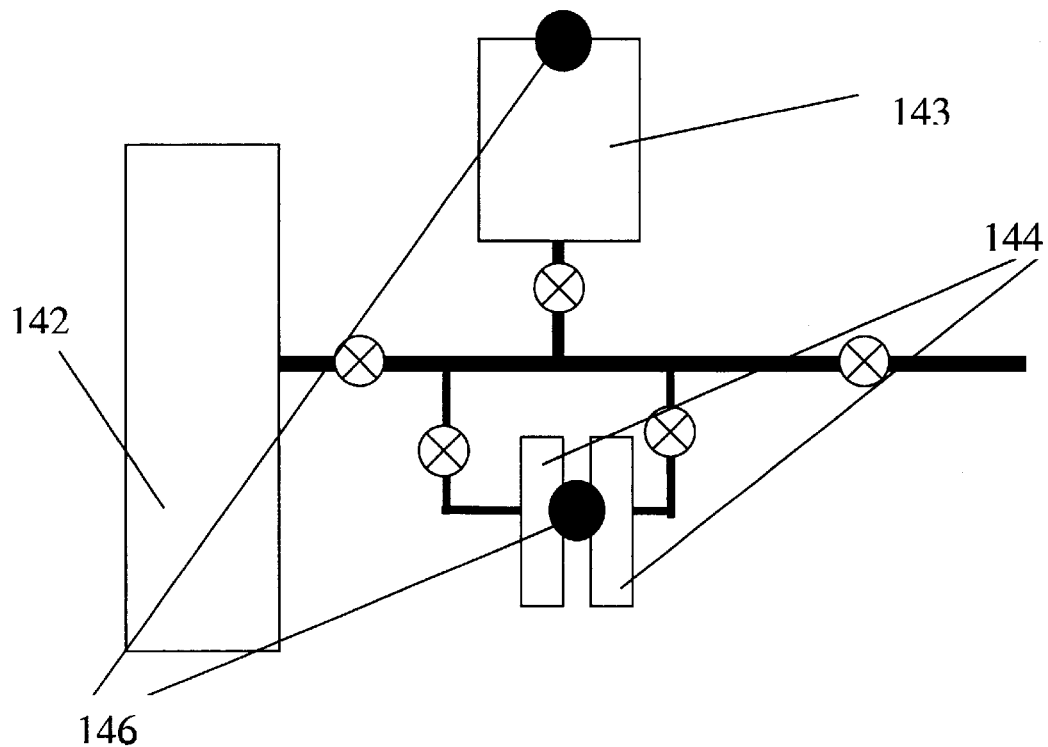

FIG. 12I2 shows the passive anatomical micro-air-cushions deployed (the sacrificial chamber has been compressed and the top region is full and ready to protect the face and neck in a frontal impact. FIG. 12J2 shows the anatomical head and neck passive micro aircushions deployed under side impact, ready to support the head and neck in a side collision. Notably this embodiment uses a new concept where the impact energy is redeployed for protecting vital parts of the impacted object which are often embedded inside the object, using fluid transfer—in this case air transfer. Force and velocity amplification or deamplification can be achieved with the geometry of the interconnections, the sacrificial chambers and the micro-air-cushions. The sacrificial chambers can be used for secondary impact protection as well by carefully controlling the flow parameters. This is illustrated in FIG. 17. The approach obviates the need for active airbag technologies in the vicinity of sensitive equipment, living organisms and indeed people.

Figure 16:
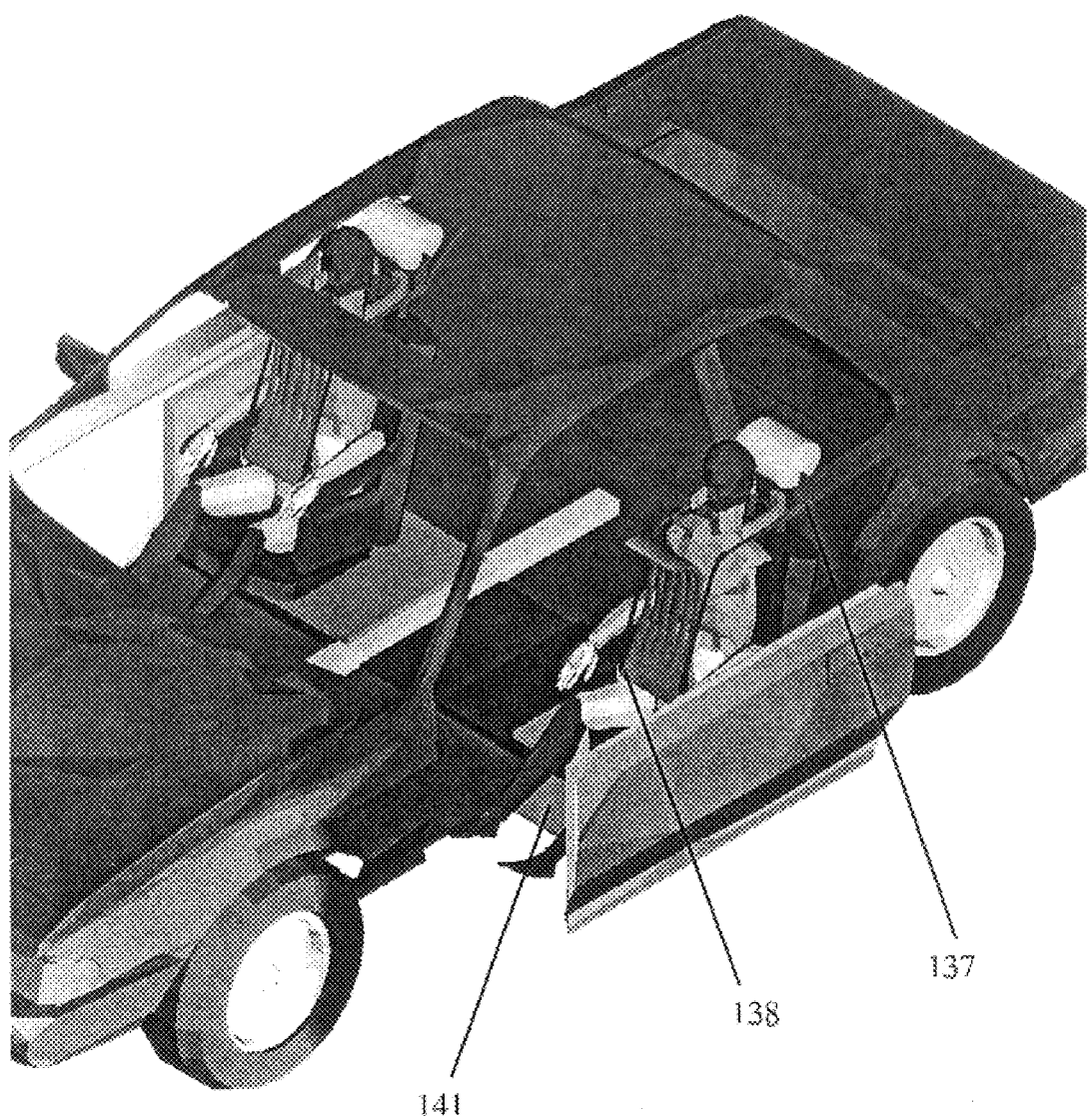
FIG. 16A illustrates a passenger ready to leave the vehicle. The safety harness/shield is still in place.
FIG. 16B shows the passenger in FIG. 16A after releasing the safety harness/shield from the locks.
FIG. 16C shows the same passenger in 16A,B but with the safety harness/shield now well above the head so that the passengers leave the vehicle by simply standing up.
FIG. 16D shows the safety harness/shield unlocked from its mounts within the vehicle, illustrating the flexibility to move within the vehicle under these conditions but not having the visibility to drive, thereby ensuring that the safety harness/shield is used under driving conditions.
FIG. 16E illustrates the deployment of the retracting canopy for protection of passengers in bad weather.
Figure 16:
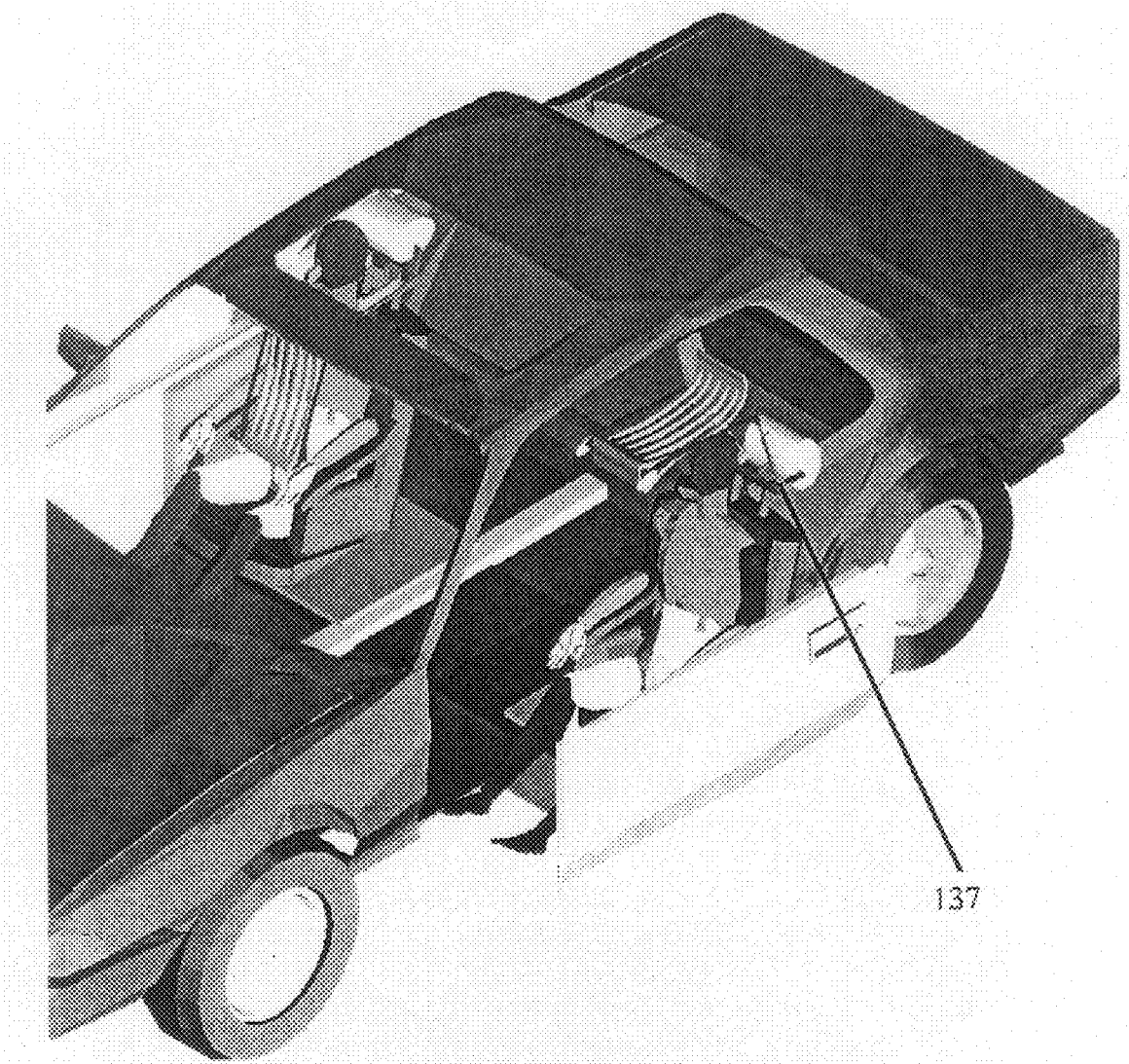
Figure 16C:
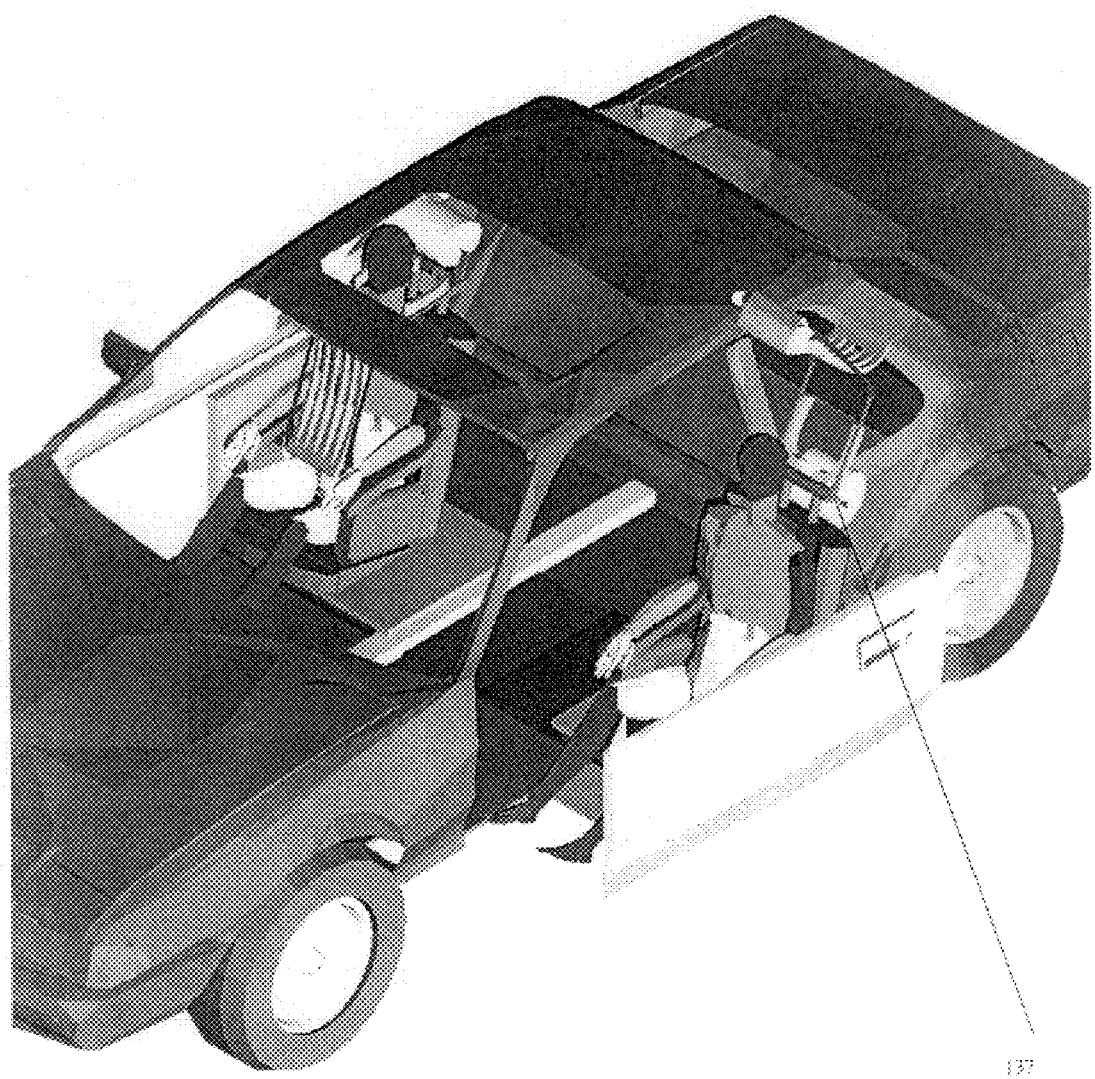
Figure 16D:
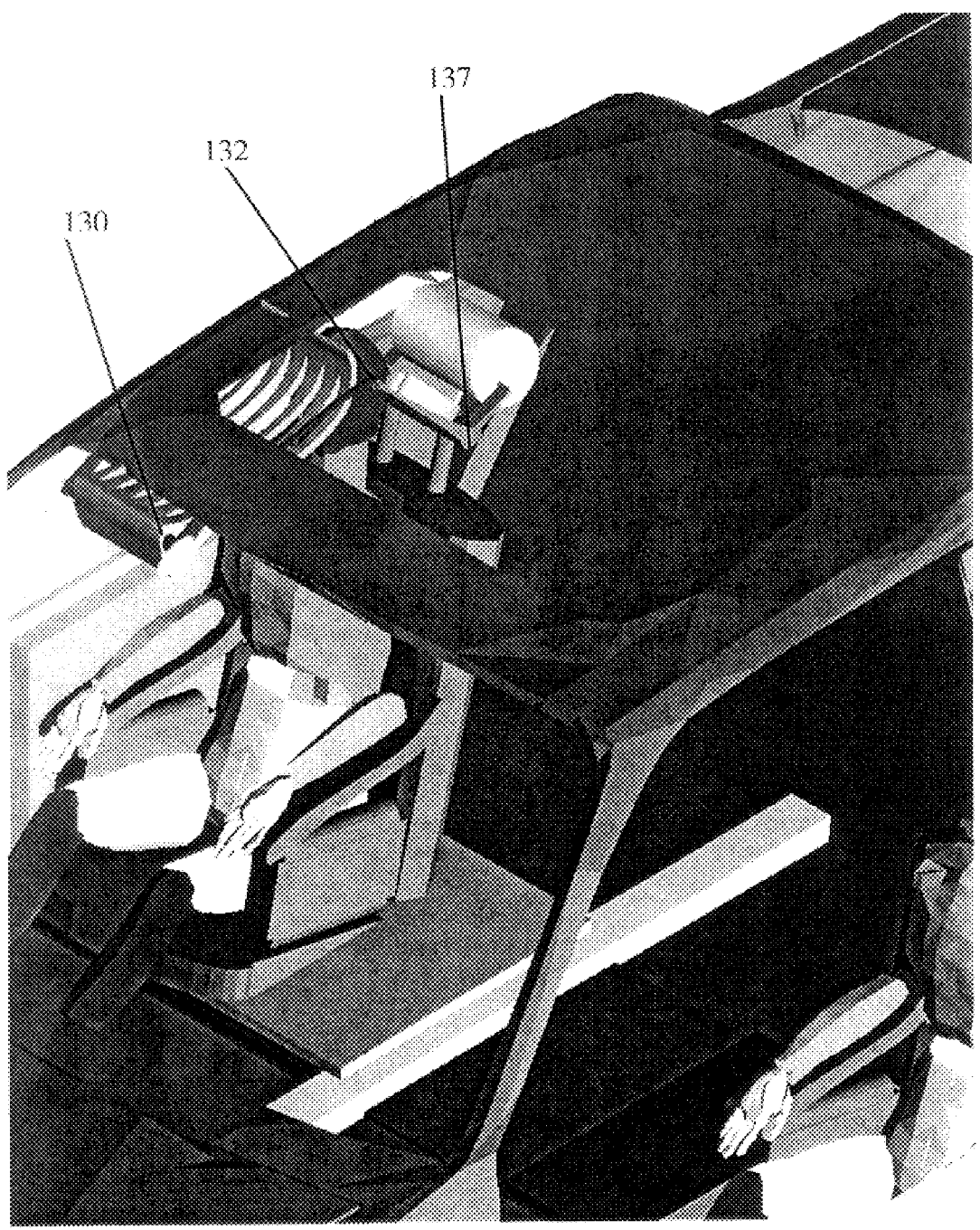
Figure 16:
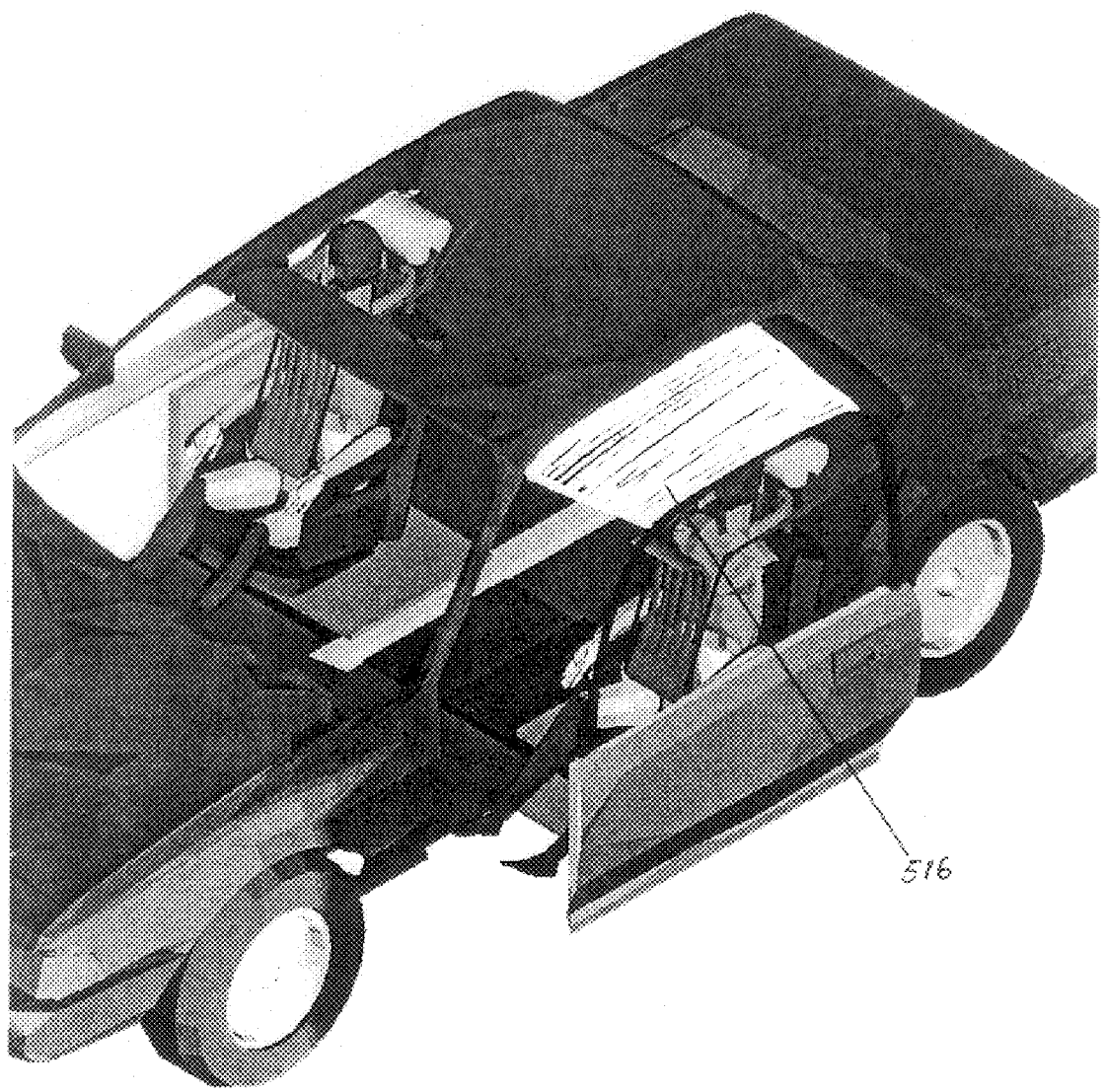

This embodiment of the harness allows movement within the vehicle for passengers when it is unlocked and allowed to swing up within the vehicle as shown in FIG. 16D. However, visibility is somewhat obstructed preventing the driver from driving without locking the harness in place.

In this embodiment of the safety harness entering and leaving the vehicle are facilitated by the entire device swinging away from the body as shown in FIGS. 16A, B and C. The passenger simply needs to stand up to leave. To enter the passenger simply sit down and place his/her feet on the foot rest (141) and retract the slider mechanism. This embodiment also has radar or infrared detectors as on elevator doors to detect limbs in the way of the retracting sliding mechanism for the protection of the passengers—passenger protection detectors (513).

FIG. 15C shows the parts of this embodiment and the adjustable arm rests.

Another embodiment of the shield on the safety harness has a folding section at the top that can be straightened and locked in place for adults and folded down for children.

Another embodiment uses flexible netting on part of the shield surface to protect passengers under impact—a Net structure for Harness (514). In this embodiment, the shield has a frame on which the netting is deployed—a frame for Net structure for Harness (515). The upper end of the frame is adequately bent forward and then downwards to ensure that the passenger head and neck do not strike the frame under frontal collision. In yet another embodiment of this arrangement, the shield of flexible netting is designed for the head and neck and is normally retracted forward, and deployed on impact by initial forces by the lower torso of the passenger against the lower part of the safety harness/shield.

Yet another variation of this safety harness with netting on a frame, has telescoping frame members on the sides so that the height of the frame is adjustable by retraction of the telescoping members to accommodate children and small adults.

Another embodiment has air conditioning micro-ducts on the seating surfaces and the safety harness/shields, for the comfort of passengers, particularly in open vehicles.

Another alternative embodiment has the "Open" switch for the slide on the inside of the vehicle designed the "press bar" so that the intuitive reaction of the passenger to "open the door" is harnessed. However, this can be deactivated when the vehicle is in motion.

Another alternative embodiment has a center console that is designed to crush under impact as shown in FIGS. 1F–4F, thereby minimizing the ejection of the far side passenger on impact.

Another alternative embodiment has the internal airbag partially filled at all times, so that in the event of no deployment of the external airbags either because of technology failure or non installation or other reason, the passenger and seat arrangement are cushioned even prior to further inflation of the internal airbag on deployment on impact. Shock absorbers may supplement the operation of the internal airbags in this embodiment with partially inflated internal airbags under normal operating conditions.

Another alternative embodiment can have the internal airbags deployed on impact as noted with such deployment effected by inflation by some of the compressed air of the external airbags on impact, thereby providing "acceleration de-amplification" for the movement of the passengers on impact.

Yet another embodiment has proactive sensors deploying the internal airbags directly, without the installation of external airbags.

Yet another embodiment of the invention has a retaracting canopy stored in the roof of the vehicle, and attachable to the protector shield or attached components such as the side window, when desired. When attached, the canopy will deploy over the seats when in the extended or loading positions, thereby protecting the seat and the passenger from rain or other snow while entering or leaving the vehicle.

Yet another embodiment has external airbags constructed using the Passive Air-Cushion System with micro chambers that are connected to each other by restricted paths that provide visco-elastic energy absorption in the event of some sections of the airbag being impacted while others are not, thereby forcing air from the compressed micro chambers to the other micro chambers, each of the micro chambers functioning as either a sacrificial chamber or a Micro Air Cushion on impact. This embodiment may of course have external airbags proactively deployed in the manner described herein, prior to impact and their performance as Micro Air Cushion systems. Yet another variation may include one way valves between the chamber directly connected to the inflation source and each of the micro-chambers (implementable for example with flaps against an aperture) so that inflation may be achieved rapidly, and then the Passive Air-cushion benefits realized on impact.

Yet another embodiment uses the Passive Air-cushion system to protect passengers from "Whip-lash" injury, by providing Micro Air-cushions in the vicinity of the head and neck, and providing sacrificial chambers that are compressed in the event of a rear end collision. In some embodiments the sacrificial chamber can be mounted below the seat with one face mounted to the vehicle structure and the other face mounted to the seat of the passenger, the seat being mounted to the support structure to allow controlled limited rearward movement relative to its mountings to allow compression of the sacrificial chamber by the inertial mass of the passenger and seat on impact.

Yet another embodiment utilizes multiple adjoining but separate Passive Air-cushion systems where one such system connects the external airbags (sacrificial chambers) with internal airbags (micro Air-cushions), and another such system connects different and distinct internal airbags (sacrificial chambers) to micro Air-cushions in the vicinity of the passenger's body, thereby creating a cascading system of Passive Air—cushion systems. These embodiments may of course have external airbags proactively deployed in the manner described herein, prior to impact and their performance as Micro Air Cushion systems.

Yet another embodiment utilizes an auxiliary brake attached to the secondary slides in addition to the friction limited sliding arrangements of the secondary slide, to provide a further control on the rate of movement of the secondary slide under side or lateral impact.

Yet another embodiment utilizes a foot safety switch attached to the foot rest, that activates the sliding mechanism to move the sliding seats into and out of the vehicle. The foot rest in some such embodiments may be bar that is depressed to move the slide into and out of the vehicle. These foot rests being designed to avoid ankle injuries in the event of rear collisions sustained by the vehicle.

Yet another embodiment uses supplementary porous filling materials within prefilled internal airbags designed with suitable vents to change the compression characteristics of the inside airbags under impact.

Yet another embodiment utilizes pressure memory capable materials on the surface of the seats or passenger supports so that surround seats contour to the exact shape of the body for further comfort of passengers and also better support under collision conditions.

Yet another embodiment has anatomical micro-aircushions on the left and right edges of the support surface of the safety shield connected to selected sacrificial chambers along the bottom edge of said support surface. This will provide additional support for the passenger in a side impact, by assisting in preventing body movement outside the contoured seat under collision conditions.

Yet another embodiment has anatomical micro-aircushions on the outer edges of each of the countoured seats, particularly to cover a part of the front of the shoulders the legs and torso in the event of a side collision. These anatomical air-cushions use sacrificial chambers on the sides of the seats.

Yet another embodiment has multiple pairs of customizable multi element seats (passenger support mechanisms or PSMs) on each of one or more lateral axes such as in a bus. In this embodiment, the pair of passenger support mechanisms nearest the center of the vehicle constitute the innermost pair and the pair that is closest to the outer sides of the vehicle constitute the outermost pair. The outermost pair of PSMs may have an protector shield and internal and external airbags mounted on it for the protectio of passengers and disclosed elsewhere in this invention. In this embodiment, each of these PSMS are supported by impact decoupler/secondary slides that are normally fixed to safety beam upper elements that are in turn slidably mounted on one of the safety beam upper elements. The safety beam upper elements are normally locked to the safety beam lower elements in the operating position and therefore do not normally slide in the operating position. However for egress and ingress the safety beam upper elements may slide on the safety beam lower elements to provide egress and ingress access to the occupants. In the event of a lateral impact, the impact decoupler/secondary slides decouple from the safety beam upper elements and allow each of the PSMs on their respective secondary slides to slide on the safety beam upper element. It is also possible the safety beam lower element on the side away from the impact to guide the safety beam upper elements, if they need to traverse the center of the vehicle. The design of fixed elements in the vehicle is such that these fixed elements do not obstruct the motion of the PSMs and the attached components as disclosed above during collision conditions. This embodiment is there fore similar to embodiments with one PSM on each side of the vehicle on a lateral axis except that the multiple PSMs are protected.

Yet another embodiment has safety beam upper element constructed as a plurality of slidably attached elements, such that each of the elements have a limited sliding range relative to the adjoining elements, and wherein the first of these elements is fixedly attached to the safety beam upper element and the last of these sliding elements is fixedly attached to the second face of the safety beam upper element,. This arrangement is much like the slide support for a filing drawer and provides greater movement for the passenger support mechanism in particular for egress and ingress.

CONCLUSIONS, RAMIFICATIONS & SCOPE

Thus it will become apparent that the present invention presented, provides a new paradigm for implementing key safety features and providing utility in accessing passenger vehicles and comfort in travelling in such vehicles. While the above description provides many specificities, these should not be construed as limitations on the scope of the present invention, but rather as an exemplification of the preferred, an additional and an alternative embodiment thereof. Many other variations are possible.

The present invention provides an arrangement that diverts the impact energy in lateral or side impacts away from the passengers to the remaining mass of the vehicle thereby protecting the passengers but decelerating the impacting object with the remaining mass of the vehicle. Moreover the arrangement synergistically provides a means for utilitarian easy access to the vehicle for passengers and drivers alike and allows the installation of multi-element surround contoured seats for the comfort and protection of passengers. Furthermore, the arrangement allows the installation of a new and unique safety harness that may obviate the need for safety belts and front impact airbags for protection in head-on collisions. This arrangement differs sharply from the Background art in that it does not simply offer to the impacting body a reinforced rigid shell where the passenger is treated as part of this integral unit, but rather provides selective and differential treatment of the mass of the passengers and driver of the vehicle vis-à-vis the remaining mass of the vehicle. Furthermore the present invention differs sharply from the Background art in that the resulting structure synergistically permits the installation of contoured multi-element surround seats that would not be implementable without the slide arrangements on either side of the vehicle in the present invention.

The present invention provides a gravity slide drive for my arrangement for which there is no counterpart in the Background art. This allows further Utility and weight and energy saving in implementing the above elements of the present invention.

The present invention includes External side Airbags that differ sharply from the Background art in that for the first time they proactively create a "Just in Time" deceleration zone for the lateral or side impact with internal and/or external side airbags while not remaining in an extended position under normal operating conditions of the vehicle.

The present invention describes an indo-skeletal structure of the vehicle body that permits the energy transfer from the lateral or side impact through compressive members to the body of the vehicle. Unlike the Background art this indo-skeletal structure is designed to transfer energy to the body of the vehicle without transferring it to the passengers and driver of the vehicle. The passengers are targeted for protection with "Safety zones".

What is claimed is:

1. In a vehicle having a right and left side and substantially massive components, and having at least one fixed body member connected with substantial rigidity to substantially all of the substantially massive components of said vehicle, a vehicle structure having an operating position attained during normal driving conditions and an extended position attained at the time of passenger and operator access to the vehicle, said vehicle structure having a means to divert the impact energy in lateral impacts to be absorbed by said vehicle through the at least one fixed body member while releasing the passengers and operators each having mass, weight, left and right sides, a back and a bottom, to move independently of said vehicle, in a passenger support mechanism with a plurality of elements in a predetermined controlled fashion, in order to minimize injury to such operators and passengers.

2. The vehicle of claim 1, having a vehicle structure comprising:

a) at least one pair of safety beam lower elements, said pair of safety beam lower elements comprising two members, for providing a means to resist compressive lateral impact forces, and for providing support for slidably attached components, each member of the pair of said safety beam lower elements being directly mounted to the at least one fixed body member with mountings, said mountings being on the left side and the right side of the vehicle respectively, the members of each pair of safety beam lower elements being mounted at the same longitudinal position of said vehicle along a lateral axis;

b) at least one pair of compression resisting safety beam upper elements each member of said pair comprising two members, each member of said pair having a first face and a second face, and each of the members of said pair mounted to the first face of each member of a pair of said safety beam lower elements on the left and the right sides of the vehicle;

c) a plurality of passenger support mechanisms positioned in pairs, members of each said pair on each of the left and the right sides respectively of said vehicle on at least one lateral axes such that the pair having its members closest to the external surface of the vehicle structure constitutes an outermost pair and such that the pair having its members closest to the center of the vehicle structure constitutes an innermost pair;

d) a plurality of secondary slides each with a first face and a second face, attached by said first face to one of said safety beam upper elements on the second face of said safety beam upper element and fixedly attached by said second face to one of the passenger support mechanisms, such that said secondary slides are normally fixedly attached by said first face to said safety beam upper elements, but become decoupled and thereafter slidably attached by said first face to said safety beam upper elements along a lateral axis when a lateral shear force greater than a predetermined force is applied to said first face relative to said second face of said secondary slides allowing said passenger support mechanisms attached to said second face of said secondary slides to slide along said lateral axis relative to said safety beam upper elements, said secondary slides mounted on each of said safety beam upper elements being constructed such that after they are decoupled, they can be guided laterally by, and are slidably attached to one or more of said safety beam upper elements mounted on a single pair of said safety beam lower elements, and further positioned on the safety beam upper elements at all times such that they are not obstructed by any elements of the vehicle in the event that said secondary slides need under collision conditions to traverse the center of the vehicle to the further side of the vehicle;

e) at least one protector assembly comprising a shock-absorbing device and at least one force distributing protector shield, said protector assembly installed to protect each member of the outermost pair of passenger support mechanisms, on each of the left and right sides of the vehicle, and locked to the fixed body members of the vehicle when in the operating position; and f) internal airbags, each mounted on the outer side of each of the outermost said passenger support mechanisms, but inside said protector assembly, on both the left and the right sides of the vehicle, such that upon detection of an impact event, the airbag deploys next to said passenger support mechanism(s) and deploying upwards and inwards to protect the passengers.

3. The structure of claim 2, further comprising reinforcements to the safety beam upper element to prevent distortion of these elements in the event of a vertical upward force applied at the end of the extended Safety beam upper element, thereby providing an outrigger function that will deter roll over following a side impact.

4. The structure as in 3, further comprising an anchor bracket for each safety beam upper element, attached to the fixed body members near the side of the vehicle and shaped such that it will contact and support the safety beam upper element if slightly deflected upwards at its end.

5. The vehicle structure as in claim 2, wherein said fixed body members comprise at least one central member of an indo-skeletal structure that abuts said safetybeam/lower primary slide and the safety beam upper element, and thereby resists, lateral forces from compressive loads incurred by said safety beam lower elements and said safety beam upper elements/safety beam upper elements during impact.

6. The structure of claim 5, further comprising a crushable center console detachably mounted on the central member of an indoskeletal structure, such that said crushable center console is normally fixed to the central member of an indoskeletal structure, but becomes decoupled and compressed in a lateral direction and thereafter slidably attached to either the central member of an indoskeletal structure or an element of one or more pairs of safety beam upper elements, along a lateral axis when a lateral shear force greater than a predetermined force is applied to the crushable center console relative to the central member of an indoskeletal structure, thereby releasing it to slide along a lateral axis, said crushable center console being constructed such that after it is decoupled, it can be guided laterally by, and is slidably attached to any one of said safety beam upper elements mounted on one or more pairs of said safety beam lower elements, and further positioned on the safety beam lower elements at all times such that they are not obstructed by any elements of the vehicle.

7. The vehicle structure as in claim 2, wherein the secondary slide comprises a front edge and a back edge, the direction of said front and back edges being in the lateral direction relative to the vehicle, said vehicle further comprising a Foot rest attached to the front edge of at least one secondary slide that is positioned closest to the front edge of said passenger support mechanism that it supports, thereby providing support for the feet of passengers while entering and leaving the vehicle.

8. The vehicle structure as in claim 2, further comprising detectors positioned between the protector shields and the fixed body members, to detect the presence of body parts in the way of retracting safety beam upper element or a secondary slide and thereby providing the required information to suspend the motion of said safety beam upper elements or secondary slides.

9. The vehicle structure of claim 2, where said protector shields include vertical extensions that protrude vertically above the protector shield and shock absorbing devices to provide resistance to lateral forces at higher physical levels thereby providing further protection to the passengers, and to provide a rigid member that can resist vertical forces adequate to support said vehicle in a roll over situation, thereby protecting said passengers.

10. The vehicle structure of claim 9, further comprising a lateral beam across the top of the vehicle that engages said vertical extension when said safety beam upper element is in said operating position, furthermore comprising telescoping sections that allow said lateral beam to remain engaged to said vertical sections while said passenger support mechanism is ejected thereby providing protection to said passenger by maintaining a safety cage, thereby providing greater side impact protection and protection in a roll over situation.

11. A vehicle structure in a vehicle, of claim 2, further comprising a passive air cushion system for protecting said passenger in said passenger support mechanism, during a lateral impact to said vehicle by an impacting object, wherein at least one of said internal airbags are sacrificial chambers of said passive air cushion system containing a compressible fluid following the detection of said impact event, said passive air cushion system further comprising:
  a) one or more fluid paths with flow control mechanisms, that are connected to said sacrificial chamber, and filled with said compressible fluid, such that under impact to the sacrificial chamber, said fluid paths may conduct a predetermined controlled volume of said compressible fluid out of said sacrificial chamber to predetermined locations;
  b) one or more micro-air cushions placed in locations in the vicinity of said passenger and supported by said passenger support mechanisms, said micro-air cushions being connected to one or more of said fluid paths, thereby receiving predetermined contolled volumes of said compressible fluid from said fluid paths at and immediately following said impact;
thereby said sacrificial chamber upon compression, inflating said micro-air cushions and protecting said passenger.

12. A Passive Air-cushion System as in claim 11, wherein said micro-air-cushions are placed in positions such that on inflation following impact, they hold and cushion the passenger.

13. A Passive Air-cushion System as in claim 11, wherein said micro-air-cushions are placed in positions such that on inflation following impact, they provide protection to said passenger, in the event of a predetermined small displacement of said passenger relative to said passenger support mechanism.

14. The vehicle structure in a vehicle of claim 2, further comprising at least one crushable element detachably mounted to fixed elements of said vehicle structure, said crushable elements mounted collinear with said secondary slides such that said crushable elements are normally fixed to said fixed elements of said vehicle structure, but become decoupled and compressed in a lateral direction and thereafter slidably attached to said fixed elements of vehicle structure, along a lateral axis when a lateral impact force greater than a predetermined force is applied to the side of the vehicle, thereby releasing them to slide along a lateral axis.

15. The vehicle structure in a vehicle, of claim 2, further comprising a passive air cushion system within said internal airbag, for protecting said passenger in said passenger support mechanism, during a lateral impact to said vehicle by an impacting object, wherein at least one of said internal airbags are sacrificial chambers of said passive air cushion system containing a compressible fluid following the detection of said impact event, said passive air cushion system further comprising:
  a) one or more fluid paths with flow control mechanisms, that are connected to said sacrificial chamber, and filled with said compressible fluid, such that under impact to the sacrificial chamber, said fluid paths may conduct a predetermined controlled volume of said compressible fluid out of said sacrificial chamber to predetermined locations;
  b) one or more micro-air cushions placed in locations in the vicinity of said passenger and supported by said passenger support mechanisms, said micro-air cushions being connected to one or more of said fluid paths, thereby receiving predetermined contolled volumes of said compressible fluid from said fluid paths at and immediately following said impact;
thereby said sacrificial chamber inflating said micro-air cushions and protecting said passenger.

16. The vehicle structure as in claim 2, wherein said safety beam upper elements are each constructed to have a plurality of slidably attached elements, such that each of the elements have a limited sliding range relative to the adjoining element, and wherein the first of these sliding elements is fixedly attached to the first face of said safety beam upper element and where the last of these sliding elements is fixedly attached to said second face of said safety beam upper element.

17. The vehicle structure in a vehicle of claim 1, further comprising a passive air cushion system for protecting said passenger in said passenger support mechanism, during a lateral impact to said vehicle by an impacting object comprising:
  a) at least one sacrificial chamber located in a predetermined position within said vehicle, such that said impact from impacting object, will compress said sacrificial chamber, said sacrificial chamber being filled with a compressible fluid;
  b) one or more fluid paths with flow control mechanisms, that are connected to said sacrificial chamber, and filled with said compressible fluid, such that under impact to the sacrificial chamber, said fluid paths may conduct a predetermined controlled volume of said compressible fluid out of said sacrificial chamber to predetermined locations;

c) one or more micro-air cushions placed in locations in the vicinity of said passenger and supported by said vehicle structure, said micro-air cushions being connected to one or more of said fluid paths, thereby receiving predetermined contolled volumes of said compressible fluid from said fluid paths at and immediately following said impact;

thereby said sacrificial chamber inflating said micro-air cushions and protecting said passenger.

18. A passive air-cushion system as in claim 17, further comprising:
   a) proactive impact sensors that provide a means to detect an impact event prior to said impact on said vehicle, detection of said impact event comprising the detection of at least one of the expected timing and expected severity of said impact, said proactive impact sensors being mounted on said vehicle and in the vicinity of said passenger and pointed in a predetermined direction of expected impact by the impacting object,
   b) an inflation means for said sacrificial chambers, activated by said proactive impact sensors thereby providing a means to inflate the sacrificial chambers just prior to the impact, and thereafter providing the protection of the Passive Air-cushion System.

19. A Passive Air-cushion System as in claim 17, wherein said sacrificial chamber is located in the vicinity of said passenger support mechanism on the side of the expected lateral impact, and said sacrificial chamber retains some of the compressible fluid during and after impact to provide secondary protection to said passenger support mechanism by resisting the impact forces caused by said impact while compressing in a predetermined controlled fashion.

20. A Passive Air-cushion System as in claim 17, wherein said micro-air-cushions are placed in positions such that on inflation following impact, they hold and cushion predetermined anatomical elements of the passenger.

21. A Passive Air-cushion System as in claim 17, wherein said micro-air-cushions are placed in positions such that on inflation following impact, they provide protection to predetermined anatomical elements of said passenger, in the event of a predetermined small displacement of said passenger relative to said passenger support mechanism.

22. A Passive Air-cushion System as in claim 17, further comprising a safe position of the passenger relative to the vehicle positioned within a motion space consisting of free space adjoining the passenger and extending to the safe position, where the passenger will sustain controlled forces over a predetermined period of time during and following said impact, thereby allowing said micro-air-cushion on inflation following impact, to displace said passenger in said passenger support mechanism across said motion space to said safe position and thereafter cushioning and thereby protecting said passenger following impact.

23. A Passive Air-cushion System as in claim 17, further comprising:
   a) reactive impact sensors that provide a means to detect an impact event on impact on said vehicle, said reactive impact sensors being mounted on said vehicle and in the vicinity of said passenger,
   b) an inflation means for said sacrificial chambers, activated by said reactive impact sensors thereby providing a means to inflate the sacrificial chambers immediately on impact, and thereafter providing the protection of the Passive Air-cushion System.

24. A Passive Air-cushion System as in claim 17, further comprising a safe position of predefined parts of the passenger relative to the vehicle positioned within a motion space consisting of free space adjoining the predefined parts of the passenger and extending to the safe position, where the predefined parts of the passenger will sustain controlled forces over a predetermined period of time during and following said impact, thereby allowing said micro-air-cushion on inflation following impact, to displace said predefined parts of the passenger across said motion space to said safe position and thereafter cushioning and thereby protecting said predefined parts of the passenger following impact.

25. The vehicle structure of claim 1, further comprising:
   a) at least one pair comprising two members of a safety beam lower element, each member of said pair having a first face and a second face, and constructed to provide a means to resist compressive lateral impact forces, and to provide support for components attached thereto, a member of each pair of said safety beam lower element being directly mounted on its second face to the at least one fixed body member on the left side and the right side of the vehicle respectively, the members of each pair being mounted at the same longitudinal position of said vehicle;
   b) at least one pair of a safety beam upper element, each member of said pair having a first face and a second face and designed to resist compression, and each of the members of said pair mounted to the first face of each member of a pair of said safety beam lower element on the left and the right sides of the vehicle;
   c) pairs of at least one passenger support mechanism members of said pairs being mounted on each of the left and the right sides of said vehicle on at least one lateral axes such that the pair having its members closest to the external surface of the vehicle structure constitutes an outermost pair and such that the pair having its members closest to the center of the vehicle structure constitutes an innermost pair;
   d) a plurality of secondary slides each with a first face and a second face, attached by said first face to one member of said pair of said safety beam upper element on the second face of said safety beam upper element and said secondary slides fixedly attached by said second face to one of the passenger support mechanisms, such that said secondary slides are normally fixedly attached by said first face to said safety beam upper element, but become decoupled and thereafter slidably attached by said first face to said safety beam upper element along a lateral axis when a lateral shear force greater than a predetermined force is applied to said first face relative to said second face of said secondary slides allowing said passenger support mechanisms attached to said second face of said secondary slides to slide along said lateral axis relative to said safety beam upper element, said secondary slides mounted on each of said safety beam upper element being constructed such that after they are decoupled, they can be guided laterally by, and are slidably attached to one or more of said safety beam upper element mounted on a single pair of said safety beam lower element, and further positioned on the safety beam upper element at all times such that they are not obstructed by any elements of the vehicle in the event that said secondary slides need under collision conditions to traverse the center of the vehicle to the further side of the vehicle;
   e) internal airbags, each mounted on the outer side of and adjoining each of the outermost said passenger support mechanisms, on both the left and the right sides of the vehicle, such that upon detection of an impact event, the airbag deploys next to said passenger support mechanism(s) and deploying upwards and inwards to protect the passengers; and f) pairs of at least one protector assembly comprising a shock-absorbing device and a force distributing protector shield elements of each pair being mounted on the left and the right side of the vehicle said protector assembly, installed to protect each member of the outermost pair of passenger support mechanisms, on each of the left and right sides of the vehicle, and locked to the fixed body members of the vehicle to be oriented parallel to the sides of the passenger support mechanisms and adjoining said internal airbags when in the operating position and positioned so as to not interfere with egress and ingress when said passenger support mechanisms are in the extended position.

26. The vehicle structure of claim 1, wherein said passenger support mechanisms comprise anatomical micro-aircushions on one or more of the left and the right side of each of said passenger support mechanisms in positions that facilitate deployment to hold the passenger within said surround seats, said anatomical micro-aircushions utilizing sacrificial chambers on the sides of said passenger support mechanisms placed in positions such that they are compressed under side collisions.

27. A vehicle with a vehicle structure of claim 1, wherein said vehicle structure contains means to ensure that no elements of said passenger support mechanism with a plurality of elements, obstructs the passenger for egress and ingress when said vehicle structure is in the extended position.

28. A vehicle with a vehicle structure of claim 1, wherein said vehicle structure contains means to utilize the force of said impact on said vehicle having both magnitude and direction, to deploy support mechanisms to support predetermined anatomical elements of the passenger, said deployment effected in a direction unrelated to the direction of said impact force on said vehicle, said means thereby protecting said passenger.

29. The vehicle structure of claim 1, wherein said passenger support mechanisms each further comprise a multi-element adjustable seat that provide a means for support to the body of said passenger.

30. The vehicle structure of claim 29, further comprising a removeable and lockable safety harness that is mounted with safety harness supports to said multi-element adjustable seat to deploy a surface that will protect and support predetermined parts of the human body when the vehicle sustains rapid changes in velocity, and wherein said safety harness supports are removable and lockable on at least one support point and pivotally supported on at least one support point to allow passenger to mount and dismount said multi-element adjustable seat.

31. The vehicle structure of claim 30, wherein said multi-element adjustable seat includes an adjustable section near the head and neck which supports said pivotally mounted safety harness supports, thereby allowing said safety harness to be released at the removable and lockable safety harness supports, to swing on said pivotally mounted safety harness supports, up and over the head of the passenger to allow the passenger access to said multi-element contoured seat.

32. A vehicle structure in a vehicle, of claim 30, further comprising a passive air cushion system for protecting said passenger in said passenger support mechanism, during a lateral impact to said vehicle by an impacting object comprising:

a) at least one sacrificial chamber located laterally beside said multi-element adjustable seat, such that said impact from impacting object, will compress said sacrificial chamber, said sacrificial chamber being filled with a compressible fluid;

b) one or more fluid paths with flow control mechanisms, that are connected to said sacrificial chamber, and filled with said compressible fluid, such that under impact to the sacrificial chamber, said fluid paths may conduct a predetermined controlled volume of said compressible fluid out of said sacrificial chamber to predetermined locations;

c) one or more micro-air cushions placed in locations on either side of the head and neck, and supported by at least one of the multi-element adjustable seat and the safety harness, said micro-air cushions being connected to one or more of said fluid paths, thereby receiving predetermined contolled volumes of said compressible fluid from said fluid paths at and immediately following said impact;

thereby said sacrificial chamber inflating said micro-air cushions and protecting the head and neck of said passenger.

33. A vehicle structure in a vehicle, of claim 29, further comprising a passive air cushion system for protecting said passenger in said passenger support mechanism, during a lateral impact to said vehicle by an impacting object comprising:

a) at least one sacrificial chamber located laterally beside said multi-element adjustable seat, such that said impact from impacting object, will compress said sacrificial chamber, said sacrificial chamber being filled with a compressible fluid;

b) one or more fluid paths with flow control mechanisms, that are connected to said sacrificial chamber, and filled with said compressible fluid, such that under impact to the sacrificial chamber, said fluid paths may conduct a predetermined controlled volume of said compressible fluid out of said sacrificial chamber to predetermined locations;

c) one or more micro-air cushions placed in locations on either side of the head and neck, and supported by the multi-element adjustable seat, said micro-air cushions being connected to one or more of said fluid paths, thereby receiving predetermined contolled volumes of said compressible fluid from said fluid paths at and immediately following said impact;

thereby said sacrificial chamber inflating said micro-air cushions and protecting the head and neck of said passenger.

34. A vehicle structure in a vehicle, of claim 30, further comprising a passive air cushion system for protecting said passenger in said passenger support mechanism, during a frontal impact to said vehicle by an impacting object comprising:

a) at least one sacrificial chamber located on said safety harness in positions that will support anatomical elements that comprise the lower abdomen in the event of a frontal collision, such that said impact from impacting object, will compress said sacrificial chamber, said sacrificial chamber being filled with a compressible fluid;

b) one or more fluid paths with flow control mechanisms, that are connected to said sacrificial chamber, and filled with said compressible fluid, such that under impact to the sacrificial chamber, said fluid paths may conduct a predetermined controlled volume of said compressible fluid out of said sacrificial chamber to predetermined locations;

c) one or more micro-air cushions placed in locations in the vicinity of, and in front of the head and neck, and supported by said safety harness, said micro-air cushions being connected to one or more of said fluid paths, thereby receiving predetermined contolled volumes of said compressible fluid from said fluid paths at and immediately following said impact;

thereby said sacrificial chamber inflating said micro-air cushions and protecting the head and neck of said passenger in a front impact.

35. The vehicle structure as in claim 30, wherein said safety harness comprises soft and elastic net structure supported by a frame to support anatomical elements comprising the head and neck.

36. The vehicle structure as in claim 29, further comprising a means for providing front impact protection in a vehicle comprising:

providing a flexible and soft safety harness in front of and in close proximity to a large part of a passenger's upper body, head and neck and the safety harness anchored to the vehicle;

at the time of an impact, decelerating the mass of the passenger with said safety harness by providing a resistive force spread over a large part of the upper body, head and neck of the passenger, said resistive force at different parts of the body providing a mechanism for redeploying surfaces of the flexible soft harness; thereby passively decelerating the body, head and neck of the passenger at predetermined maximum rates in a frontal impact.

37. A vehicle structure in a vehicle, of claim 29, further comprising a passive air cushion system for protecting said passenger in said passenger support mechanism, during a lateral impact to said vehicle by an impacting object comprising:

d) at least one sacrificial chamber located laterally beside said multi-element adjustable seat, such that said impact from impacting object, will compress said sacrificial chamber, said sacrificial chamber being filled with a compressible fluid;

e) one or more fluid paths with flow control mechanisms, that are connected to said sacrificial chamber, and filled with said compressible fluid, such that under impact to the sacrificial chamber, said fluid paths may conduct a predetermined controlled volume of said compressible fluid out of said sacrificial chamber to predetermined locations;

f) one or more micro-air cushions placed in locations in the vicinity of the human body on either side of the torso, and supported by the multi-element adjustable seat, said micro-air cushions being connected to one or more of said fluid paths, thereby receiving predetermined contolled volumes of said compressible fluid from said fluid paths at and immediately following said impact;

thereby said sacrificial chamber inflating said micro-air cushions and protecting and holding the torso of said passenger.

38. A vehicle structure in a vehicle, of claim 29, further comprising micro air cushions mounted on said passenger support mechanism in the vicinity of high priority anatomical regions of said passenger, while said passenger support mechanism is in the operating position of said vehicle structure, thereby said micro air cushions providing protection to said passenger on impact of impacting object on said vehicle, by holding and protecting said high priority anatomical regions of said passenger relative to said passenger support mechanism for a predetermined period of time following impact.

39. A vehicle with a vehicle structure of claim 1, wherein said vehicle structure contains means to utilize the force of said impact on said vehicle having both magnitude and direction, to deploy support mechanisms to hold predetermined anatomical elements of the passenger, said deployment effected in a direction unrelated to the direction of said impact force on said vehicle, said means thereby protecting said passenger.

40. The vehicle structure of claim 1, wherein said passenger support mechanisms have airconditioning microducts on the surfaces that are in the vicinity of passengers, thereby enhancing the comfort of passengers.

41. In a vehicle having a vehicle structure comprising a right and a left side an independantly ejectable mechanism for each of a plurality of passenger support mechanisms, said independently ejectable mechanisms comprising an operating position and an extended position, and each of said passenger support mechanisms comprising at least one of a left support multi-element and a right support multi-element for lateral support of a passenger when positioned in said passenger support mechanism, when said independently ejectable mechanism is in the operating position, wherein said independently ejectable mechanisms for the passenger support mechanisms on the left side of the vehicle are slidably mounted indirectly to fixed body members on the left side of said vehicle to allow said passenger support mechanisms on the left side of the vehicle to eject by sliding along a lateral axis to a position substantially outside but adjoining the vehicle on the left side thereby allowing said passengers that ride on said passenger support mechanisms on the left side of said vehicle to mount and dismount from the left side of the vehicle by ejecting said independently ejectable mechanisms and said independently ejectable mechanisms for the passenger support mechanisms on the right side of the vehicle are slidably mounted indirectly to fixed body members on the right side of said vehicle to allow said passenger support mechanisms on the right side of the vehicle to eject by sliding along a lateral axis to a position substantially outside but adjoining the vehicle on the right side, thereby allowing said passengers that ride on said passenger support mechanisms on the right side of said vehicle to mount and dismount from the right side of the vehicle by ejecting said independently ejectable mechanisms.

42. The vehicle structure of claim 41, wherein said passenger support mechanisms each further comprise a multi-element adjustable seat that provide a means for support to the body of said passenger and a removeable and lockable safety harness that is mounted with safety harness supports to said multi-element adjustable seat each of said safety harness supports being mounted on said multi-element adjustable seat on a corresponding support point, to deploy a surface that will protect and support predetermined parts of the human body when the vehicle sustains rapid changes in velocity, and wherein at least one of said safety harness supports are removable and lockable on its corresponding support point, and wherein at least one of said safety harness supports are pivotally supported on its corresponding support point to allow passenger to mount and dismount said multi-element adjustable seat.

43. The vehicle structure of claim 42, wherein said safety harness supports micro air cushions that are located to support key anatomical areas and which are actively deployed on the detection of an impact.

44. The vehicle structure as in claim 42, wherein the multi-element adjustable seat further comprises one or both of a pair of arm rests and a pair of side bolsters, each of said pairs comprising two members, said arm rests and side bolsters comprising mounts for said safety harness, wherein said mounts provide torsional resistance to rotational movement of and a pivotal axis for such rotational movement of said surface of said safety harness, thereby providing said surface with controlled reactive force on the body of the passenger in the event of a frontal collision.

45. The vehicle structure of claim 41, wherein said passenger support mechanism comprises a multi-element adjustable seat that includes an adjustable section near the head and neck which supports at least one pivotally mounted safety harness support, for allowing a safety harness attached to the safety harness support, to swing on said at least one pivotally mounted safety harness support, said swing of said safety harness following release of said safety harness from a removable and lockable safety harness support, attached to said safety harness, and said swing of said safety harness proceeding up and over the head of the passenger to allow the passenger access to said multi-element contoured seat.

46. The vehicle structure as in claim 45, wherein said safety harness comprises soft and elastic net structure supported by a frame to support anatomical elements comprising the head and neck.

47. The vehicle structure of claim 41, further providing a means to utilize gravitational forces to drive in the required direction, said slidably attached passenger support mechanisms, comprising:
   a) pairs of safety beam lower elements, a member of each pair on each of the left and right side of the vehicle, each member comprising a sliding surface, said safety beam lower elements being pivotally mounted on the fixed body members of the vehicle such that said pivotally mounted safety beam lower elements can move to and be locked into one of at least two possible inclinations from the center of the vehicle, wherein said sliding surface on each of said pivotally mounted lower primary slides assumes a predetermined inclination to facilitate sliding of slidably attached passenger support mechanisms, in the required direction;
   b) energy storing devices including first spring mechanisms indirectly attached to each of said ejectable passenger support mechanisms, that partially convert and store the potential energy of the passengers and said ejectable passenger support mechanisms moving under gravity;
   c) passenger operable switching devices installed on both the inside and the outside of each of the sides of the vehicle immediately adjoining the outermost passenger support mechanisms on either side of said vehicle in positions such that said passenger operable switching devicess on the inside of each of said sides of vehicle is acessible to passengers in the outermost passenger support mechanisms and said passenger operable switching devices on the outside of said sides of vehicle are accessible to entering passengers outside the vehicle;
   d) logic devices that utilize the presence of the weight of the passengers in each of said passenger support mechanisms, the status of passenger operable switching devices inside and outside the vehicle and the position of said ejectable passenger support mechanisms, to operate locking devices that lock said primary slide to a range of said predetermined inclinations and lock the passenger support mechanisms and attached devices when in the operating position, wherein said range of predetermined inclinations of the primary slide are such that at either end of said range, compressive forces at the outer end of said primary slides will be transferred to the fixed members of the vehicle along a path entirely within the primary slide, to ensure compressive strength in any inclination of the primary slides within said range of inclinations;
   e) Second spring mountings attached at one end to the fixed body members and at the other end to said pivotally mounted primary slides such that the primary slides are supported while said primary slides are in the operating position and maintained by said spring mountings at the highest inclinations upwards from the center of the vehicle possible within the range of inclinations allowable in the operating position, thereby providing a shock absorption function for the passengers in the vehicle relative to the fixed body members and the surface traversed by the vehicle.

48. The vehicle structure of claim 41, further comprising a protective skin, and a retractable and detachable canopy, wherein said protective skin is attached to the outer ends of each of the left and the right safety beam upper elements, such that under normal operating conditions of the vehicle, said protection skin is approximately vertical, thereby protecting the passenger and the inside of the vehicle, and when the independantly ejectable mechanism is ejected, remains vertical at the outside end of the safety beam upper element, and wherein the retractable detachable canopy, is mounted within the roof of the vehicle and may be attached to the top end of the protective skin such that when the independantly ejectable mechanism is ejected, the retractable and detachable canopy is extended over the passenger support mechanisms thereby temorarily protecting the passenger support mechanisms while the independantly ejectable mechanism is in an extended position.

49. The vehicle structure as in claim 41, further comprising a multi-element adjustable seat which includes an adjustable section near the head and neck which supports a plurality of anatomical micro-airbags that surround the back and sides of the head and neck, and wherein a sacrificial chamber is located next to said multi-element adjustable seat in a position that will be compressed in a side or lateral impact on the vehicle, thereby inflating said anatomical micro-airbags on impact to protect and support the head and neck under lateral or side impact.

50. A method for providing side impact protection for passengers in a vehicle having an inertial mass, comprising:
   detecting the severity and timing of an impending impact;
   establishing a measured deceleration zone;
   deploying shock absorbing devices to extend across said deceleration zone concurrently displacing passengers to the further end of the deceleration zone;
   protecting the passengers with said shock absorbing devices while resisting the forces caused by the impact, with substantially massive components of said vehicle by allowing the passengers to move away from the impact at a predetermined measured rate along a predetermined path lateral to the vehicle; thereby protecting said passengers from crushing and impact injuries resulting from the collision;
   providing roll over deterrence by broadening the horizontal spread of the vehicle.

\* \* \* \* \*